United States Patent [19]

Rosenberg

[11] Patent Number: 5,601,760
[45] Date of Patent: Feb. 11, 1997

[54] MILK DERIVED WHEY PROTEIN-BASED MICROENCAPSULATING AGENTS AND A METHOD OF USE

[75] Inventor: Moshe Rosenberg, Davis, Calif.

[73] Assignee: The Regents of the University of California, a California Corporation, Oakland, Calif.

[21] Appl. No.: 299,918

[22] Filed: Sep. 1, 1994

[51] Int. Cl.$^6$ .............................. B01J 13/02; B01J 13/04
[52] U.S. Cl. .............................. 264/4.1; 264/4.7; 521/76; 427/213.3; 427/213.34
[58] Field of Search .............................. 264/4, 4.1, 4.7; 521/76; 427/213.3, 213.34

[56] References Cited

FOREIGN PATENT DOCUMENTS 1521691  8/1978  United Kingdom .

OTHER PUBLICATIONS

S. L. Young, et al., Microencapsulating Properties of Whey Proteins. 1. Microencapsulation of Anhydrous Milk Fat, *J. Dairy Sci.*, 76:2868–2877, 1993.
S. L. Young, et al., Microencapsulating Properties of Whey Proteins. 2. Combination of Whey Proteins with Carbohydrates, *J. Dairy Sci.*, 76:2878–2885, 1993.
M. Rosenberg, et al., Microstructure of Whey Protein/Anhydrous Milkfat Emulsions, *Food Structure*, vol. 12, pp. 267–274, 1993.
M. Rosenberg, et al., Whey Proteins as Microencapsulating Agents. Microencapsulation of Anhydrous Milkfat—Structure Evaluation, *Food Structure*, vol. 12, pp. 31–41, 1993.
D. L. Moreau, et al., Microstructure and Fat Extractability in Microcapsules Based on Whey Proteins or Mixtures of Whey Proteins and Lactose, *Food Structure*, vol. 12, pp. 457–468, 1993.
T. Y. Sheu, et al., Microencapsulation by Spray Drying Ethyl Caprylate in Whey Protein and Carbohydrate Wall Systems, *Journal of Food Science*, vol. 60, No. 1, pp. 98–103, 1995.
Moshe Rosenberg, Whey Use Expands, *Dairy Foods*, p. 58, Mar. 1992.
S. L. Young, et al., Microstructure of whey proteins based spray–dried microcapsules containing anhydrous milk fat, *The 1992 Annual Meeting of ADSA*, Jun. 21–24 (1992), Columbus, Ohio, Abstract, D66, p. 111.
S. L. Young, et al., Rheological properties of anhydrous milk fat/whey protein emulsions, *The 1992 Annual Meeting of ADSA*, Jun. 21–24 (1992), Columbus, Ohio, Abstract, D12, p. 93.
S. Y. Lee, et al., Microstructure of anhydrous milk fat/whey protein emulsions, *The 1992 Annual Meeting of ADSA*, Jun. 21–24 (1992), Columbus, Ohio, Abstract, D65, p. 110.
S. L. Young, et al., Microencapsulation of anhydrous milk fat by whey proteins, *The 1992 Annual Meeting of ADSA*, Jun. 21–24 (1992), Columbus, Ohio, Abstract, D13, p. 93.
Moshe Rosenberg, Better ways to handle whey are on the way, *The Hartford Sentinel*, p. 6, Jul. 2, 1992.
Moshe Rosenberg, et al., Microstructure of Whey Protein/Anhydrous Milkfat Emulsions, *Food Structure*, vol. 12 (1993), pp. 267–274.
Moshe Rosenberg, et al., Whey Proteins as Microencapsulating Agents. Microencapsulation of Anhydrous Milkfat—Structure Evaluation, *Food Structure*, vol. 12 (1993), pp. 31–41.
S. L. Young, et al., Microencapsulating Properties of Whey Proteins 2. Combinations of Whey Proteins with Carbohydrates, *J. Dairy Sci.*, 76:2878–2885, 1993.
S. L. Young, et al., Microencapsulating Properties of Whey Proteins 1. Microencapsulation of Anhydrous Milk Fat, *J. Dairy Sci.*, 76:2868–2877, 1993.
Moshe Rosenberg, Dairy Products Technology Research Accomplishments and Challenges, *California Dairy Food Research*, 1993 Dairy Industry Research Conference, Jan. 7, 1993, University of California.
Moshe Rosenberg, Applications for Membrane Processes in the Dairy Industry, *California Dairy Beat*, Winger 1993, pp. 1–2.

*Primary Examiner*—Nathan M. Nutter
*Attorney, Agent, or Firm*—Hana Verny

[57] ABSTRACT

Milk derived whey protein-based microencapsulating agents and a method for microencapsulation of volatile or non-volatile core materials. Milk derived whey protein concentrates or whey protein isolate alone or in admixture with other milk or non-milk derived products are used for microencapsulation of active ingredients cores. Whey proteins microencapsulated cores are easy to handle and store, have higher stability, protect the encapsulated core from deteriorating factors, prevent evaporation of volatile cores, transform liquid cores into free flowing powders, and provide greater versatility of microencapsulated products.

22 Claims, 39 Drawing Sheets

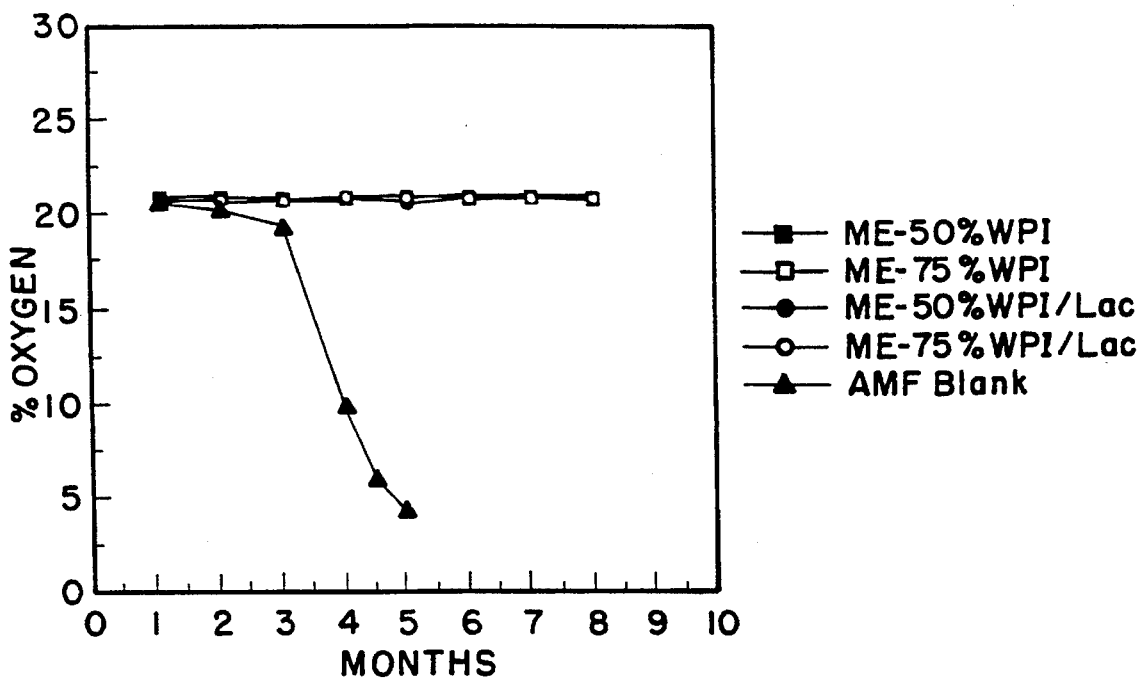
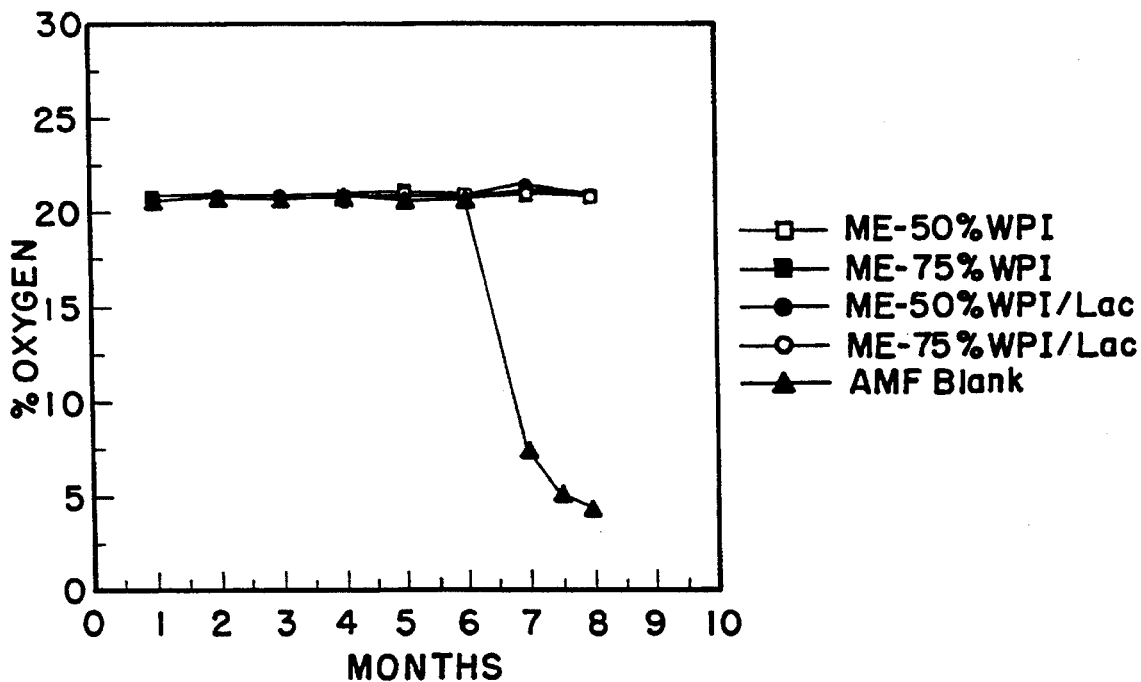

MILK DERIVED WHEY PROTEIN-BASED MICROENCAPSULATING AGENTS AND A METHOD OF USE

BACKGROUND OF THE INVENTION

FIELD OF THE INVENTION

The current invention concerns novel whey proteinbased microencapsulating agents and a method for microencapsulation of various core materials using the whey proteins microencapsulating agents. In particular, this invention concerns the use of milk derived whey protein concentrates or whey protein isolate alone or in admixture with other milk or non-milk derived compounds for microencapsulation of volatile and non-volatile core materials. Microencapsulating agents of this invention are natural, highly stable and safe, allow easy handling and storage, transform liquid cores into free flowing powders, protect the encapsulated core from deteriorating factors, and generally provide greater versatility of microencapsulated products.

BACKGROUND ART AND RELATED DISCLOSURES

Microencapsulation is a technique by which various active ingredients in form of liquid droplets or solid particles are coated with or packed into thin films of microencapsulating agents. Microencapsulation technique is commonly used for coating food, health or medical products and pharmaceuticals.

The use of microencapsulated ingredients in food products is increasing and for many reasons these products are very desirable. The microencapsulation techniques are able to protect the stability of high quality food ingredients during prolonged storage periods. Large quantity of microencapsulated products are used by the food industry in dry packaged goods, puddings, cake mixes and desert products. The microencapsulation techniques are able to protect the stability of high quality food ingredients during prolonged storage periods.

Important applications of microencapsulation in the food industry involve microencapsulation of such active ingredients as fats, oils, volatile molecules, fragrances, flavoring materials, vitamins, essential oils and oleoresins, bacteria, enzymes or minerals. Microencapsulation of these sensitive materials would make it possible to transform these materials into a free flowing product in which they are protected by the microencapsulation formed capsule walls against evaporation, oxidation and other chemical reactions.

One of the major problems of encapsulation of food ingredients is a relatively limited variety of available microencapsulating agents which are permitted to be used in food industry.

The number of currently existing microencapsulated products is, however, limited by the number of available microencapsulating agents which are safe, easy to handle, which provide stability and protect microencapsulated core from external deteriorating factors thereby providing higher stability and longer product shelf-life. The availability of highly functional and effective microencapsulating agents for food application is relatively limited.

It would be, therefore, extremely important to provide a new, safe and low cost microencapsulating agents which would meet criteria for successful microencapsulation of food products and also provide long-term stability and protection against deteriorating factors.

An acceptable microencapsulating agent must be safe and non-hazardous to the consumer health. It should have a bland or no flavor. It must be able to protect encapsulated cores from factors, such as oxygen, water, light or other compounds, which may cause its deterioration. It should delay release of an active ingredient pending its use and prevent or limit evaporation of volatile molecules. Further, the agent should be able to transform liquid materials into dry powders. Additionally, microencapsulating agent must have specific functional properties. For microencapsulation by spray-drying, these properties include emulsification, film forming and good drying properties, high solubility, ability to release core material on hydration and low viscosity of its concentrated solutions.

Although many wall materials are available for nonfood applications, the number of wall materials approved for food applications is limited and includes natural gums, carbohydrates, waxes and some proteins (*Food Technol.*, 42:135 (1988)). Starch and related products do not possess emulsification properties and cannot be used as wall materials in the absence of a surface-active wall constituent. The best known microencapsulating agent for food applications is gum arabic which has been known and used for many years as a microencapsulating agent, and is being used extensively to encapsulate various food ingredients. Currently, the use of proteins as a microencapsulating agent is very limited in the food industry. The main protein that has been evaluated for microencapsulation is gelatin. Although this protein has been successfully applied as the microencapsulating agent in the pharmaceutical industry, its functional properties, especially the high viscosity of its solutions even at low concentrations, limit its applications as an encapsulating agent especially in microencapsulation by spray-drying.

Recently, efforts have been made to identify new microencapsulating agents or to enhance the physicochemical properties of various natural polymers in order to improve their microencapsulating properties. The main approaches in this regard have focused on the chemical modification and partial hydrolysis of starches in order to enhance the emulsification and other functional properties of these materials. The success so far has been limited, and a critical need for new encapsulating agents remains.

Large volumes of whey are produced each year by the dairy industry. Whey, the watery part of milk separated from curd in the process of making cheese, is for many reasons treated as waste. Whey, however, contains valuable constituents, such as whey proteins, which are known to have high nutritional value and good functional properties. The physicochemical properties of whey proteins have been described in *Crit. Rev. Food Sci. Nutr.*, 21:197 (1984). These proteins possess, to a various extent, many characteristics desirable for a microencapsulating agent. Although the functionality of whey proteins and their usefulness in a broad array of food systems have been known, they have never before this invention been evaluated and found to be suitable as microencapsulating agents for microencapsulation of various products.

The evaluation of a potential microencapsulation agent is based in part on thorough understanding of the effect of compositional aspects and process parameters on the structural characteristics of the formed microcapsules.

Numerous techniques for the microencapsulation of various materials have been developed. Spray-drying, a well known technology in the food industry, is at present the most commonly used microencapsulation method for food ingredients (*Spray Drying in Food Flavors, Flavor Encapsula-*

*tion*, G. A. Reineccius and S. J. Risch, Eds., Am. Chem. Soc. Symp. No. 370, Am. Chem. Soc. Washington, D.C.)

The microstructure of various spray-dried, milk-derived, and other food-related powders has been studied and is described, for example, in *Food Microstruct.*, 6:171 (1987), which provides information on spray-dried, milk-derived powders. *Food Microstruct,*, 7:15 (1988) describes importance of a wall composition, drying conditions and storage conditions on the structure of spray-dried microcapsules and on the retention of the core material during the process and during storage.

One of the most desirable applications of the whey proteins as encapsulating agents is their use for microencapsulation of anhydrous milkfat in the dairy industry. Usefulness of milkfat in various food systems is limited by its susceptibility to oxidation and its handling difficulties. Successful microencapsulation could transform milkfat into a free flowing, dry and stable powder and thus could provide a solution to these problems. Similarly, encapsulation of volatiles and essential oils, such as orange essential oil, enables and enhances the usefulness of these products.

It would be, therefore, advantageous to have available method for microencapsulation of the anhydrous milkfat, volatiles, and essential oils by microencapsulating agents which would possess desirable microencapsulating properties, and be safe and inexpensive. It has now been discovered and is the subject of this invention that whey proteins possess all the above properties. Microencapsulation using whey proteins as the microencapsulating agent has not been heretofore achieved or described.

It is, therefore, a primary object of this invention to provide suitable and safe microencapsulating agents for microencapsulation of various food or other active ingredients using whey proteins alone or in combination with other milk derived or non-milk derived compounds. It is a further object to provide a method for microencapsulation of active ingredient cores wherein the cores to be encapsulated are protected against deteriorating factors by microencapsulation using whey proteins as primary microencapsulating agents.

SUMMARY

One aspect of the current invention are whey protein-based microencapsulating agents useful for microencapsulation of volatile, or non-volatile cores.

Still another aspect of the current invention are microencapsulation agents consisting of modified or unmodified whey protein or fraction thereof.

Still another aspect of the current invention are whey protein concentrates or whey protein isolates used for microencapsulation of anhydrous milkfat, essential oils and volatiles.

Still yet another aspect of the current invention are whey protein concentrates and whey protein isolate in combination with lactose or carbohydrates used as a wall material for microencapsulation of volatile or non-volatile active ingredient cores.

Still yet another aspect of the current invention are whey protein concentrates and whey protein isolates in combination with non-milk derived carbohydrates used for microencapsulation of anhydrous milkfat.

Still yet another aspect of the current invention are microencapsulating agents comprising whey proteins in combination with maltodextrins, corn syrup solids or other carbohydrates.

Still another aspect of the current invention are microencapsulating agents consisting of whey protein isolate in combination with commercial, carbohydrate based, microencapsulating agents.

Still another aspect of the current invention is a method for microencapsulation of various cores using whey protein microencapsulating agents alone or in combination with various carbohydrates applied by spray-drying.

DEFINITIONS

As used herein:

"Whey proteins" means whey protein concentrate, whey protein isolate, β-lactoglobulin (β-lg), α-lactalbumin (α-la), combination or mixtures of β-lg and α-la, partially or completely modified or denatured whey proteins.

"Whey protein concentrate" or "WPC" means proteins obtained from the watery part of milk separated from curd in the process of making cheese. Typically, these WPCs contain β-lactoglobulin, β-lactalbumin, bovine serum albumin, immunoglobulins, milkfat residues, milkfat globule membrane residues, lactose, minerals and moisture, and may contain residues of caseins. Protein content of WPCs varies from 30% to 80%. WPCs are commercially available and for the purposes of this invention, the WPCs were purchased from Calpro Ingredients, Corona, Calif. These WPCs typically contain protein, ash, fat residues, lactose and certain percentage of moisture. Composition of WPCs is listed in Table 1.

"Whey protein isolate" or "WPI" means proteins obtained from the watery part of milk separated from curd in the process of making cheese. WPI is typically consisting of β-lactoglobulin, α-lactalbumin, bovine serum albumin, immunoglobulins, minerals and moisture. WPIs typically contain more than 95% protein. WPIs are commercially available and for purposes of this invention, WPI were purchased from Le Sueur Isolates, Le Sueur, Minn. Composition of WPI is listed in Table 1.

"Core" means any active ingredient or material submitted to microencapsulation by whey proteins. Examples of the core are fats, such as anhydrous milkfat, volatiles, essential oils, flavors, fragrances, nutritional compounds, health products, vitamins, oleoresins, bacteria, enzyme, minerals, natural colorants, oils, essences, pharmaceuticals, and pharmaceutically acceptable ingredient, or a mixture thereof.

"Wall" means the structure formed by the microencapsulating agent around particles of an active ingredient core(s) being microencapsulated. The wall protects the core against deterioration by oxygen, moisture, light, and effect of other compounds or other factors, limits the losses of volatile core materials, and releases the core under desired conditions.

"Microencapsulation efficiency" or (MEE) represents the proportion of the active ingredient core, such as anhydrous milkfat (AMF) that was not available to the extracting solvent, such as petroleum ether, under the test conditions.

"Microencapsulation yield" or (MEY) represents a degree of retention of the active ingredient core within microcapsules during the microencapsulation process. The microencapsulation yield is defined as the ratio, expressed in %, of the core content of the dry microcapsules to its content in the emulsion prior to drying, on an equal dry wall solids basis.

"Solvent extractable core" means the fraction of the core material which is accessible to an extraction solvent and can be extracted from the capsules into such extraction solvent. This fraction represents the core material which is not encapsulated and is deposited instead on the capsule's wall (surface oil) and a proportion of the truly encapsulated core that is extracted by the solvent from the interior parts of the microcapsules.

"Wall constituents possessing microencapsulating properties" means other proteins like gelatin, natural and/or modified gums such as gum arabic, carrageenan, etc., modified starches, like NAT46, synthetic or non-synthetic wall materials.

"Wall constituents that do not possess microencapsulating properties" means carbohydrates like lactose, hydrolyzed or partially hydrolyzed starches like maltodextrins, corn syrup solids, etc.

"Additives to the wall system" such as emulsifier, anti-oxidant, plasticizers, fillers, etc., or any additive to the wall system to attain desired wall characteristics.

"Additives to the core" means compounds such as emulsifiers, anti-oxidant, dispersion aids, carriers, etc., and any additive added to the core to allow dispersion and/or microencapsulation of the core in the above mentioned wall system.

BRIEF DESCRIPTION OF DRAWINGS

FIG. 14A is a structure of a WPI-based, AMF-containing microcapsule.

FIGS. 18A through 16D illustrate structural changes and lactose crystallization after incubation of WPI/lactose-based, AMF-containing microcapsules at different water activity.

FIGS. 35A through 35E illustrate the effect of temperature on changes in oxygen headspace.

DETAILED DESCRIPTION OF THE INVENTION

Figure 1:
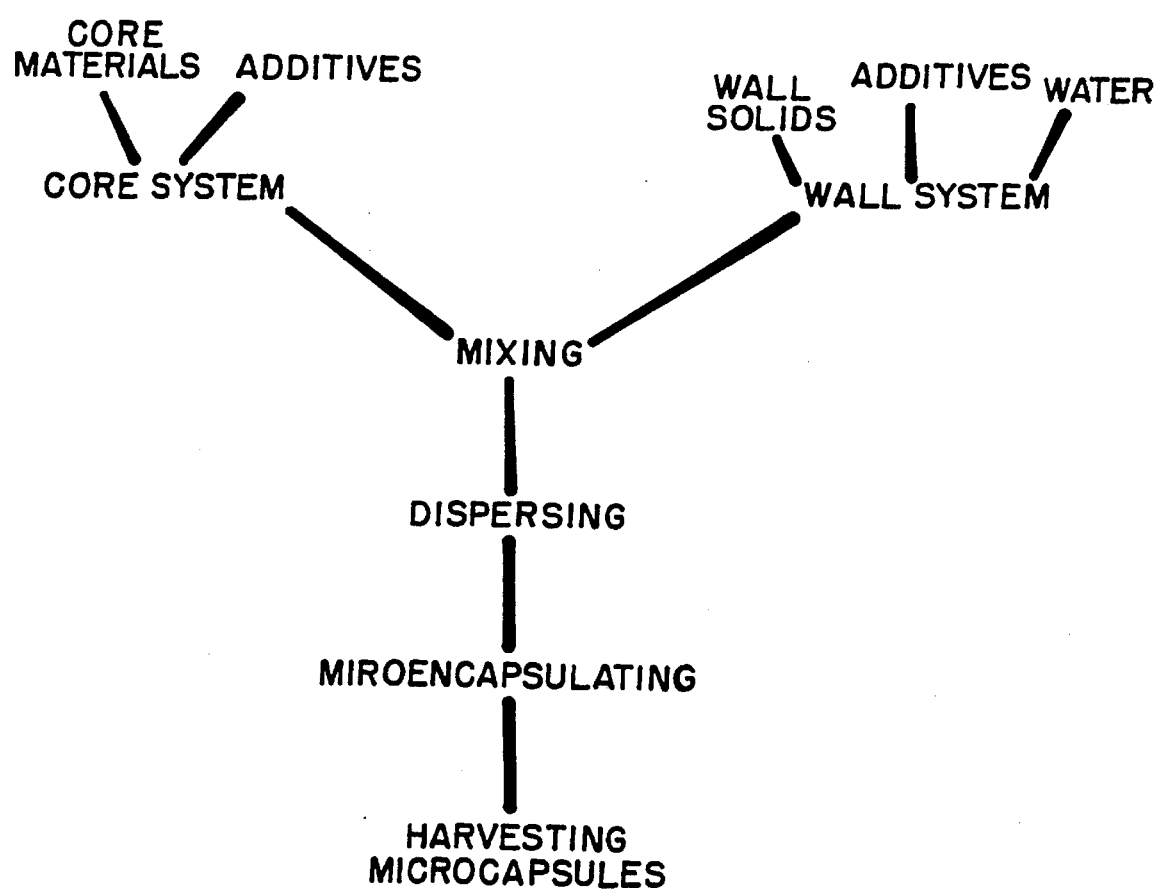
FIG. 1 is a schematic illustration of a spray-drying method of microencapsulation.
Figure 2A:
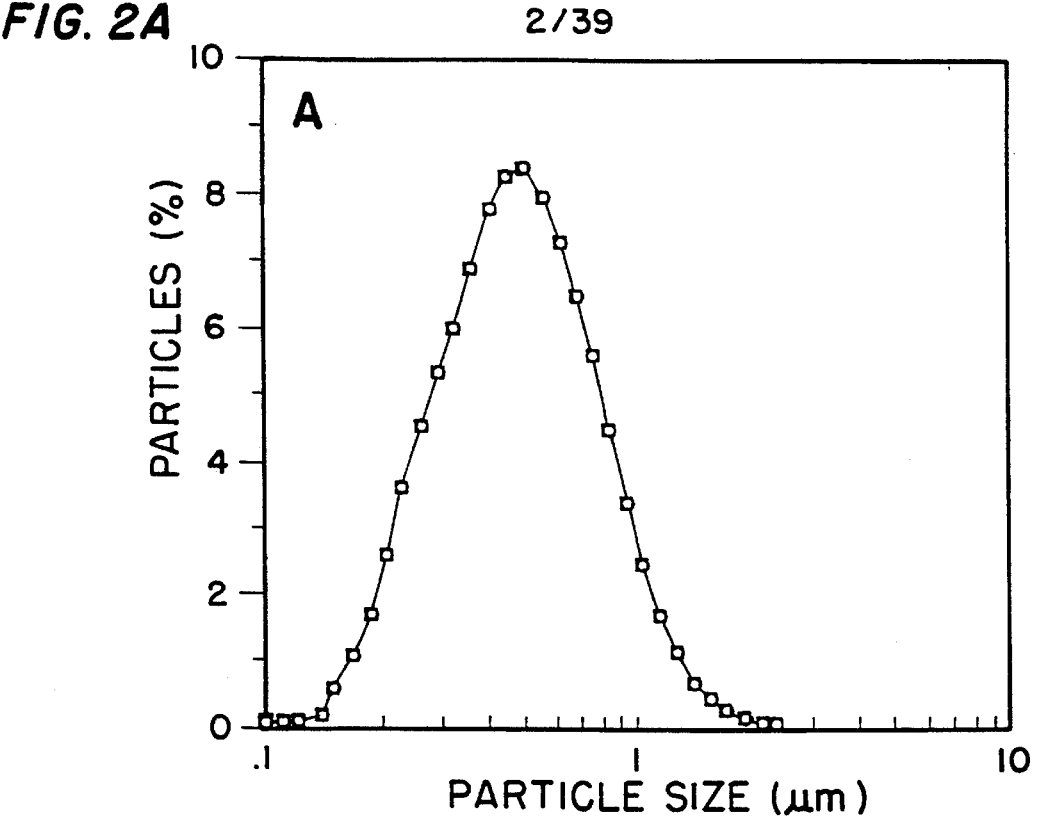
FIGS. 2A through 2D are representative spectra of particle size distribution of emulsions consisting of anhydrous milkfat emulsified in different wall solutions.
Figure 2B:
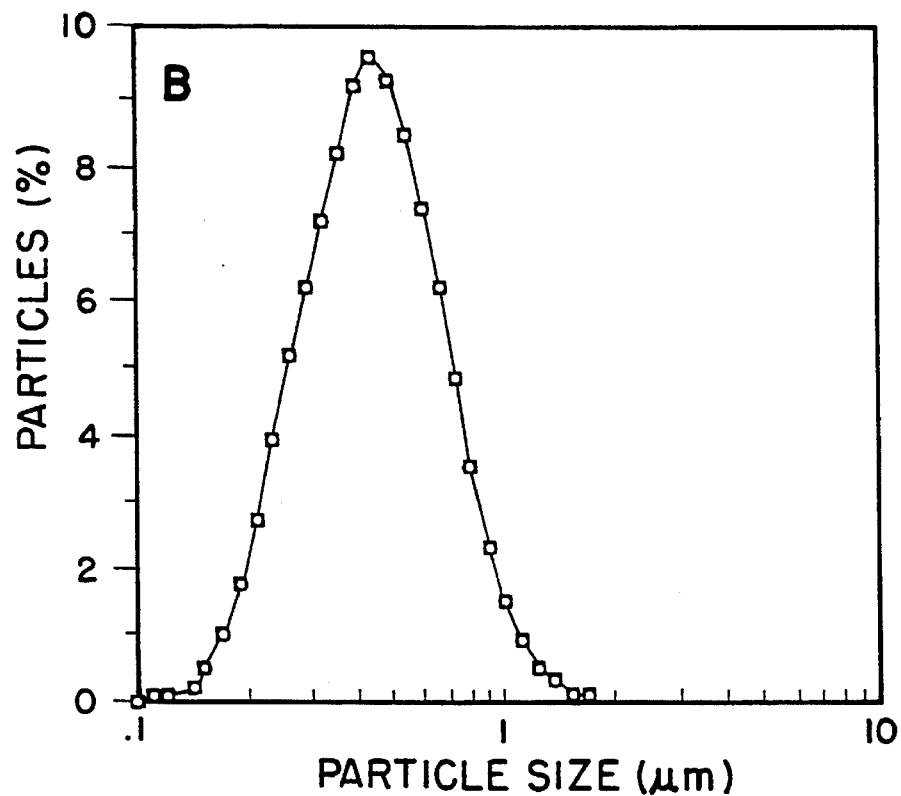
Figure 2C:
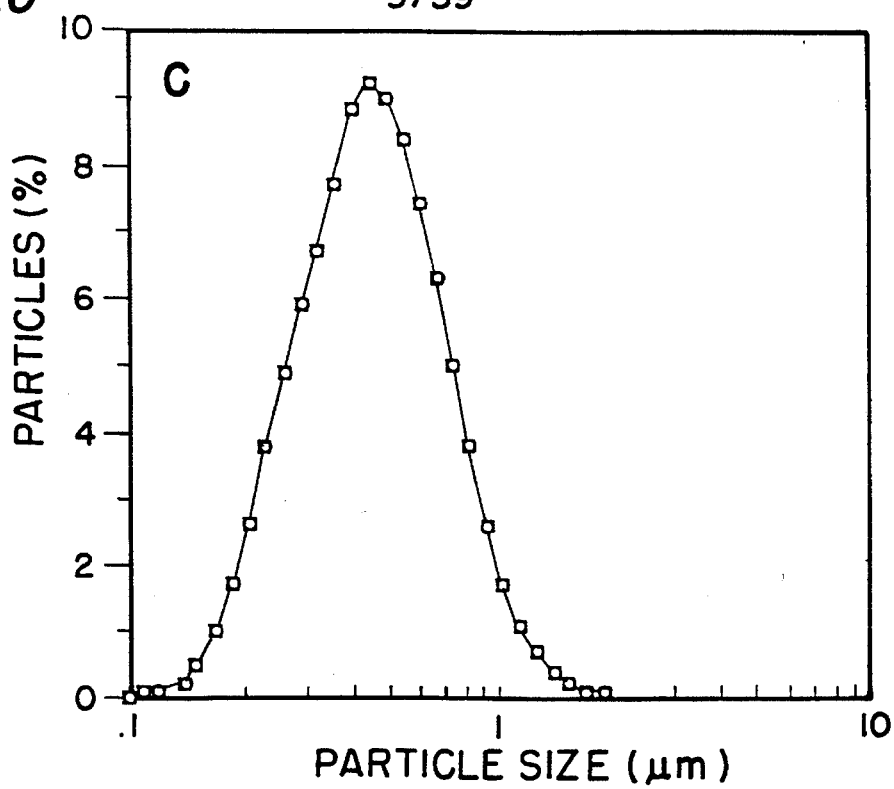
Figure 2D:
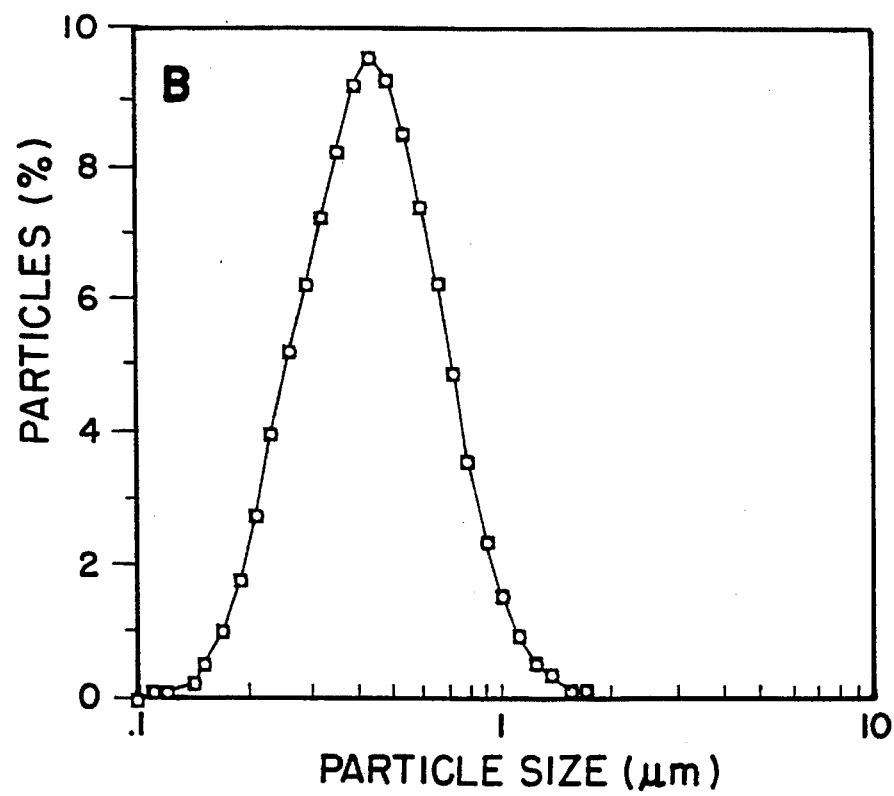

This invention concerns a discovery that natural and safe milk-derived whey proteins are useful in a method for microencapsulation of various core materials. These proteins alone or in combination with milk or non-milk derived carbohydrates are advantageously utilized for microencapsulation of volatile or non-volatile active ingredient cores. Whey protein as microencapsulating agents eliminate risk of safety hazards, occurrence of other undesirable conditions, allow easy handling and storage, provide high stability, protect the encapsulated core from deteriorating factors, allow a high retention of volatiles, limit losses of volatiles from microcapsules, transform liquid cores into dry powders, and generally provide greater versatility of whey protein microencapsulated products.

I. Microencapsulating properties of Whey Proteins

Microencapsulating agents of this invention are solids derived from milk. In particular, these milk derived solids are whey protein concentrates (WPC) and whey protein isolate (WPI). These proteins are commercially available. They are safe and inexpensive, possess properties necessary for microencapsulation of volatile and non-volatile active ingredient cores, and meet requirements for an acceptable microencapsulating agent for microencapsulation of food or other active ingredients.

The microencapsulating agent for food products must be safe and non-hazardous to a consumer health. The agent itself should have a bland flavor because the agent having strong or distinct flavor would change the natural flavor of the encapsulated material. The agent must be able to protect encapsulated cores from factors such as oxygen, water, light or from effects of other compounds, which may cause its deterioration. The agent should allow storing and maintaining the active ingredient core packed within the wall matrix until its final use. Finally, the agent should transform liquid materials into dry powders.

In order to be a practical microencapsulating agent, the agent must also have specific functional properties. Among those most important are emulsification properties, film forming and drying properties, high solubility, ability to release core material on hydration and low viscosity of its concentrated solutions.

The whey proteins of the invention possess to a larger degree the above described properties. Whey protein isolate (WPI) typically contains about 96% protein. Whey protein concentrate (WPC) contains about 50% (WPC50) or about 75% (WPC75) of protein but WPCs with other protein contents are also available and conveniently utilized in this invention. Whey proteins have been found to have very good solubility over broad pH range, good emulsification, and good film forming and drying properties. Composition of WPC and WPI is shown in Table 1.

TABLE 1

| Composition of WPC and WPI used as Wall Materials | | | |
|---|---|---|---|
| | WPI | WPC 50 | WPC 75 |
| Protein (%) | 95.40 | 51.50 | 76.50 |
| Ash (%) | 1.84 | 5.20 | 3.50 |
| Fat (%) | — | 4.40 | 4.50 |
| Lactose (%) | — | 37.10 | 11.50 |
| Moisture (%) | 2.68 | 1.80 | 4.00 |

Microencapsulating properties of whey proteins were evaluated using anhydrous milkfat, orange essential oils, and volatiles as model core materials. Each of these materials represent a different group of materials sensitive to various extraneous types of deterioration. Whey proteins provide means for their successful microencapsulation.

In the development of this invention both WPI and WPC of different concentrations were evaluated for their microencapsulating properties using spray-drying as the microencapsulation method. Additionally, whey proteins were combined with milk derived carbohydrates, such as lactose, or with non-milk derived carbohydrates such as maltodextrins having different dextrose equivalence value, corn syrup solids, and with carbohydrate based commercial microencapsulating agents. A synergistic effect of these compositions was evaluated.

II. Active Ingredients Forming a Core

A process and method of the current invention is suitable for encapsulation of any material which can form emulsion or suspension with whey proteins and which can be microencapsulated in whey proteins. Typically, such core materials are either volatile or non-volatile active ingredients, as defined in Definitions. Examples of these materials are milk constituents, such as anhydrous milkfat, other food ingredients, volatiles, vitamins, fragrances, nutritional compounds, natural colorants and oleoresins, flavor and aroma compounds, fats and oils, pharmaceuticals, cosmetics and cosmetic ingredients.

Additionally, any material that can be emulsified or dispersed either alone or in combination with other material(s) into whey proteins containing solution, is intended to be within the scope of this invention.

These materials form a core to be microencapsulated. The concentration (load) of cores used for microencapsulation depends on the active ingredient and is typically from about 5% to about 95% (w/w), preferably from 10% to about 75% (w/w) of the dry wall solids. Concentrations of non-volatile ingredients, such as anhydrous milkfat are preferably between 10% and 75% (w/w) of wall dry solids. A load of volatiles and essential oils are preferably from about 5% to about 75% (w/w) of wall solids.

III. Microencapsulation Process

Microencapsulation is a commonly used technique for coating active ingredients cores by which liquid droplets or solid core particles are coated with or packed into thin films of microencapsulating agents. The current microencapsulation technique which utilizes whey proteins microencapsulation agents is particularly useful for encapsulation of volatile or non-volatile materials that can be emulsified into whey protein based or whey protein containing wall solutions.

These wall solutions form a structure around the active ingredient core called a wall system. The wall system of this invention is formed by the milk derived whey protein isolate or whey protein concentrates alone or in combination with milk derived or non-milk derived carbohydrates.

The wall system formed by microencapsulation protects the core against deterioration by oxygen, or from detrimental effects of other compounds or materials, limits the evaporation or losses of volatile core materials, and releases the core upon full hydration reconstitution.

Currently, the most used, practical and preferred process for microencapsulation of volatile or non-volatile ingredients according to this invention is spray-drying. However, other microencapsulation techniques are equally useful and intended to be within a scope of this invention.

A. Microencapsulation Process

Microencapsulation process of the current invention comprises essentially the following basic steps:

(1) Preparation of a wall system;

(2) optional addition of various additives either to the wall system or to the core system;

(3) mixing of the core system with wall system;

(4) dispersion of the core system in the wall system to form emulsion or dispersion or a combination thereof;

(5) encapsulation by any microencapsulation technique, preferably by spray-drying; and (6) harvesting the microencapsulated product.

Additional steps may be added for large scale processing or as needed for microencapsulation of different core materials.

The microencapsulation process outlined above is suitable and preferred for microencapsulation of all core materials identified above. However, all other methods for microencapsulation that are capable of forming whey protein-containing films around the core particles and allow partial or complete drying of the resulting emulsion or suspension to yield either a dry powder or a suspension of the coated core particles are intended to be within the scope of the invention.

The key to a successful microencapsulation process is the formation of a fine and stable emulsion or suspension in which the core is dispersed in the solution or suspension of the encapsulating wall system. In this emulsion or suspension whey protein containing stabilizing films are formed at the core/wall interfaces. The formation of these films is therefore very important.

Microencapsulation process of the current invention is illustrated in FIG. 1.

As seen from FIG. 1, the first essential step in the microencapsulation process is the preparation of the wall system. This step consists of preparing whey protein containing solutions or suspension that may or may not include other wall constituents or additives. The total wall solids concentration ranges from 0.5% to 80%. In microencapsulation by spray-drying, wall solid concentration is in the range from 5% to 50%, preferably from 10% to 30% of wall solids. Additionally, various additives as defined may be added to the wall system to attain desired characteristics of the wall system.

The core material loads in the range are from about 5% to about 95% (w/w of dry solids), and may include various additives to the core as defined.

Both the wall system and the core system are brought to temperature from about 4° to about 65° C., entrapped air in the form of foam is removed by vacuum or any other means, and the core system is then dispersed in the wall system.

Emulsification or dispersion is carried out by using any dispersing device capable of forming an emulsion and/or dispersion having a mean particle size of 0.1 to 10 µm of the core in the wall system. For microencapsulation by spray-drying, a mean partial size from 0.3 to 0.7 is preferable.

Typically, the dispersion of the core into the wall solution may consists of two stages. In the first stage, a coarse dispersion of the core in the wall system is prepared using any dispersing device which achieves a dispersion similar to that obtained by using Ultra-Turrax T-25 (IKA Works, Cincinnati, OH) homogenizer operated at 10,000 to 35,000 rpm, preferably 13,500 rpm, for 10 seconds to 2 minutes, preferably for 30 seconds. The second stage consists of further dispersion of this coarse dispersion to achieve a mean particle size from 0.1 to 10 µ. The second stage typically consists of one or more, dispersion cycles, using any suitable dispersing device, such as for example a Mini-Lab type 8.3H high pressure homogenizer (APV Rannie, St. Paul, Minn.) operated at 25 to 80 MPa.

In the case of AMF, the emulsion constituents are heated to 35°–60° C., preferably to 50° C., prior to the emulsification and this temperature is maintained throughout the emulsification process. In the case of a volatile core, the emulsion constituents are tempered to 2° C. to 10° C., preferably to 4° C. prior to the emulsification and a temperature of 6° C. to 20° C., preferably of 15° C. is maintained throughout the emulsification process. Wall solutions containing 5% to 30% (w/w) solids are prepared in deionized water at temperature ranging from about 18° C. to about 30° C., preferably at 25° C. and are then deaerated typically at 30° C.–45° C., preferably at 35° C., at 10 to 20 kPa, preferably at 13 kPa, for 1 to 3 hours, preferably 2 hours. The AMF is emulsified into the wall solutions at proportions of 25%, 50%, or 75% (w/w) of wall solids.

The third essential step in the microencapsulation process is spray-drying. Emulsions prepared in step 2 above, are kept under constant stirring at temperatures from 4° C. to about 65° C., preferably at 50° C. for AMF and 4° C. for volatile core, respectively, prior to spray-drying. Spray-drying procedure is carried out using any suitable spray dryer, such as for example Anhydro Laboratory Spray dryer equipped with feed pump and an atomization device, commercially available from APV Anhydro A/S, Soborg, Denmark.

The dryer having an evaporation rate of 7.5 kg/h, a chamber diameter of 1 m, the height, width, and length of the dryer of 2.6, 1.2, and 1.3 m, respectively, was found to be suitable but other dryers may also be conveniently used. Drying is carried out in the concurrent mode. The emulsions are atomized by the centrifugal atomizer of the dryer operated at 10,000 to 60,000 rpm, and preferably at 50,000 rpm. Drying conditions typically consist of an inlet air temperature of about 100° C. to about 210° C., preferably about 160° C., and of an outlet air temperature from about 50° C. to about 140° C., preferably about 80° C. Spray-dried microcapsules are harvested by collecting the microcapsules in a collecting chamber connected with the spray dryer cyclone or in any other convenient way.

B. Testing of Microcapsules Functionality

Functionality and quality of the microcapsules are tested for microstructure, core content, extractable core, and moisture content. Other tests may be performed depending on the core material or the wall solids used.

The following methods for analysis were used and can conveniently be used for determination of the microencapsulation yield, efficiency, and structure of the microcapsules. Detailed procedures are described in Examples.

The mean particle size of the emulsions was determined using a Malvern Mastersizer MS20 (Malvern Instruments, Malvern, England). A 2 mW He-Ne laser beam (633 nm) and a 45 μm focus lens were used.

The moisture content of the microcapsules was determined gravimetrically after 12 hours of vacuum drying (65° C., 6.7 kPa).

The anhydrous milkfat content of the dry capsules was determined according to the Rose-Gottlieb method (AOAC *Official Methods of Analysis*, 15th ed., Arlington, Va., page 835 (1990)) and was expressed as g core/g dry non-fat solids which was defined as the microencapsulated fat load. The microencapsulation yield (MEY) was defined as the ratio (expressed in %) of microencapsulated fat load to the fat load in the emulsion.

A microencapsulation efficiency (MEE) parameter was defined as the percent of core that could not be extracted from the microcapsules by petroleum ether using a method similar to that described in *J. Food Sci. Technol. Int.*, 25:352 (1988). The exact method is described in Example 2.

Microstructure of the emulsion

For scanning electron microscopy (SEM), emulsion specimens were prepared in agar tubes in a way similar to that described in *Food Microstructure*, 3:197–198 (1984). The detailed procedure is described in Example 3.

Cryo-scanning electron microscopy (C-SEM)

Cryo-scanning electron microscopy was carried out according to procedure described in Example 3.

Transmission electron microscopy (TEM)

Transmission electron microscopy was carried out by the procedure described in Example 3.

Microstructure of spray-dried microcapsules

The inner and outer structures of the microcapsules were studied by scanning electron microscopy. Specimen preparation procedures for the examination of the outer topography of the microcapsules were those described in *Food Microstructure*, 7:15–23 (1988). The detailed description of the procedure is described in Example 3.

The primary aim of the microencapsulation is a retention of the highest possible quantity of the core material without losses. To achieve this, the effective microencapsulation requires formation of capsules of high physical integrity wherein the active ingredient core material is completely surrounded and protected by the wall system. The functionality of any microencapsulated system is critically dependent on the structural features of capsules, on the yield of the encapsulation and on the encapsulation efficiency. In addition, both the flowability and the wettability of the final powder product are affected by the outer topography of the microencapsulated powder particles.

C. Microencapsulation Process Conditions

Success in microencapsulation and the properties of the microcapsules are dependent upon a wise selection of composition and process parameters.

In case of spray-drying, major considerations are microencapsulation yield and microencapsulation efficiency which depend on microencapsulation process conditions and parameters, wall solids concentration, wall solids type, core load and properties, emulsion characteristics, atomization conditions, and drying conditions, that is, inlet and outlet air temperatures.

a. Temperature

In general, up to a certain level, an increase in the inlet air temperature increases the retention of microencapsulated core. This effect of the higher temperature is attributed to the shorter time needed for the formation of the dry surface around the drying droplets due to higher drying rates.

b. Wall Solids Concentration

Core retention, drying rate, and the structure of the capsules are affected by wall solids concentration. In general, up to a certain level increasing wall solids concentration is advantageous.

c. Viscosity

The viscosity of the emulsion has a profound effect on the encapsulation process. Whey proteins solutions generally have low viscosity which is preferred for encapsulation by spray-drying. At high viscosities, interference with the atomization process leads to the formation of large droplets with elongated rather than spherical shape. Such phenomena adversely affect the drying rate and hence the retention of the core material during the microencapsulation by spray-drying.

d. Particle Sizes

Small particle size of the dispersed phase favors the retention of the core during the microencapsulation by spray-drying, and limits the formation of surface oil. No evidence has been found that using the current method of microencapsulation, substantial amounts of core material exist as the surface oil.

D. Recovery of Microencapsulated Product

The microencapsuled powders are easily recovered at the end of the microencapsulation.

Recovered microencapsulated product is stored in storage tanks or packaged-ready for intended use. For the actual use, the product is used either in dry form or is rehydrated with an appropriate amount of water or other fluid.

The method of this invention overcomes previously encountered problems observed during various attempts to prepare dairy powders with high fat content of 75%. These attempt invariably resulted in difficulties in recovering the substantial amount of the powder from the spray dryer and sticky powder. The prior problems were attributed to the formation of a fat layer on the outer surfaces of the powder particles.

In developing the present invention, structural features, that is the particle size distribution of the core in the wall solution prior to spray-drying have been thoroughly studied and evaluated. As discussed above, the viscosity of the emulsion and particle sizes of the dispersed phase are very important for retention of the core during microencapsulation.

A. Particle Size Distribution in Whey Protein Stabilized, AMF Containing Emulsions The first stage in the microencapsulation process is the formation of a fine emulsion of the core material in the wall solution. Particle size distribution of the core material in the wall solution, prior to spray-drying is of appreciable importance for the microencapsulation yield and efficiency. Particle size distributions of WPI and WP50 stabilized AMF containing emulsions was studied using different homogenization conditions. Anhydrous milkfat was used as core material. Results are presented in FIGS. 2 and 3.

FIG. 2 shows the representative spectra of particle size distribution in emulsions consisting of 25% (A and C) (w/w) and 50% (w/w) (B and D) anhydrous milkfat emulsified in 10% and 20% WPI (FIGS. 2A and 2B, respectively) and 10% and 20% WPC50 (FIGS. 2C and 2D, respectively) stabilized emulsions. For the emulsions presented in FIG. 2, the second emulsification stage consisted of 4 successive passes through the homogenizer operated at 50 MPa.

The results presented in FIG. 2 are typical for emulsions prepared by 4 successive passes through the homogenizer at 50 MPa. In all cases, a uni-modal particle size distributions, similar to those presented in FIG. 2 were observed for all three wall materials, that is for WPI, WPC50, and WPC75, regardless of wall material solids concentration (in the emulsion) or AMF load.

The mean particle size in these emulsions ranged from 0.3 to 0.6 μm. No associated adverse effects were detected as a function of wall material composition.

The viscosity of the emulsion that exhibited a bimodal particle size distribution was high and the emulsions had a paste-like consistency. Emulsion viscosity and particle size distribution have significant effects on microencapsulation by spray-drying. High viscosities interfere with the atomization process and lead to the formation of large, elongated droplets that adversely affect the drying rate and the retention of core during the drying process. Additionally, after drying such droplets, when in the dry state may adversely affect the flow properties of the powder.

Figure 3:
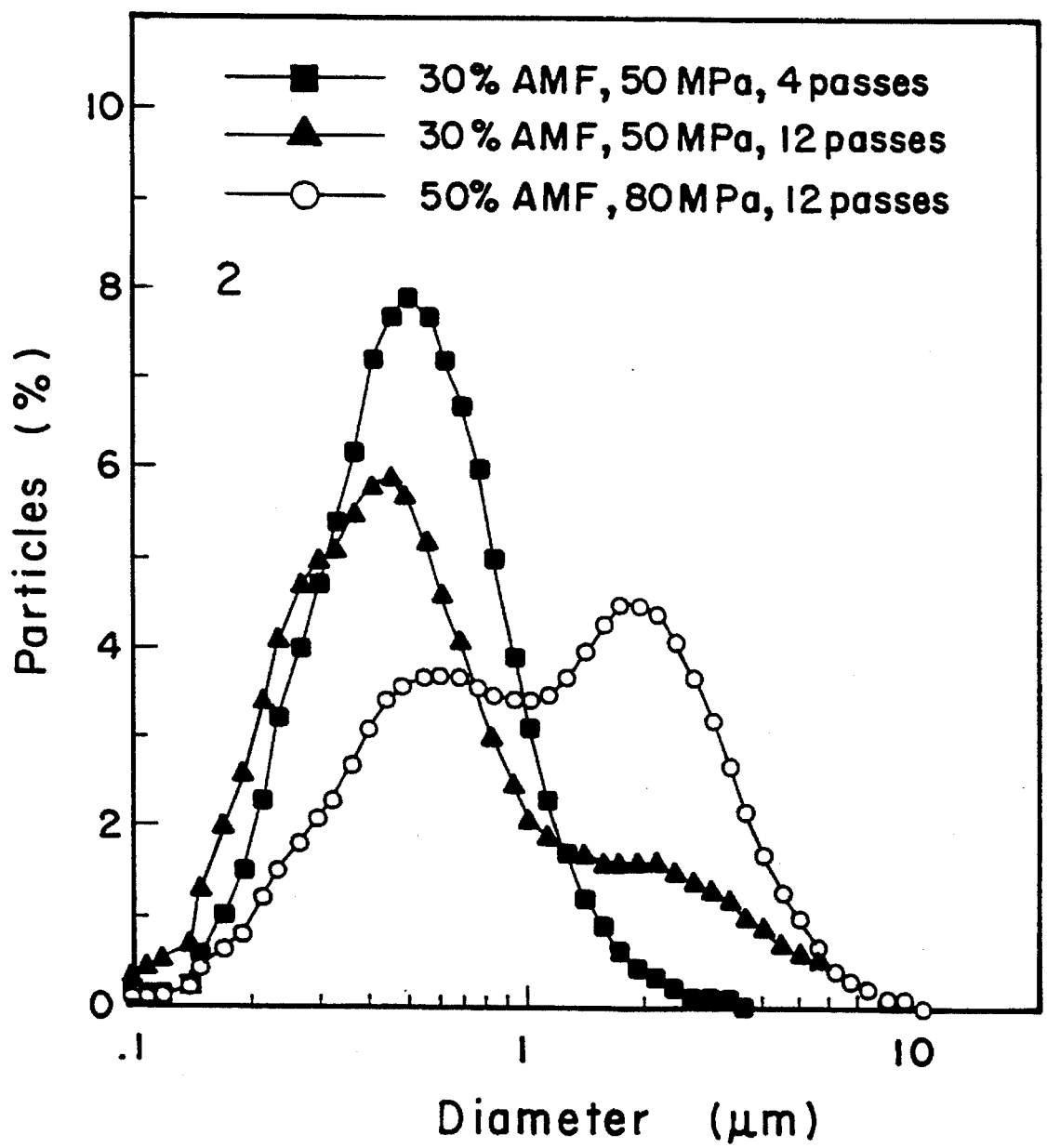
FIG. 3 illustrates particle size distribution of WPI/AMF emulsions of different fat loads prepared under different homogenization conditions.

FIG. 3 shows representative particle size distributions of 30% and 50% (w/w of wall solids) AMF emulsified in 5% (w/w) WPI. For the emulsions presented in FIG. 3, the second emulsification stage consisted of 4 or 12 passes through the homogenizer operated at 50 or 80 MPa.

The results presented in FIG. 3 reveals a broad and bi-modal particle size distribution of AMF in emulsions prepared by 12 successive homogenization steps at 50 or 80 MPa. However, the emulsion prepared by 4 successive homogenization steps at 50 MPa exhibited a uni-modal particle size distribution with a mean particle size of 0.4 μm. Similar results were obtained for emulsions containing 10% to 30% (w/w) WPI and 25% to 75% (w/w of wall solids) AMF.

In order to attain a small mean particle size of the AMF while maintaining low viscosity, two to six, preferably four, successive homogenization passes through homogenizer operated at 30 to 80, preferably 50 MPa, were found to be optimal for preparing the emulsions prior to spray-drying.

B. Microstructure of AMF Containing, WPI Stabilized Emulsions

A successful microencapsulation process is dependent upon the formation of a fine emulsion in which the encapsulated material (the core) is dispersed in a solution of the encapsulating (wall) agent. Essential to that, in the case of whey protein stabilized emulsion, is the formation of whey protein stabilizing films at the core/wall interfaces. In developing the present invention, structural features, that is the microstructural characteristics of WPI-stabilized, AMF containing emulsions have been investigated.

In order to avoid misinterpretation of structural details due to specimen-preparation-related artifact, three independent electron microscopy techniques, that are scanning electron microscopy (SEM), cryo-scanning microscopy (cryo-SEM), and transmission electron microscopy (TEM) as described in Example 3, have been used to investigate the microstructural characteristics of the emulsions. Representative results of this study are presented in FIGS. 4, 5, 6, and 7.

The microstructures of emulsions presented in FIGS. 4, 5, 6, and 7 are of the emulsions shown in FIG. 3. FIG. 4A is a representative cryo-SEM micrograph of an AMF/WPI emulsion. The emulsion consisted of 5% (w/w) WPI and 30% (w/w of dry wall solids) AMF. Emulsion preparation was as discussed above for the preparation of emulsions for particle size distribution determination as seen in FIG. 3, and in this case consisted of 4 successive homogenization passes through the homogenizer operated at 50 MPa. Films of whey proteins (PM) around the solidified AMF (SF) as well as unfractured, protein-coated fat droplets (UFD), and empty whey protein film (EPM) are clearly visible. The micrograph reveals both intact and fractured milkfat droplets coated with a WPI layer.

Figure 4A:
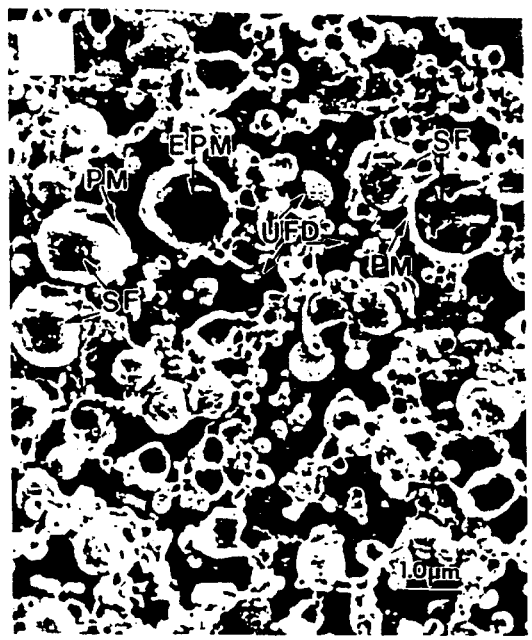
FIGS. 4A through 4C are micrographs of WPI/AMF emulsions.

FIG. 4A reveals the spherical shape of the AMF droplets in the emulsion.

The particle-size distribution of the emulsion as analyzed immediately after homogenization (four passes at 50 MPa) exhibited a normal distribution of AMF droplets with a mean diameter of 0.4 μm (FIG. 3). The dimensions of the droplets as observed microscopically (FIG. 4A) are in agreement with those determined using the laser beam device as described in Example 4.

Figure 4B:
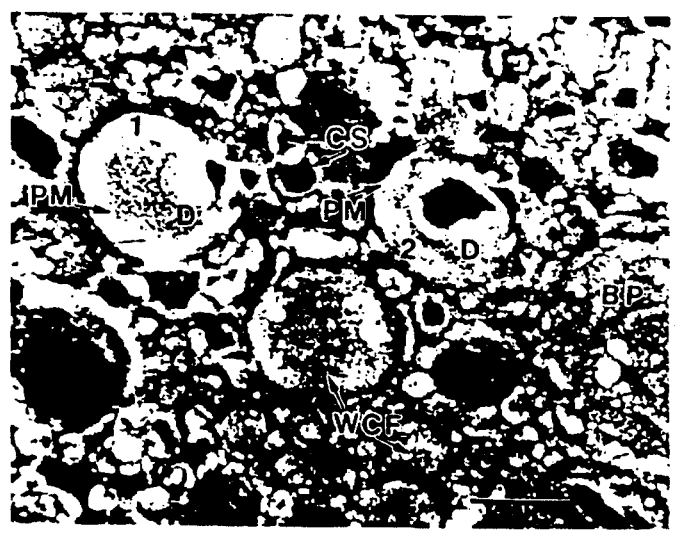
Figure 4C:
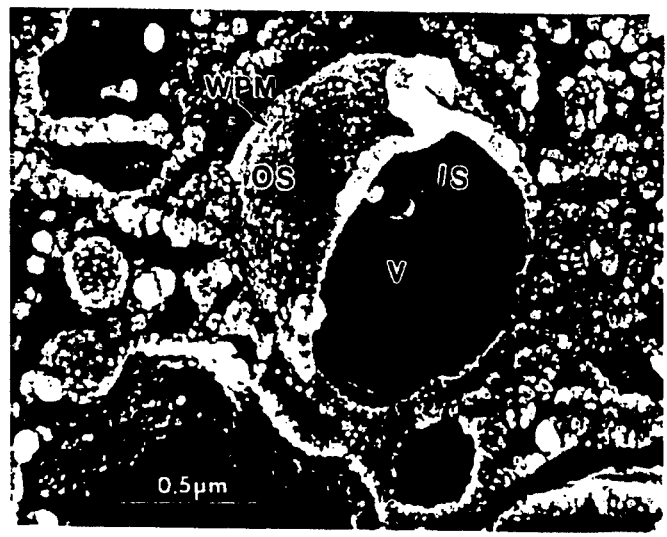

FIGS. 4B and 4C are representative micrographs of chemically fixed emulsion specimens prepared from WPI-stabilized, AMF containing emulsions. WPI concentration in the emulsion is 5% (w/w) and AMF load is 30% (w/w of wall solids). Emulsification was performed in 4 successive passes through the homogenizer operated at 50 MPa.

FIG. 4B reveals the structural features of a typical emulsion specimen observed at relatively low magnification and shows protein films (PM) around the milkfat droplets, whey protein coated AMF droplet (WCF), damaged protein film (D), protein film (PM), bulk whey proteins (BP), and a cross-section (CS) through a protein-coated fat droplet from which fat has been removed. 1 and 2 are reference numbers given to each droplet.

FIG. 4C shows a large part of a WPI coated AMF droplet from which the fat has been removed during the specimen preparation steps. The micrograph reveals the features of a continuous WPI film that is 50–100 nm thick and granular in nature. The existence of this film and its granular nature correspond to the structural details revealed by cryo-SEM shown in FIG. 4A. These structural details further indicate and verify the adsorption and aggregation of WPI at the AMF interface to form a continuous stabilizing film.

Figure 5:
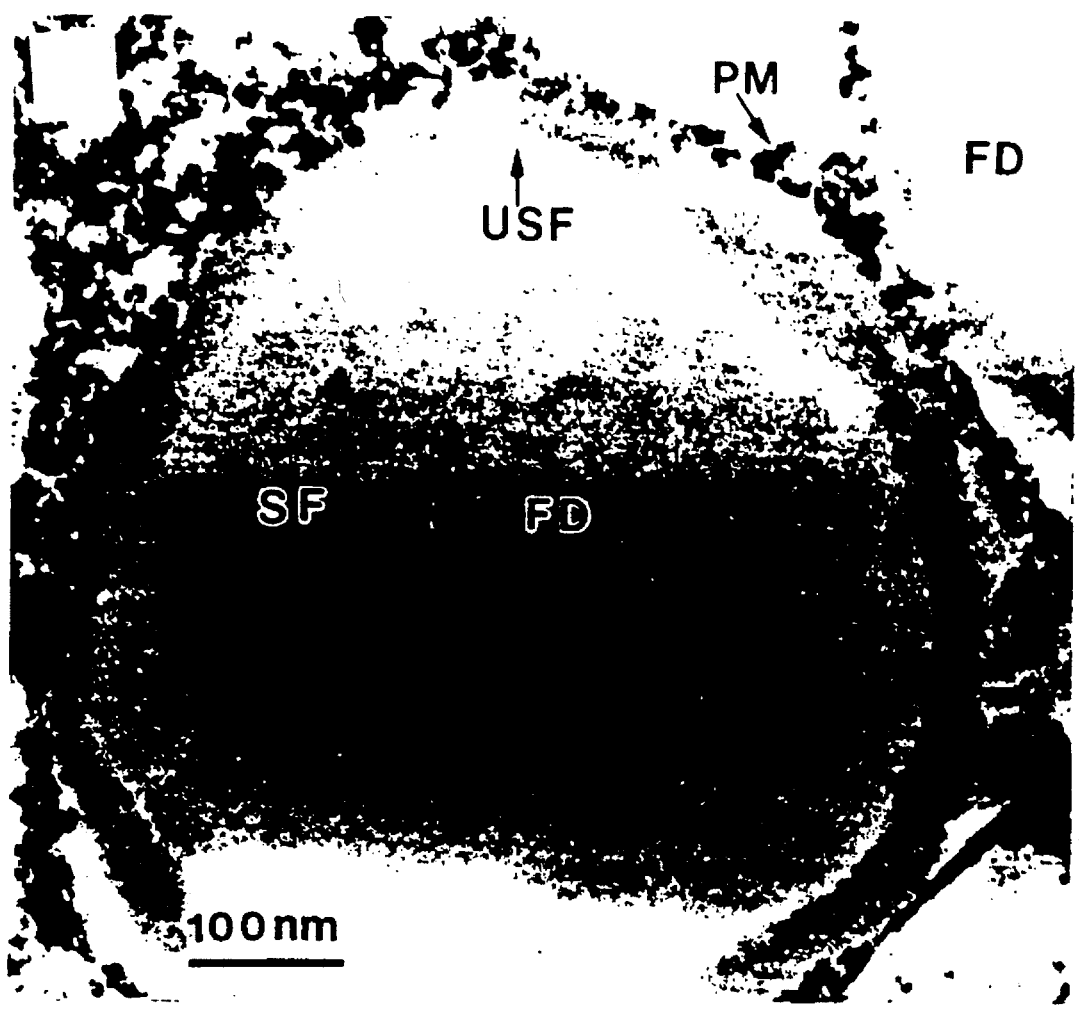
FIG. 5 is a transmission electron micrographs of a clustered emulsion revealing sharing of protein layers at the interfaces of fat droplets, and the structural details of the protein film shared by two fat droplets.

FIG. 5 is a representative TEM micrograph of an emulsion specimen prepared from a 5% (w/w) WPI stabilized, 30% (w/w of wall solids) AMF containing emulsions prepared by 4 successive passes through the homogenizer operated at 50 MPa. Continuous, well defined WPI film (PM) are observed around the AMF droplet (FD), and the aggregated nature of the protein film adsorbed to the AMF droplet is evident. The structural features revealed in the TEM micrograph are in agreement with those that can be seen in both the SEM and the cryo-SEM micrographs.

FIG. 6 is a scanning electron micrographs revealing clustering in WPI/AMF emulsions. Visible are clustered protein-coated AMF droplets (C), protein films (PM), sharing phenomenon (S), fractured, WPI-coated AMF droplets (FD), fat removed.

Figure 6A:
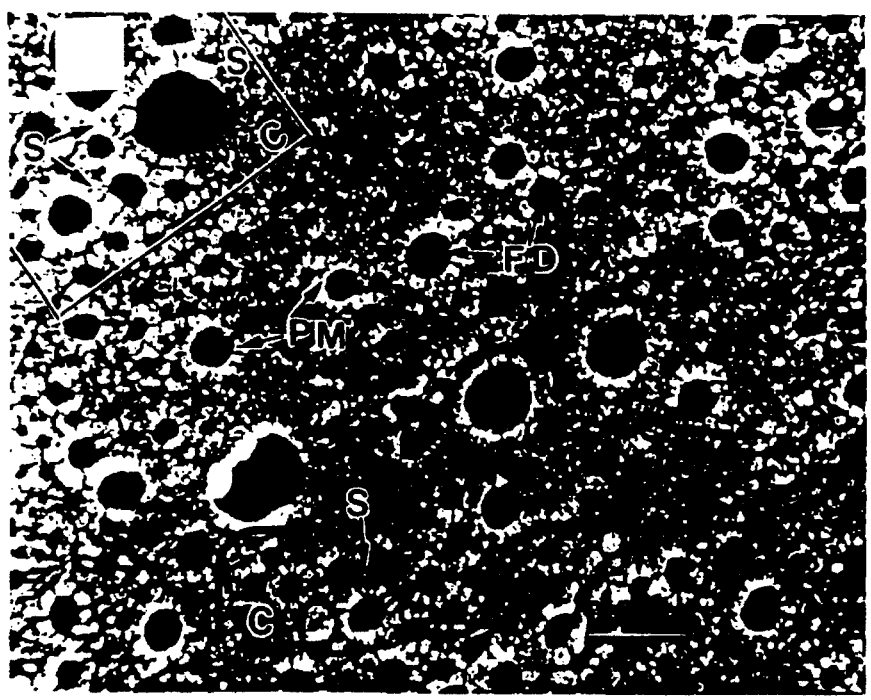
FIG. 6A and 6B are scanning electron micrographs revealing clustering in WPI/AMF emulsions.
Figure 6B:
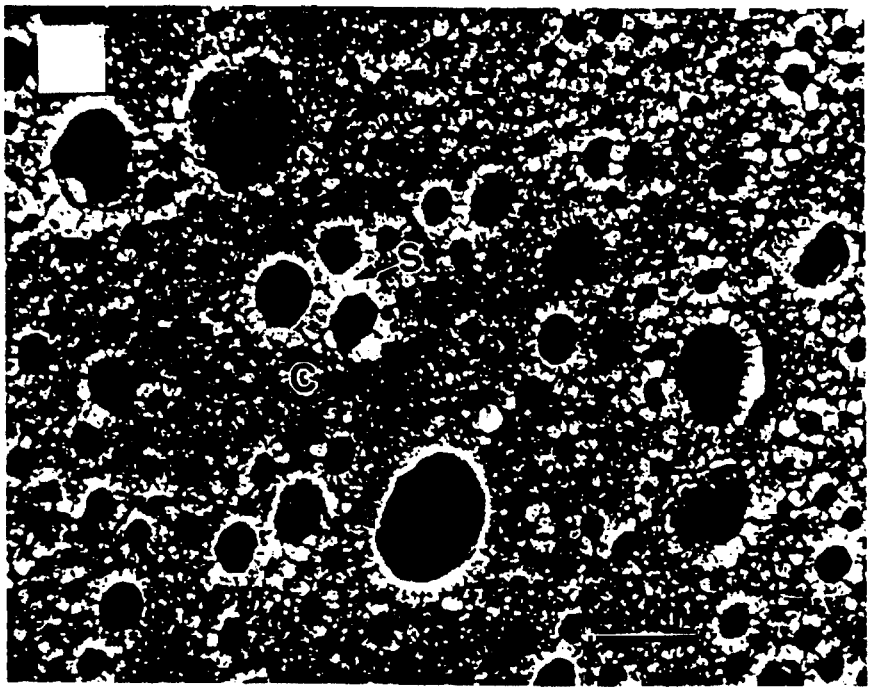

FIG. 6A and 6B are representative micrographs revealing the structural details of AMF containing 30% and 50% (w/w of wall solids) for 6A and 6B, respectively emulsions stabilized by 5% (w/w) WPI that were prepared using 12 successive passes through the homogenizer operated at 80 and 50 MPa, respectively. The particle size distribution of these emulsion is presented in FIG. 3. The structural details in these micrographs revealed clusters (C) of AMF droplets in which are seen sharing phenomena (S), that is cases in which two or more AMF droplets share a given WPI film at their interface. The existence of a sharing phenomena in these cases is also evident in the TEM micrograph of an emulsion specimen prepared from the same emulsion as presented in FIG. 6, shown in FIG. 7.

Figure 7:
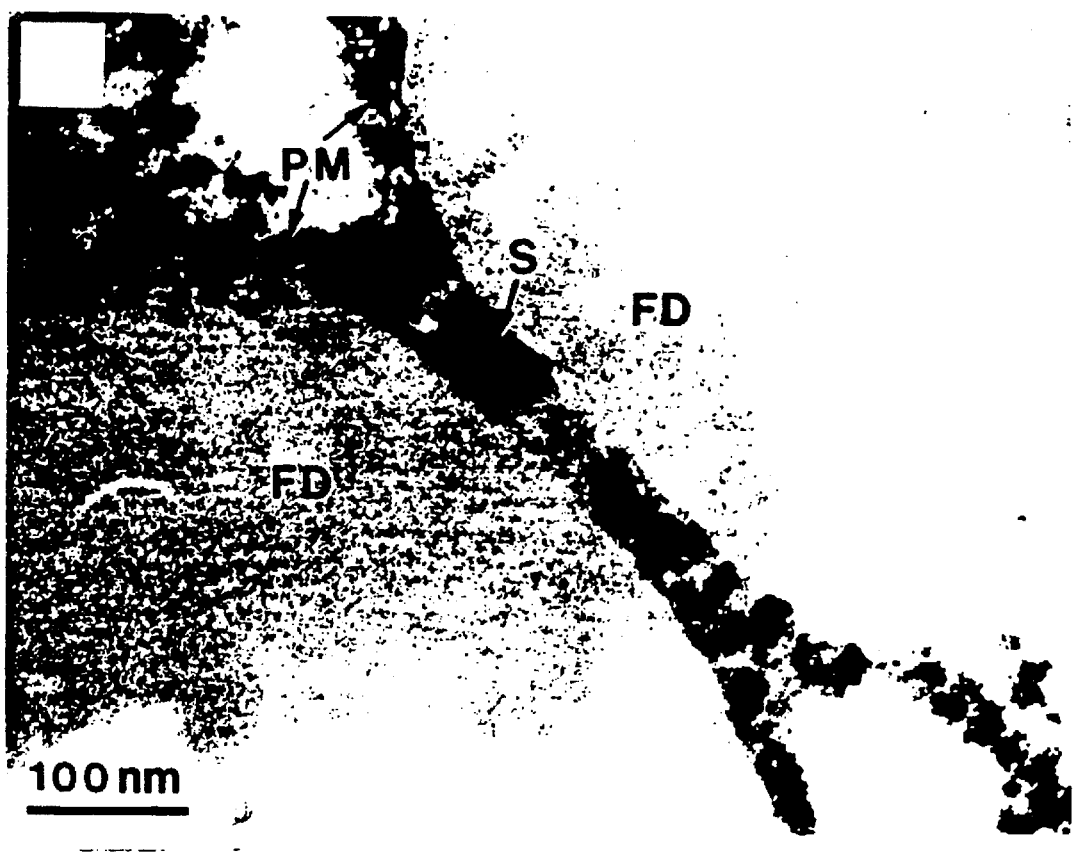
FIG. 7 shows unsaturated fraction of AMF and saturated fraction of AMF.

FIG. 7 shows unsaturated fraction of AMF and saturated fraction of AMF. Visible are protein films (PM), fat droplet (FD), sharing (S) phenomenon. The aggregated nature of the WPI layer at the interface is evident.

The microstructural characteristics observed in FIG. 7 clearly indicate the existence of a sharing phenomenon, where two AMF droplets (FD) share the one WPI film (S). These emulsions were characterized by broad, and bi-modal particle size distributions similar to those shown in FIG. 3. No structural evidence indicating coalescence, that would have resulted in AMF droplets larger than 1 μm, was seen. The bi-modal particle size distribution in these cases in due to the sharing phenomena that resulted in clustering of AMF droplets.

FIG. 4C is a scanning electron micrograph of a WPI/AMF emulsion sample revealing a large part of WPI membrane. Visible are whey protein film (WPM), outer surface of the protein film (OS), inner surface (IS) of the protein membrane, and void (V) that represents where milkfat was located. Results similar to those presented in FIGS. 4, 5, and 6 were found for all three wall materials that is for WPI, WPC50, and WPC75.

As pointed out above, the formation of a fine emulsion of the core material in the wall solution is essential to microencapsulation. The formation of stabilizing films by the wall materials at the wall/core interfaces is of great importance. The results shown in FIGS. 4, 5, and 6 clearly indicate the formation of stabilizing WPI films at the AMF/WPI interfaces and the effect of homogenization conditions on the particle size distribution and structural characteristics of WPI stabilized, AMF containing emulsions. The results of this part of the invention clearly demonstrate the suitability of whey proteins as microencapsulating agents capable of forming stabilizing films at the core/wall interfaces in the emulsion.

In order to attain a small mean particle size of the AMF while avoiding clustering of AMF droplets, two to six, preferably four, successive homogenization passes through homogenizer operated at 30 to 80, preferably at 50 MPa, were found to be optimal for preparing the emulsions prior to spray-drying.

C. Microencapsulation Yield

Microencapsulation yield (MEE) represents a degree of retention of the active ingredient, that is the core, within the microcapsule during the microencapsulation process. The retention of the core material and the final content of the core in the dry microcapsules are of great practical importance and are therefore important determinants when wall materials or microencapsulation processes are being evaluated. The most practical and useful microencapsulation process will result in small or no losses of the encapsulated core during the process.

Among the most important process variables affecting the retention of the core in microencapsulation by spray-drying are the choice and concentration of the wall solids, the mass ratio of wall to core, physicochemical properties of the wall and core components, physical properties of the emulsion prior to drying, and drying conditions. High drying rates that lead to a fast formation of a dry crust around the drying droplets favor high retention as long as no structural damage is introduced.

In determining the optimal conditions for microencapsulation of individual active core materials, the effect of the encapsulating agent composition, that is WPI, WPC50, or WPC75, the concentration of wall solids in the emulsion prior to drying, typically ranging from 10% to 30% (w/w), and the proportion of core to the wall system in the emulsion, typically ranging from 25% to 75% (w/w of wall solids), on the encapsulation yield were studied.

Table 2 illustrates the effect of wall material type and concentration (wall system) and of fat (anhydrous milkfat, AMF) load on the microencapsulation yield for the three whey proteins, that is WPI, WPC50, and WPC75.

TABLE 2

Microencapsulation Yield (%) for AMF Microencapsulated in Whey Proteins
MICROENCAPSULATION YIELD[1]

| WALL SYSTEM | 25% AMF[2] | 50% AMF[2] | 75% AMF[2] |
|---|---|---|---|
| | (%) | | |
| 10%[3] WPC50[4] | 96.1[b] | 98.7[a] | 98.4[a] |
| 20% WPC50 | 96.8[ab] | 91.3[c] | 97.5[a] |
| 30% WPC50 | 96.6[ab] | 97.4[ab] | — |
| 10% WPC75[5] | 97.3[ab] | 98.6[ab] | 97.4[a] |
| 20% WPC75 | 96.5[ab] | 98.9[a] | 97.3[a] |
| 30% WPC75 | 99.6[a] | 98.3[ab] | 96.8[a] |
| 10% WPI[6] | 92.5[c] | 97.3[ab] | 95.6[a] |
| 20% WPI | 99.0[ab] | 95.1[b] | 95.6[a] |
| 30% WPI | 99.2[ab] | 96.8[ab] | — |

[a,b,c]Means in the same column with like letters are not significantly different ($P > 0.05$)
[1]The ratio (percentage) of microencapsulated fat load to the fat load in the emulsion
[2]Anhydrous milkfat proportion in the emulsion (w/w of wall solids)
[3]Percentage (w/w) of wall solids in wall solution
[4]Whey protein concentrate with 50% protein
[5]Whey protein concentrate with 75% protein
[6]Whey protein isolate Table 2 clearly shows that in all cases, that is for all three wall materials and for all AMF loads, MEY values were higher than 90%. Except for two cases, 20% WPC50 with 50% AMF, and 10% WPI with 25% AMF, all MEY values were higher than 95%.

At an AMF load of 25%, the MEY ranged between 92.5 and 99.6%. The highest MEY was obtained with 30% WPC75 as wall material and similar retention levels were obtained with 20% and 30% (w/w) WPC50 or WPI. The lowest MEY was obtained with a wall solution consisting of 10% WPI.

At an AMF load of 50%, the MEY ranged between 91.3% and 98.95%. The highest MEY was observed for systems containing 10% or 30% WPC50; 10%, 20% or 30% WPC75; or for those containing 10% or 30% WPI.

At the highest AMF load, that is 75% (w/w) of wall solids, the MEY ranged between 95.6 and 98.4%, and no significant differences between the different whey protein wall systems were detected ($P>0.05$).

The results clearly indicate that all three wall materials, that is WPI, WPC50, and WPC75 are suitable as microencapsulating agents for AMF or other similar cores. The results further indicate that in most cases, retention levels higher than 95% can be achieved. Although the highest MEY level (99.6%) was achieved for a system consisting of 25% AMF and 30% WPC75, all other whey protein-based wall systems had microencapsulation yield ranging from 91% to 99%.

D. Microencapsulation Efficiency

Microencapsulation efficiency (MEE) in this invention represents the proportion of core that could not be extracted from the dry capsules by the extraction solvent, such as petroleum ether, under the test conditions.

Figure 8:
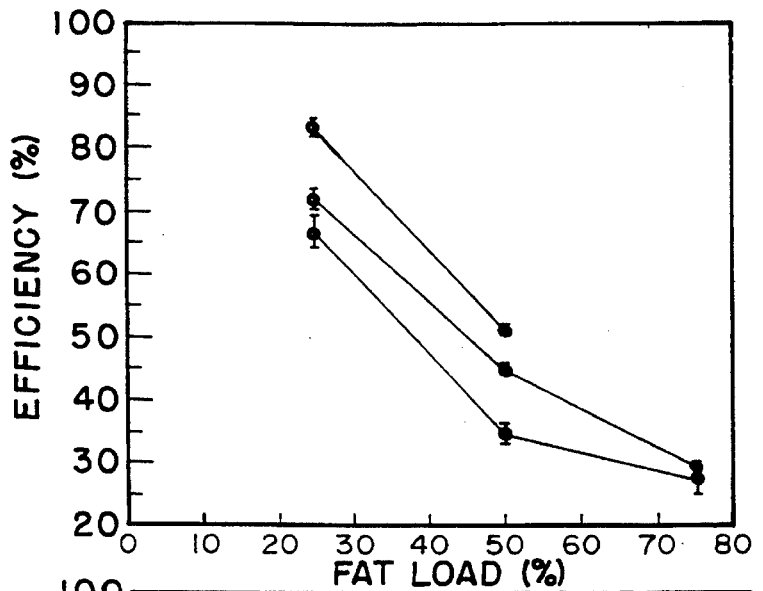
FIG. 8 illustrates effect of solution solids concentration and anhydrous milkfat load on the microencapsulation efficiency.
Figure 9:
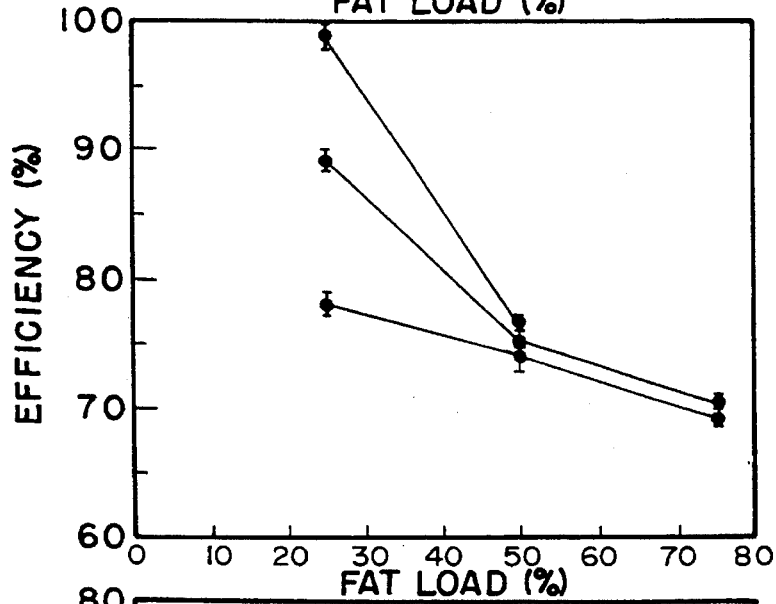
FIG. 9 illustrates effect of solution solids concentration and anhydrous milkfat load on the microencapsulation efficiency.
Figure 10:
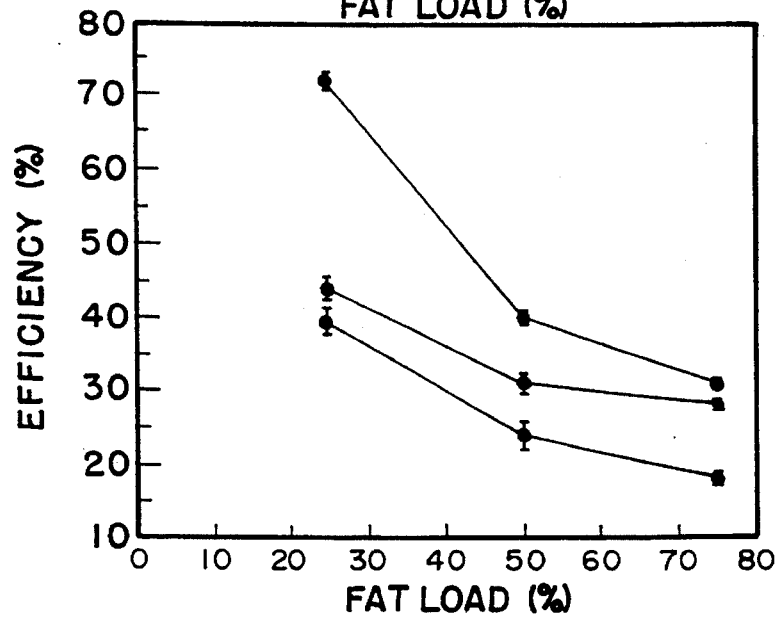
FIG. 10 illustrates effect of solution solids concentration and anhydrous milkfat load on the microencapsulation efficiency.

The effects of wall solids type, wall solids concentration and of anhydrous milkfat load on the efficiency is presented in FIGS. 8, 9, and 10 for WPI, WPC50, and WPC75, respectively.

FIG. 8 illustrates the MEE of WPI-based, AMF containing microcapsules. Wall material was whey protein isolate. Wall solution solids concentration were 10% (wt/wt; -●-), 20% (wt/wt; -▲-), and 30% (wt/wt; -■-). Each data point represents the mean of observations on four preparations. Bars represent standard errors of the means. AMF load in the emulsion, prior to drying is from about 25% to 75% (w/w of dry wall solids) and wall solids concentration, in the emulsion prior to drying, is from 10% to 30% (w/w). Regardless of AMF load, increasing the WPI concentration in the emulsion resulted in higher MEE of the dry capsules. The MEE of capsules prepared from emulsions containing 10% WPI exhibited MEE values of 67%, 35%, and 28% for AMF loads of 25%, 50%, and 75%, respectively. Microcapsules prepared from emulsions containing 20% (w/w) WPI exhibited MEE values of 72%, 45%, and 31% for AMF loads of 25%, 50%, and 75%, respectively. MEE of microcapsules prepared from emulsions containing 30% WPI exhibited MEE values of 83% and 52% for AMF loads of 25% and 50%, respectively.

FIG. 9 illustrates the MEE of WPC50-based, AMF containing microcapsules. Wall material was whey protein concentrate 50 (50% protein). Wall solution solids concentrations were 10% (wt/wt; -●-), 20% (wt/wt; -▲-), and 30% (wt/wt; -■-). Each data point represents the mean of observations on four preparations. Bars represent standard errors of the means. AMF load in the emulsion, prior to drying, was from about 25% to 75% (w/w of dry wall solids) and wall solids concentration, in the emulsion prior to drying, was from 10% to 30% (w/w). Regardless of AMF load, increasing the WPC50 concentration in the emulsion resulted in higher MEE of the dry capsules. In all cases, increasing the WPC50 concentration in the emulsion resulted in higher MEE values of the dry capsules. For all three wall solids concentrations, increasing AMF loads adversely affected the MEE, at a given WPC50 concentration. Microcapsules prepared from emulsions containing 10% WPC50 exhibited MEE values of 78%, 74%, and 69% for AMF loads of 25%, 50%, and 75%, respectively. Microcapsules prepared from emulsions containing 20% WPC50 exhibited MEE values of 87%, 76%, and 71% for AMF loads of 25%, 50%, and 75%, respectively. Microcapsules prepared from emulsion containing 30% WPC50 exhibited MEE values of 98%, and 77% for AMF loads of 25% and 50%, respectively.

FIG. 10 illustrates the MEE of WPC75-based, AMF containing microcapsules. Wall material was whey protein concentrate 75 (75% protein). Wall solution solids concentrations were: 10% (wt/wt; -●-), 20% (wt/wt; -▲-), and 30% (wt/wt; -■-). Each data point represents the mean of observations on four preparations. Bars represent standard errors of the means. AMF load in the emulsion, prior to drying was from about 25% to 75% (w/w of dry wall solids) and wall solids concentration, in the emulsion prior to drying, was from 10% to 30% (w/w). Regardless of AMF load, in all cases, increasing the WPC75 concentration in the emulsion resulted in higher MEE values of the dry capsules. Microcapsules prepared from emulsions containing 10% WPC75 exhibited MEE values of 40%, 24%, and 18% for AMF loads of 25%, 50%, and 75%, respectively. Microcapsules prepared from emulsions containing 20% WPC75 exhibited MEE values of 44%, 32%, and 29%, respectively. Microcapsules prepared from emulsions containing 30% WPC75 exhibited MEE values of 72%, 40%, and 31%, respectively.

The results indicated that the microencapsulation efficiency of the WPC50 containing capsules was superior to those of the WPI and WPC75 containing microcapsules and that the MEE of the WPI based microcapsules was superior to that of the WPC75 containing microcapsules. The superiority of WPC50 over the two other whey protein based wall systems is attributed to the relatively high (37%) lactose content that act as a hydrophilic sealant. Such hydrophilic sealant limits the diffusion of the solvent, petroleum ether, through the microcapsule wall and thus significantly limits the extraction of AMF. The superiority of WPI over WPC75 is attributed to the higher hydrophobicity of the latter as a result of its 8% lipid type constituents. The higher hydrophobicity enhances the diffusion of petroleum ether through the wall of the microcapsule and thus increases the proportion of extracted AMF.

The results indicate that although the highest MEE was achieved with WPC50, all three whey protein-based wall systems, that is WPI, WPC50, and WPC75 are suitable as wall systems in the microencapsulation of anhydrous milkfat. The differences observed regarding the extractability of the AMF core highlight differences in the wall functionality that is affected by wall composition. The proportion of lactose and of milkfat and other hydrophobic residuals associated with the different whey protein wall systems, that is WPI, WPC50, and WPC75, are of major importance. The results indicate that the proportion of extractable AMF can be limited in wall systems containing both whey proteins and at least 37% lactose.

The effect of lactose on MEE indicate its effect on the diffusion of an apolar compounds through the microcapsule wall matrix. In developing this invention, the proportion of AMF that can be extracted by petroleum ether as a function of the extraction time was studied. Microcapsules prepared from an emulsion consisted of 20% (w/w) WPI and 25% (w/w of wall solids) AMF that was dried at inlet and outlet air temperature of 160° C. and 80° C., respectively, were extracted as described above for 1 to 600 minutes. The proportion of AMF extracted from the capsules increased as a function of time. 18% and 31% of the encapsulated AMF were extracted after 1 and 600 minutes, respectively. This time dependent phenomenon, and the high solubility of AMF in the extracting solvent, shows that the proportion of AMF that is extracted from the microcapsules represents not only the proportion of AMF present on the microcapsule surface but also a fraction of the microencapsulated AMF extracted from the interior parts of the microcapsules by a leaching process.

In order to extract AMF from interior parts of the microcapsules, the solvent must diffuse through the wall matrices, reach the AMF droplets embedded in the wall, dissolve part of the AMF. The AMF in the solvent then must diffuse back through the wall. The results presented above indicate that diffusion, or migration, of an apolar substance through the whey protein-based wall matrix is possible and that its extent depends on the proportion of lactose included in the wall system. In general, as will be shown in Section V, increasing the proportion of lactose in the wall system limits the diffusion of an apolar substance through the wall matrix. This effect of lactose (in its amorphous state) is due to its role as an hydrophilic sealant, or filler that enhances the overall hydrophilicity of the wall system.

Although AMF is not likely to migrate through the capsule's wall during storage, such migration could occur when apolar substances of relatively low molecular mass such as aroma compounds would be microencapsulated in whey proteins. This migration could result in losses and deterioration of the core material. In such cases, the addition of lactose will restrict the diffusion of apolar substances through the wall.

The results highlight the importance of selecting whey protein-based wall material that contains minimal proportions of lipid or lipid like milk-derived constituents and indicate that MEE is affected by both the core load and the wall solids concentration.

E. Microstructure of Whey Protein-Based, AMF Containing Microcapsules

The evaluation of a potential wall material is based, among other things, on thorough understanding of the effect of compositional aspects and process parameters on the structural characteristics of the microcapsules.

The microstructure of whey protein-based, spray-dried microcapsules has not been known or disclosed prior to the development of this invention.

In developing the present invention, the effects of wall material type, that is WPI, WPC50, and WPC75, and its concentration (% w/w) in the emulsion, the effect of core load, that is the proportion of anhydrous milkfat (AMF) in the emulsion (w/w of wall solids), and the effect of drying conditions, that is the inlet and the outlet temperatures used during spray-drying on the structural features of the microcapsules were investigated. The results of this study are provided in Table 3 and in FIGS. 11, 12, and 13.

The composition of emulsions of AMF in each of the three whey protein-based wall solutions is presented in Table 3. Emulsions were prepared using the same emulsion preparation procedure described above. Wall solids concentration ranged from 10% to 30% (w/w), and AMF load ranged from 50% to 75%. Spray-drying of the emulsions was carried out using the drying apparatus described above and drying conditions consisting of inlet air temperature ranging from 105° C. to 210° C. and outlet air temperature ranging from 50° C. to 90° C. were used. Determination of particle size distribution in the emulsion was carried out as described above.

TABLE 3

Composition of Emulsions and Particle size distribution of AMF in the Emulsions

| System | Wall Component | Solids Concentration[1] | AMF Load[2] | M. P. S.[3] |
|---|---|---|---|---|
| 1 | WPI | 20 | 75 | 0.40 |
| 2 | WPI | 10 | 50 | 0.45 |
| 3 | WPC50 | 30 | 50 | 0.45 |
| 4 | WPC50 | 20 | 50 | 0.38 |
| 5 | WPC75 | 20 | 75 | 0.38 |
| 6 | WPC75 | 30 | 75 | 0.45 |

[1]The proportion of wall solids in the wall solution expressed in % (w/w)
[2]The proportion of anhydrous milkfat in the emulsion expressed as % (w/w) of wall solids
[3]Mean particle size Table 3 shows that the mean particle size in all systems was in the preferred range from 0.1 to 1 μ and was not effected by the wall component, wall solids concentration or AMF load.

Figure 11A:
FIG. 11A through 11C are micrographs of WPI-based, AMF-containing microcapsules prepared from system 1 (Table 3) by spray-drying.
Figure 11B:
Figure 11C:
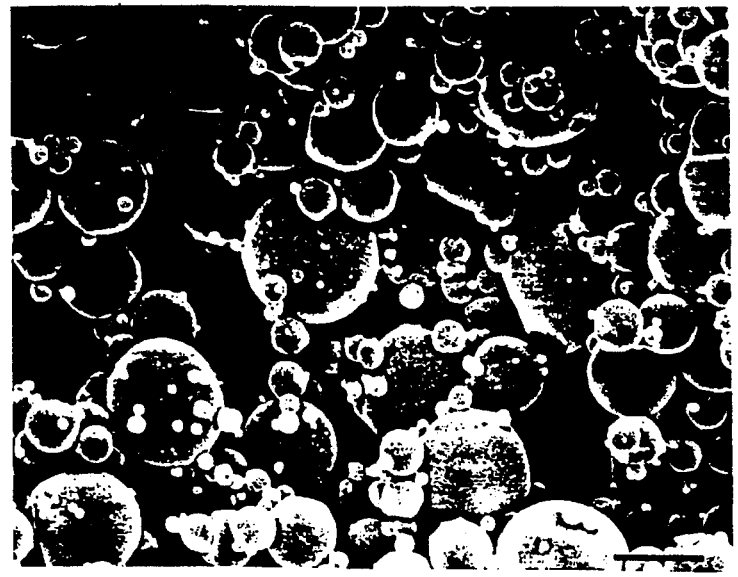

FIGS. 11A, 11B, and 11C present the outer topography of WPI based, AMF-containing spray-dried microcapsules prepared from the emulsion denoted as system 1 in Table 3. Inlet and outlet drying temperatures were 105° C. and 50° C., respectively for FIG. 11A, 160° C. and 80° C., respectively, for FIG. 11B, and 210° C. and 90° C., respectively, for FIG. 11C. FIG. 11A presents a bar of 10 μm and FIGS. 11B and 11C present a bar of 20 μm.

Emulsion produced by using system 1 produces spherical capsules having a diameter ranging from 1 to 25 μm. The outer surfaces of the capsules were smooth regardless of drying conditions. Smooth and dent-free surface of microcapsules are important to flowability and dispersibility of the microencapsulated powder. Surface dents and wrinkles adversely affect the flowability of dry powders.

Microcapsules that were dried at 105° C. (FIG. 11A) exhibited a limited extent of surface indentation. At drying (inlet) air temperatures of 160° C. and 210° C., almost no surface dents could be observed (FIGS. 11B and 11C). The capsules were characterized by a high degree of integrity, and almost no cracks or pores could be detected on the outer surfaces. However, a few of the large capsules that were dried at 160° C., particularly those prepared from emulsion that contained 10% wall solids, exhibited holes. These features are similar to the excessive ballooning and subsequent rupturing effects associated with spray-dried microcapsules described in *Food Microstructure*, 7:15–23 (1988) for gum-arabic based, spray-dried microcapsules.

Whey protein based microcapsules prepared at an inlet air temperature of 105° C. were free from such defects. Although the capsules presented in FIGS. 11A, 11B, and 11C were prepared from emulsions that differed in their composition, no significant differences in outer topography could be detected. The results further presented in these figures indicate the suitability of WPI as a wall material for microencapsulation of AMF by spray-drying. The results indicate that in order to limit structural damage, an inlet air temperature of about 105° to 160° C. and preferably of 160° C. is optimal.

Figure 12A:
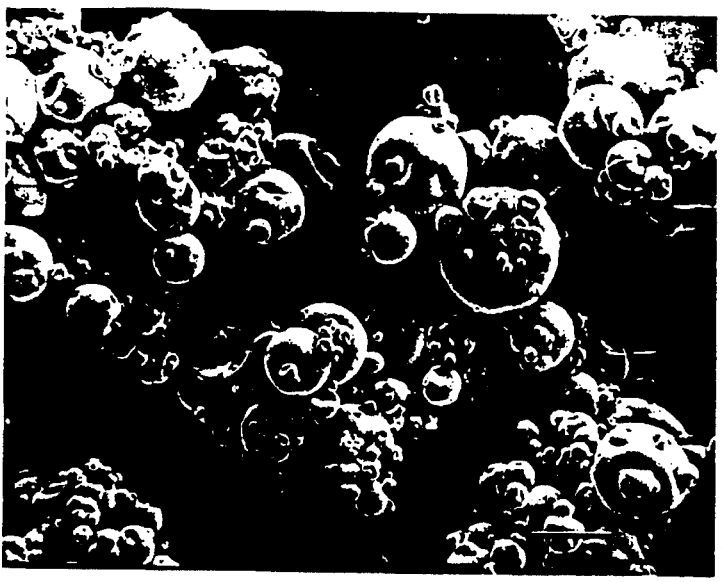
FIG. 12A are micrographs of spray-dried, WPC 50-based, AMF-containing microcapsules prepared from system 4 (Table 3).
Figure 12B:
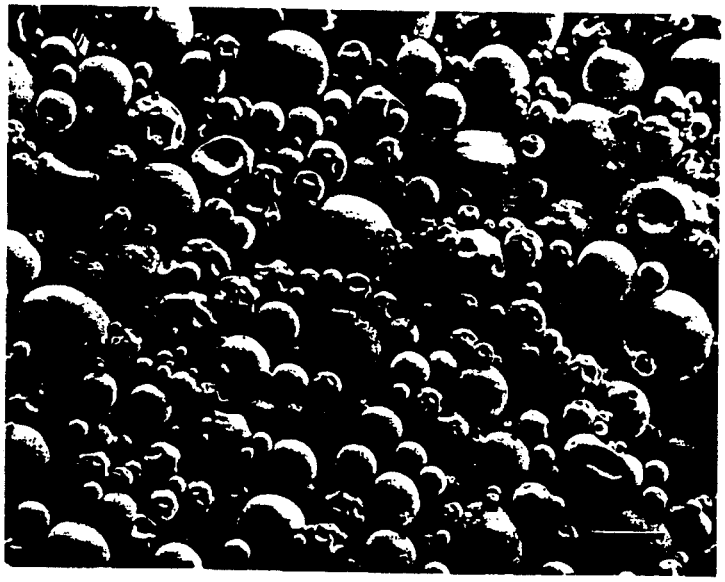
FIG. 12B is a micrograph of spray-dried, WPC 50-based, AMF-containing microcapsules prepared from system 3 (Table 3).
Figure 12C:
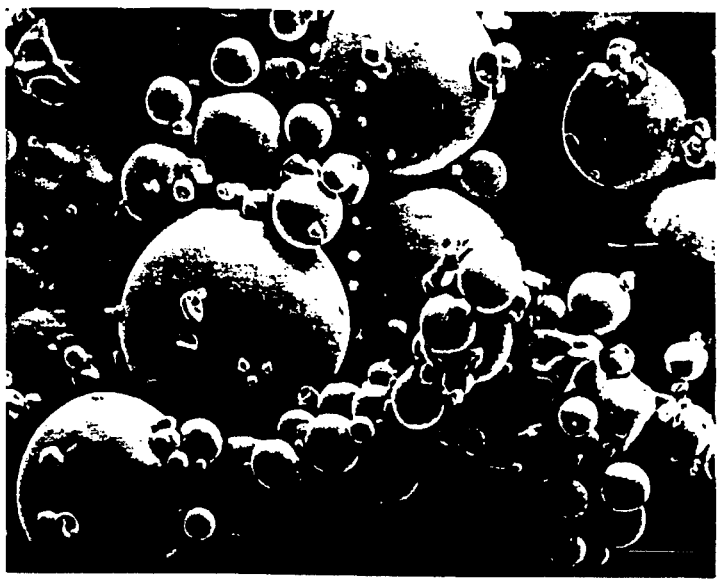
FIG. 12C is a micrograph of spray-dried, WPC 50-based, AMF-containing microcapsules prepared from system 4 (Table 3). Inlet and outlet air temperatures were 210° C. and 90° C., respectively.

FIGS. 12A, 12B, and 12C show the outer topography of AMF containing microcapsules in which WPC 50 served as a wall material. The microcapsules seen in FIG. 12A were prepared from the emulsion denoted as system 4 in Table 3 that was dried at inlet and outlet air temperatures of 105° C. and 50° C., respectively. The microcapsules seen in FIG. 12B were prepared from the emulsion denoted as system 3 in Table 3 that was dried at inlet and outlet air temperatures of 160° C. and 80° C., respectively. The microcapsules seen in FIG. 12C were prepared from the emulsion denoted as system 4 in Table 3 that was dried at inlet and outlet air temperatures of 210° C. and 90° C., respectively. A bar in FIGS. 11A and 11B is 20 μm and the bar in FIG. 12C is 10 μm. Arrow shows a surface dent, (D) means damaged microcapsule, bar is 10 μm.

In all cases where WPC50 was the wall material, formation of particles of 2–35 μ was observed. Surface dents were associated with the capsules dried at 105° C. and 160° C. (12A and 12B) respectively, and were manifested to a very limited extent in capsules that were dried at 210° C. (FIG. 12C). In all cases, the capsules were of spherical shape and exhibited smooth surfaces. Inlet air temperature of 210° C. was associated with few damaged capsules (FIG. 12C). Such defects were not be detected in batches dried at lower drying temperatures.

The results seen in FIG. 12 indicate the suitability of WPC50 as wall material for microencapsulation of AMF by spray-drying. These results highlight the effect of drying temperature on the surface morphology of the microcapsules. In order to minimize surface indentation while preventing structural damage, inlet and outlet air temperatures of around 160° C. and around 80° C., respectively, are to be used.

Figure 13A:
FIGS. 13A through 13C are the micrographs of spray-dried, WPC 75-based, AMF-containing microcapsules prepared from system 5 (A and C) and system 6 (B) of Table 3.
Figure 13B:
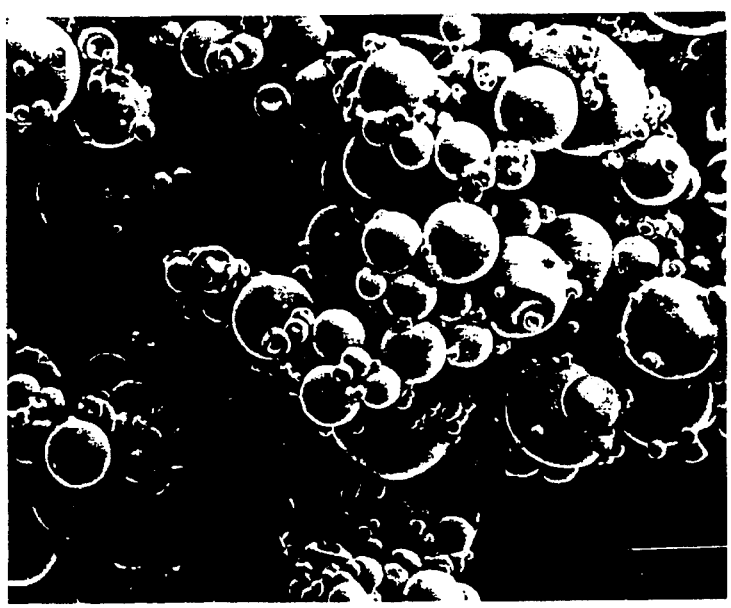
Figure 13C:
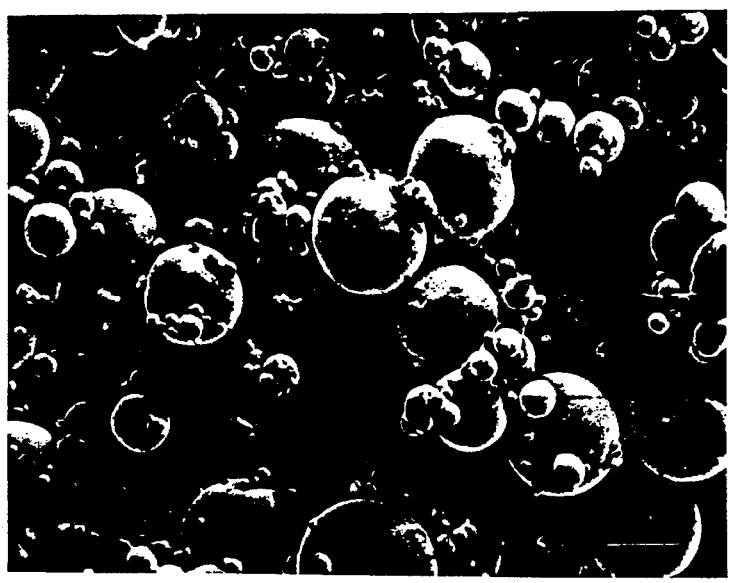

FIG. 13 shows micrographs of AMF-containing microcapsules in which WPC 75 served as the wall material. Microcapsules were prepared from the emulsion denoted as system 5 in Table 3 (13A and 13C) and from the emulsion denoted as system 6 in Table 3 (13B). Inlet and outlet air temperatures were 105° C. and 50° C., respectively, for FIG. 13A, 160° C. and 80° C., respectively, for FIG. 13B, and 210° C. and 90° C., respectively, for FIG. 13C. FIGS. 13A, 13B, and 13C present a bar of 20 μm. The microcapsules prepared at the above drying conditions exhibit smooth surfaces. However, capsules dried at 105° C. are smooth but exhibit deep surface dents (FIG. 13A). The proportion of capsules exhibiting surface dents was significantly reduced when drying temperature was increased to 160° C., as presented in FIG. 13B. The phenomenon of surface indentation was almost completely eliminated at inlet air temperature of 210° C. as presented in FIG. 13C. At this temperature, few of the large capsules (FIG. 13C) exhibited small holes. This may be linked to rapid particle expansion at high drying temperatures.

The results presented in FIG. 13 indicate the suitability of WPC75 as wall material for microencapsulation of AMF by spray-drying. These results also indicate that the surface topography of the microcapsules is affected by drying conditions and that in order to minimize surface indentation and preventing structural damage, the best inlet and outlet temperatures are about 160° C. and about 80° C., respectively.

Figure 14A:
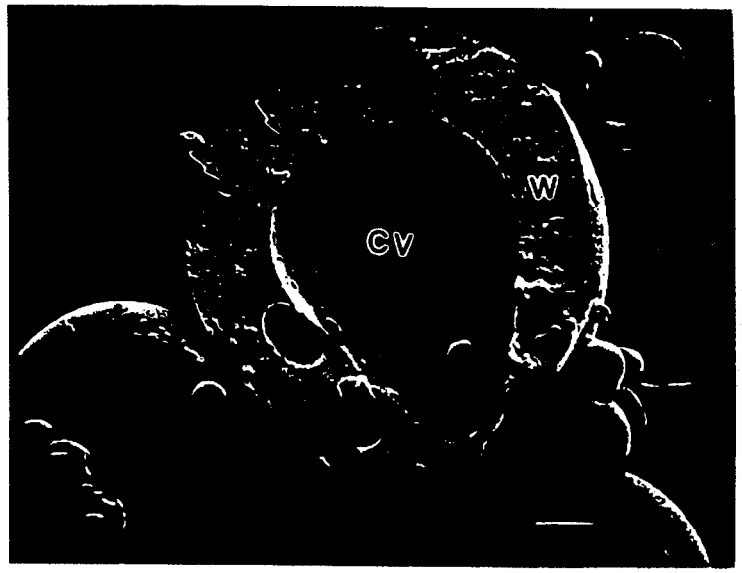
FIGS. 14A are micrographs of inner structures of whey proteins.

FIG. 14 presents the typical inner structure of whey protein based, AMF containing, spray-dried microcapsules prepared from the emulsion denoted as system 1 in Table 3 that was dried at inlet and outlet temperatures of 160° C. and 80° C., respectively. FIG. 14A is a low-magnification micrograph presenting the typical inner structure of a WPI based, AMF-containing, spray-dried microcapsule. FIG. 14A presents a bar of 5 μm. A central void (CV), the wall (W) and the AMF droplets that are embedded in the wall (arrows) are seen in FIG. 14A.

Figure 14B:
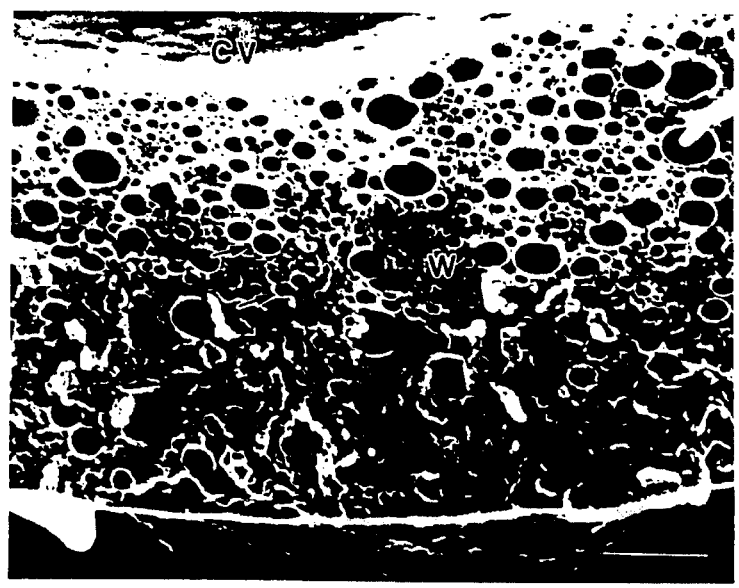
FIG. 14B is a representative micrograph revealing the inner structure of WPI-based, AMF-containing microcapsule.

FIG. 14B presents a typical inner microstructure at high magnification of WPI based, AMF containing microcapsules prepared from the same emulsion as in FIG. 14A. FIG. 14B presents a bar of 1 μm.

Figure 14C:
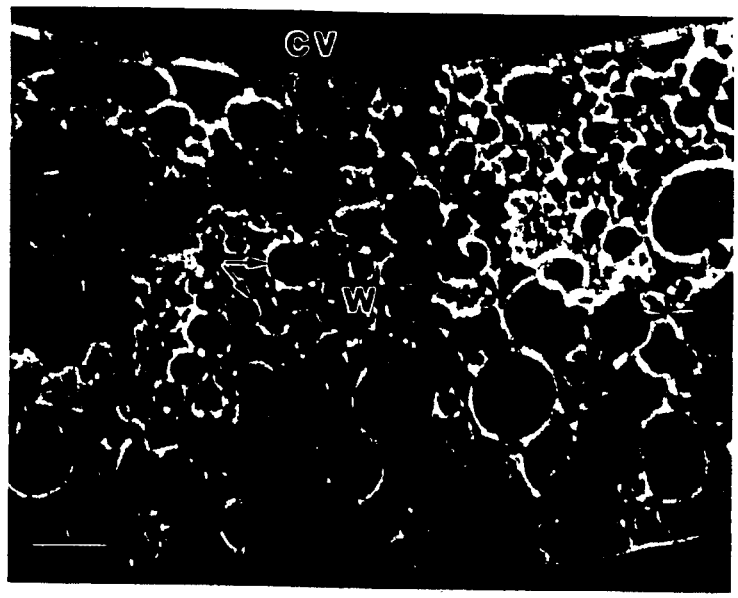
FIG. 14C is a representative micrograph revealing the inner structure of WPC 50-based, AMF-containing microcapsule.

FIG. 14C presents a typical inner structure at high magnification of a WPC50 based, AMF containing microcapsule prepared from the same emulsion as in FIG. 14A. FIG. 14C presents a bar of 0.5 μm.

The inner structure of AMF-containing, WPI and WPC 50 based microcapsules presented in FIGS. 14A, 14B and 14C, respectively, reveals the existence of a central void (CV). In both the WPI and the WPC50 microcapsules, the AMF can be seen distributed as small 50–600 nm droplets embedded (arrows) in the capsule wall (W). No effects of wall composition on the inner structure could be detected. Structural details similar to those presented in FIG. 14 were found in all investigated cases regardless of the type of whey protein or drying conditions used. The diameter range of the encapsulated AMF as seen in FIG. 14 is similar to that of the AMF droplets at the emulsion stage as determined prior to drying and is seen in Table 3. This indicates that no coalescence of the AMF droplets occurred during the drying process.

Additionally, no visible cracks or channels exposing the encapsulated AMF droplets to the environment could be detected. The absence of crack or visible pores is very important because such structural defects could allow exposure of the encapsulated core to factors such as oxygen, or light that may cause its deterioration.

The inner structure of WPC75 based AMF containing spray-dried microcapsules was also examined and was found to be similar to that presented here for systems consisting of WPI or WPC50.

The results of the structure analysis that was carried out in developing the present invention indicate that whey protein-based, spray-dried microcapsules have a structure different from that reported for other milk-derived powders or soy protein isolate particles. Shallow surface dents found at low drying temperatures of about 105° C. were eliminated in WPI systems or significantly limited in WPCs systems by increasing the drying temperature to 160° C. In all system, regardless of the lactose or fat contents, surface wrinkles were not detected. The existence of surface dents in WPC50 based microcapsules and their absence in the case of WPI based microcapsules is due to the lactose content of WPC. The absence of surface dents in the WPI capsules was typical for AMF-containing as well as for AMF-free capsules, that were examined, and thus seems to be characteristic of WPI.

The structure of the WPI microcapsules reported here differs from the structure of spray dried microcapsules where the wall material was gum arabic or dextrins (*Food Microstructure*, 7:15–23 (1988). In those cases, the in significant surface indentation was observed microcapsules dried at temperatures below 210° C. The results obtained with WPI capsules did not indicate that wall solids concentration at the emulsion stage has any significant influence on the morphological properties of the dry capsules.

The results of the structure study that was part of the development of the present invention indicate that WPI or WPCs are effective microencapsulating agents for AMF. Additionally, the results indicate that regardless of wall type or concentration in the emulsion, and regardless of AMF core load, AMF is effectively microencapsulated and capsules are organized as small droplets embedded in the microcapsule wall in such a way that they are physically isolated from the environment. The inner and outer structural features of capsules indicate good physical protection provided to the microencapsulated AMF. The outer structure of the WPI based microcapsules indicates the advantage of using the WPI as a wall material that enables preparing microcapsules free of surface dents. Such dent-free capsules are preferred for the flow properties and reconstitution of the capsules. In the case of WPC, the limited extent of indentation that is associated with drying temperatures lower than 160° C. is minimized by increasing the drying temperature to 160° C.

The above results show that 10% to 30% WPI or WPC and preferably 20%, are suitable as a wall system for the microencapsulation of AMF of other cores. The results also show that the preferred inlet drying temperature is in a range from 105° C. to 210° C., and preferably at about 160° C., and outlet air temperature is in a range from 50° C. to 90° C., and preferably at about 80° C. Additionally, the results show that a high AMF load, that is 75% (w/w) of wall solids, does not adversely affect the microstructure of the spray-dried microcapsules.

V. Microencapsulation of AMF in Wall Systems Consisting of Whey Proteins and Lactose In developing the present invention it has been found that the proportion of lactose included in wall systems consisting of WPI, WPC50, or WPC75, significantly affects the microencapsulation efficiency, that is the proportion of encapsulated AMF that can be extracted by a apolar solvent, like petroleum ether, by decreasing the diffusion of an apolar substance through the microcapsule wall. Additionally, it has been found that the presence of milk-derived, lipid-like residues that is, residues of milkfat and/or hydrophobic material residues originated from the milkfat globule membrane, adversely affect the microencapsulation efficiency. These residues increase the proportion of encapsulated AMF that can be extracted from the dry microcapsules by an apolar solvent like petroleum ether and are known to be prone to oxidative reactions that results in off-flavor and odor.

As shown in Table 1, both WPC50 and WPC75 contain lactose and fat residues. WPI does not contain either of these milk constituents. In order to maximize the effect of lactose in enhancing the microencapsulation efficiency while avoiding the adverse effects associated with residues of milk lipids, microencapsulation of anhydrous milkfat in wall systems consisting of combinations of WPI and lactose was studied.

Procedure conditions are described in Example 9.

A. Microencapsulation Yield for Systems Consisting of AMF Microencapsulated in WPI/Lac Wall Systems Microencapsulation yield of wall system consisting of whey proteins in combination with lactose was determined using AMF as exemplary core material.

TABLE 4

Microencapsulation Yield for AMF in WPI/Lac Wall Systems

| WPI/Lac | Microencapsulation Yield (%) |
| --- | --- |
| 1:0 | 97.5 |
| 9:1 | 99.1 |
| 3:1 | 98.9 |
| 1:1 | 99.0 |
| 1:3 | 99.2 |

Table 4 presents the microencapsulation yield (MEY), that is the retention of the core (AMF) in the wall system containing various proportions of whey proteins and lactose after the completion of the spray-drying process.

The results presented in Table 4 show that microencapsulation yield for AMF encapsulated in wall systems consisting of WPI and lactose is about 99%. The results also indicate that under identical solids concentration, atomization and drying conditions, higher microencapsulation yield is achieved in wall systems consisting of WPI and lactose than that obtained in wall systems consisting solely of WPI. This is due to higher drying rate associated with the WPI/Lac systems than with the WPI-based wall system.

B. Microencapsulation Efficiency for Systems Consisting of AMF Microencapsulated in WPI/Lac Wall Systems Microencapsulation efficiency of wall system consisting of whey proteins in combination with lactose was determined using AMF as exemplary core material.

TABLE 5

Microencapsulation Efficiency for Systems Consisting of AMF Microencapsulated in WPI/Lac Wall Systems

| System | WTS[1] (%) | WPI[2] (%) | Lac[3] (%) | AMF[4] (%) | MEE[5] (%) |
| --- | --- | --- | --- | --- | --- |
| 1 | 20 | 20 | — | 75 | 28 |
| 2 | 20 | 18 | 2 | 75 | 45 |
| 3 | 20 | 15 | 5 | 75 | 71 |
| 4 | 20 | 10 | 10 | 75 | 94 |
| 5 | 20 | 5 | 15 | 75 | 95 |

[1]Wall solids concentration (w/w) in the wall solution.
[2]Concentration (w/w) of whey protein isolate in the wall solution.
[3]Concentration (w/w) of lactose in the wall solution.
[4]Concentration of anhydrous milkfat in the emulsion (w/w of wall solids).
[5]Microencapsulation efficiency.

Table 5 present the microencapsulation efficiency (MEE) for AMF microencapsulated in wall systems consisting of various combinations of WPI and lactose.

The results presented in Table 5 clearly show that when lactose is a functional wall component, the extractability of AMF from whey protein isolate containing microcapsules is limited and the MEE is high. The results further indicate that the proportion of AMF that was not extracted from the microcapsules increased as a function of the proportion of lactose included in the wall system. Only 28% of AMF remained and was not extracted from lactose free whey protein microcapsules in comparison to 95% AMF that remained and were not extracted from the system consisting of WPI and lactose at a weight ratio of 1:3. The results seen in Table 5 show that increasing proportions of lactose increase MEE values. When lactose is included in the wall system at a proportion larger that 50% (w/w) of wall solids, that is when WPI/Lac ratio is around 1:1, or 1:3 only a very small increase in MEE can be expected.

In developing this invention it has been found and described above that the MEE levels of wall systems consisting of WPC50 were superior to that of wall systems consisting only of WPI (FIGS. 8, 9, and 10). This confirms the findings that WPI in combination with lactose has higher MEE than WPI alone. WPC50 superiority over WPI is due to the effect of lactose present in the WPC50. While lactose has no surface active properties and therefore it does not participate in the formation of the stabilizing films at the oil/water interfaces during the emulsification stage, it acts as an hydrophilic filler or sealant within the wall system that significantly limits diffusion of the extraction solvent through the wall towards the microencapsulated AMF droplets. In this way, it increases MEE values.

These results further indicate that in order to minimize the proportion of the core such as AMF that can be extracted from microcapsules consisting of whey protein containing wall systems. Lactose in proportions ranging from 10% to 75% (w/w wall solids), preferably about 50% should be included in the wall system.

The results presented above indicate the effect of lactose in restricting the diffusion of an apolar substance through the whey protein containing wall system and in this way can prevent the loss of low molecular weight, apolar core. Although AMF is not likely to migrate towards the capsule's surface during storage, apolar substances of a low molecular mass will do so. This migration towards the surface leads to core losses and to exposure of core to the environment. Such an exposure leads to deterioration of a significant proportion of the core as a function of time. The results presented above regarding the role of lactose in restricting the migration of an apolar substance through the capsule's wall show that inclusion of lactose in the whey proteins-based wall system provides means to limit and minimize diffusion of an apolar core through the wall. This effect of lactose is of a significant practical importance.

C. Microstructure of Spray-dried, AMF containing Microcapsules Consisting of Whey Proteins and Lactose The microstructural characteristics of spray-dried microcapsules are critical to the physical properties and functionality of the microcapsules. The protection provided by the wall system to the microencapsulated core depends, among other things, on the physical integrity, that is on the absence of cracks, dents or other imperfections, of the microcapsules and on the way the core is organized in the wall matrix.

The microstructure of spray-dried, AMF containing microcapsules with wall systems containing whey protein isolate and lactose was studied. The results are presented in FIGS. 15 and 16.

FIG. 15 shows spray-dried, WPI/lactose-based, AMF-containing microcapsules prepared from system 2 (15A), system 3 (15B), and system 4 (15C and 15D) of Table 5. Surface dimples (SD), hole (H) in a microcapsules, wrinkles (W). Bar is 10 μm.

Figure 15A:
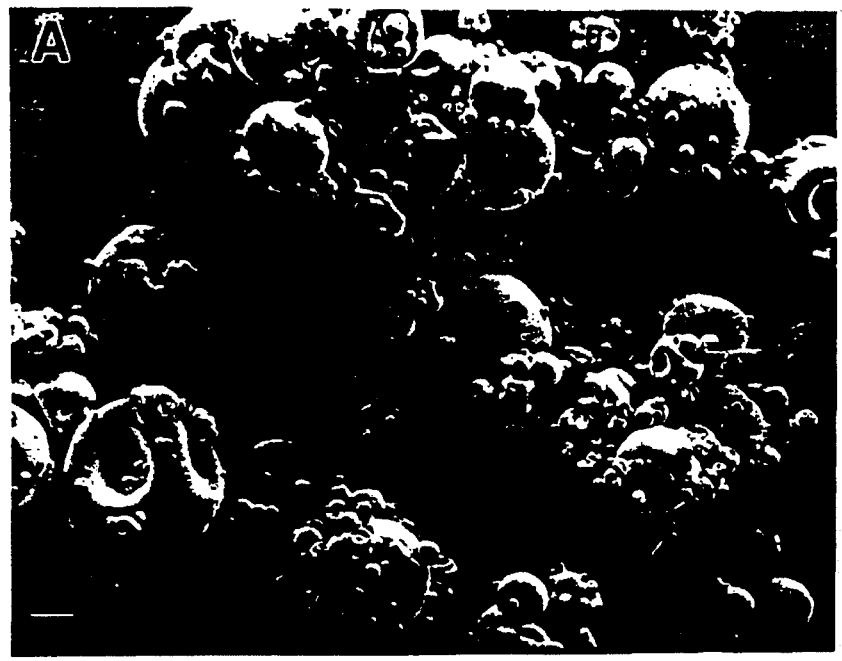
FIGS. 15A through 15D shows spray-dried, WPI/lactose-based, AMF-containing microcapsules prepared from system 2 (15A), system 3 (15B), and system 4 (15C and 15D) of Table 3.
Figure 15B:
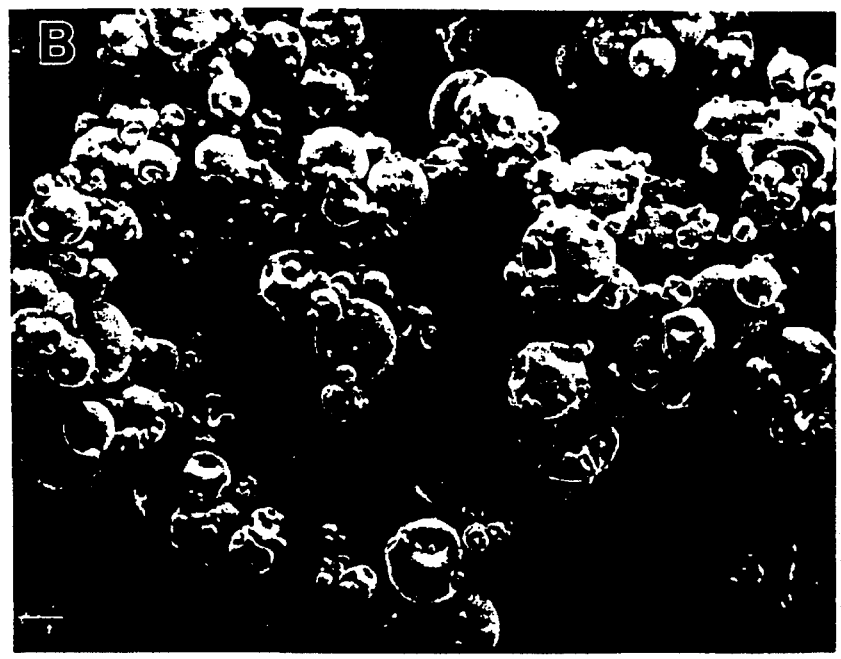
Figure 15C:
Figure 15D:
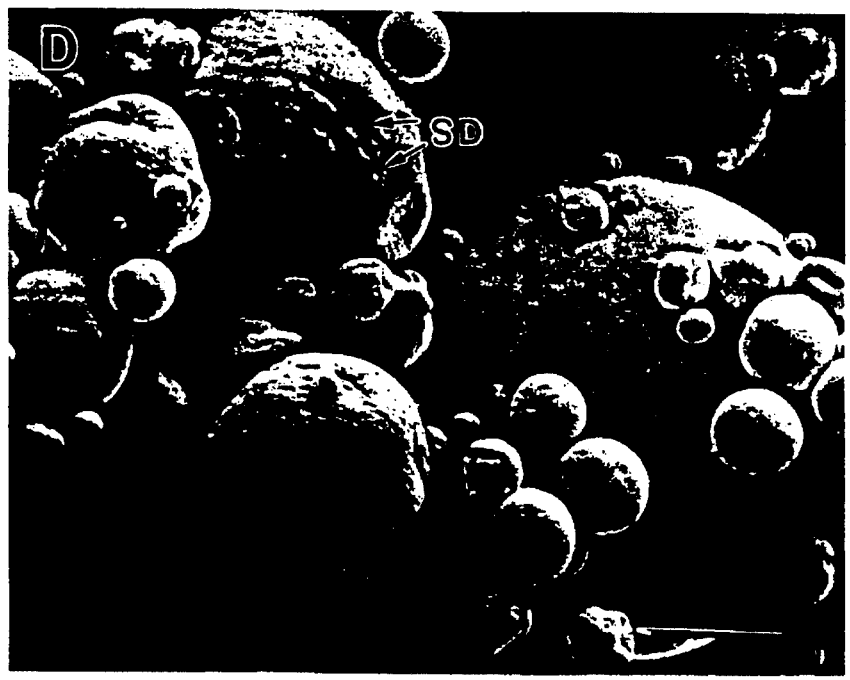

FIG. 15A shows the outer microstructure of microcapsules prepared from the emulsion denoted as system 2 in Table 5. The microcapsules shown in FIG. 15B were prepared from the emulsion denoted as system 3 in Table 5. The microcapsules shown in FIGS. 15C and 15D were prepared from the emulsion denoted as system 4 in Table 5. All emulsions were spray-dried at an inlet and outlet air temperature of 160° C. and 80° C., respectively. FIG. 15C shows the presence of some wrinkles (W) and a hole (H) in one of the microcapsules. FIG. 15D shows some wrinkles (W) and some surface dimples (SD). Some of the microcapsules containing 10 or 25% lactose (FIGS. 15A and 15B, respectively) showed relatively shallow surface dents. These features were not found at 50% (w/w of wall solids) lactose concentration (FIGS. 15C and 15D).

Deep surface dents have been previously reported in *Food Structure*, 11:73–82 (1992), to be present and to characterize spray particles consisting of milk proteins and lactose. In the current invention, spherical microcapsules of sizes from 2–35, almost free of cracks or visible pores were obtained in all cases. Only a few of the capsules, typically those larger than 30 µm exhibited some holes that could be linked to the expansion or ballooning of these microcapsules due to thermal effect associated with progressed stage of the spray-drying process (FIG. 15C).

The results obtained by microencapsulation using current method show only a limited extent of surface indentation associated with microcapsules prepared from wall systems containing 10% to 25% lactose and 90% to 75% WPI, and the complete elimination of these surface dents was observed when lactose proportion in the WPI wall system was increased to 50% (w/w of wall solids). The results of this study indicate that the tendency to develop surface dents is affected by the ratio of low-to-high molecular weight solutes in the drying emulsion. The results presented in FIG. 15 show no adverse effects of lactose on the microstructural characteristics of the microcapsules.

The outer structure of the lactose containing microcapsules is similar to that shown in FIG. 11 for WPI-based, AMF containing microcapsules. The outer surface of microcapsules consisting of wall systems containing 50% (w/w of wall solids) lactose exhibit surface wrinkles (FIG. 15D) similar to those reported to be associated with lactose. At lactose proportion smaller than 50% (w/w of wall solids) these features are not evident.

Figure 16:
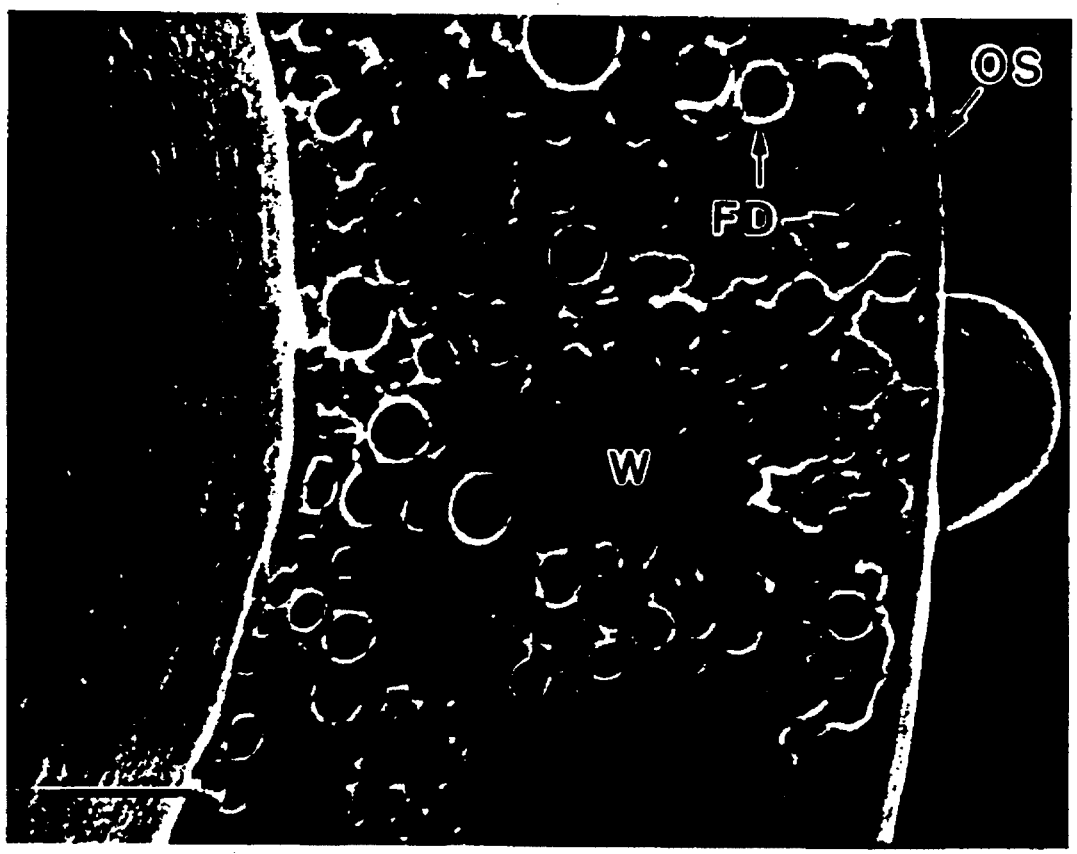
FIG. 16 is a representative inner structure of WPI/lactose-based, AMF-containing microcapsule prepared from system 4 (Table 3).

FIG. 16 is a representative micrograph revealing the inner structure of a WPI/lactose-based, AMF containing microcapsule. The capsule presented in FIG. 16 was prepared from the emulsion denoted as system 4 in Table 5 that was dried at inlet and outer air temperature of 160° C. and 80° C., respectively. FIG. 16 represents a bar of 5 µm, and shows the outer surface of the microcapsule (OS), AMF droplets (FD), and the wall matrix (W). The structural details presented in FIG. 16 reveal the AMF to be organized in the form of fine droplets of 20–700 nm in diameter, embedded in the wall matrix. The inner structure of the lactose-containing microcapsules is not different from that shown in FIG. 14 for WPI or WPC50-based, AMF-containing microcapsules. No cracks or visible pores connecting the environment with the encapsulated AMF droplets are detected. The structural details shown in FIG. 16 indicate no adverse effects associated with the incorporation of 50% (w/w of wall solids) lactose in the wall solution. The results also indicate that good physical protection is provided to the AMF by the WPI/Lac wall system and that the AMF droplets are isolated from the environment. Similar inner structure details were observed in all cases for microcapsules containing WPI/Lac ratio ranging from 9:1 to 1:1.

In developing the present invention, the structural characteristics of AMF-containing microcapsules consisting of WPI/Lac was studied. The results of this study indicate that wall systems containing 10% to 75%, preferably 50%, lactose and 90% to 25%, preferably 50% WPI are suitable microencapsulating agents for microencapsulation of AMF.

D. Effect of Moisture Uptake on Core Extractability and Microstructure of Spray-dried, AMF-Containing Microcapsules Consisting of Whey Proteins or of a Combination of Whey Proteins and Lactose Moisture uptake by microcapsules has been shown to affect their structure and functionality. Information related to the effect of moisture uptake has practical importance in designing storage conditions for microcapsules. In developing the present invention, it was thus important to study the effect of moisture uptake on core extractability and microstructure of AMF containing, WPI or WPI/lactose-based, spray-dried microcapsules.

In developing this invention it has been found that lactose has a significant role in affecting the diffusion of an apolar substance through the wall of whey proteins containing microcapsules. Therefore, the effect of lactose on the core extractability and on the microstructure of the emulsion was determined using procedures described in Example 10. Results are shown in FIGS. 17, 18, and 19.

Figure 17:
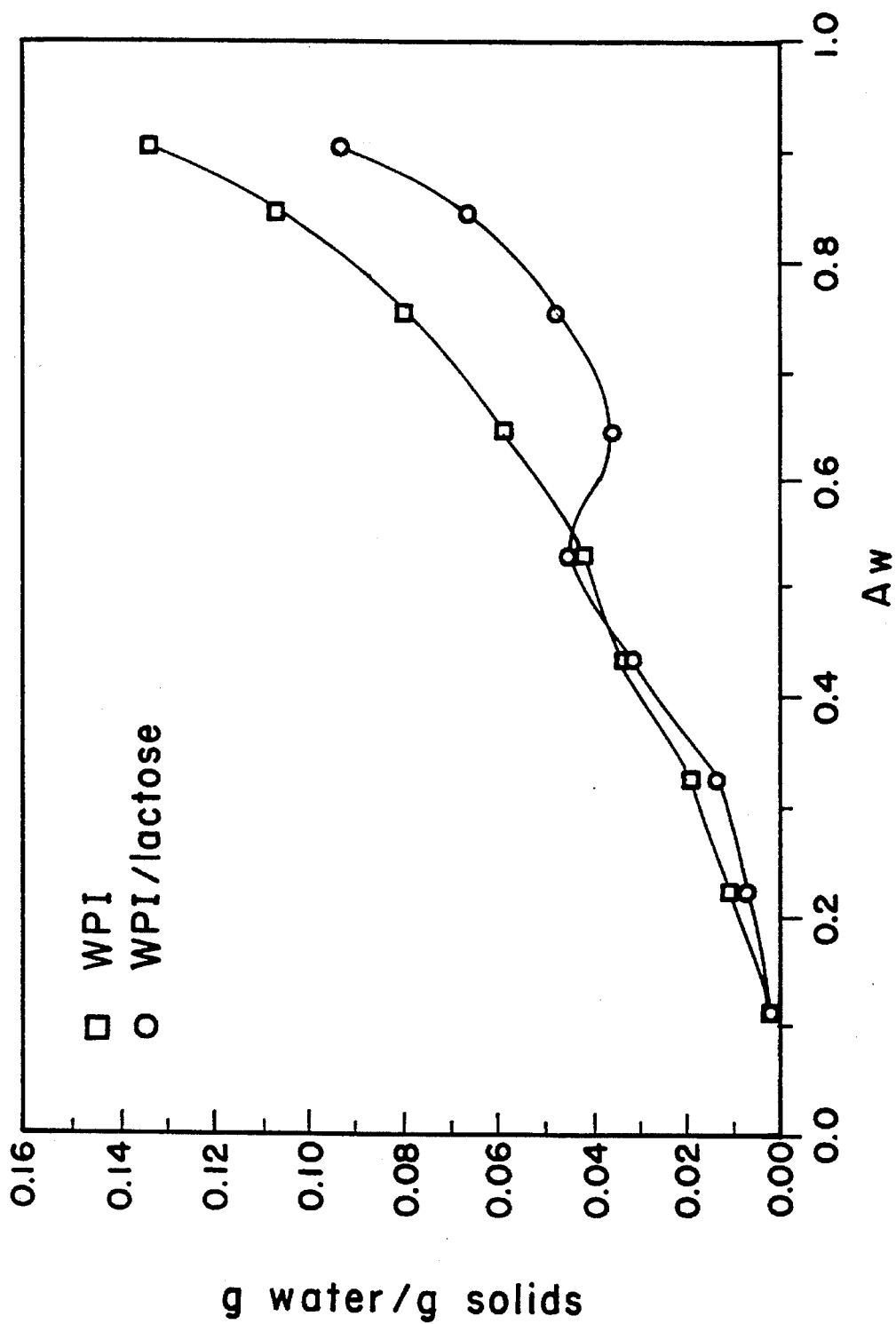
FIG. 17 shows water sorption isotherms of WPI- and WPI/lactose-based, AMF-containing microcapsules prepared from systems 1 and 4 (Table 3), respectively.

FIG. 17 shows water sorption isotherms of WPI- and WPI/lactose-based, AMF-containing microcapsules prepared from systems 1 and 4 (Table 5), respectively.

Typical moisture sorption isotherms for WPI(-■-) and WPI/lactose-based (-o-), AMF-containing microcapsules are shown in FIG. 17. Due to lactose crystallization, the WPI/lactose system exhibited a slight discontinuity and desorption of moisture in the 0.5–0.65 $a_w$ range.

Figure 18A:
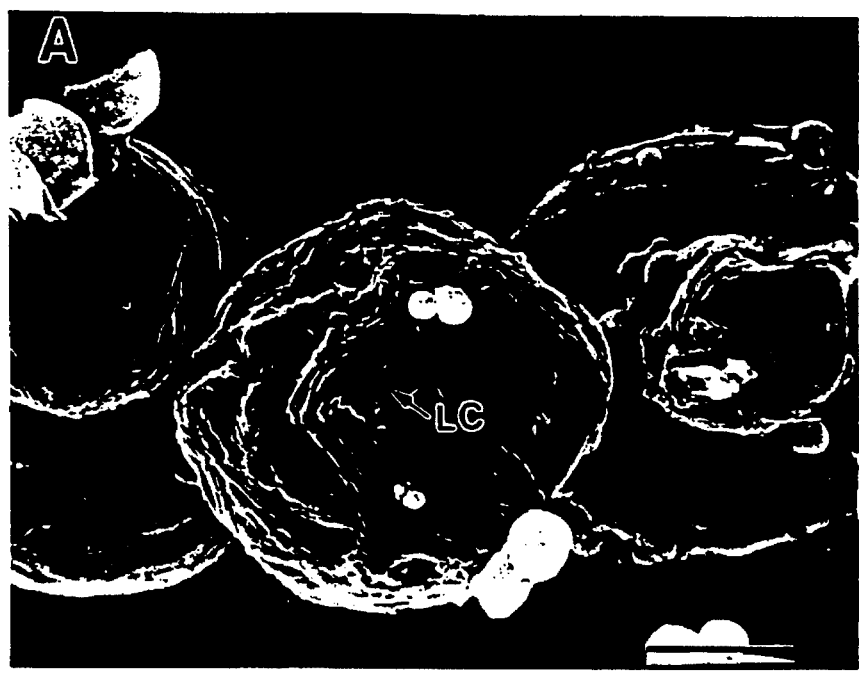
Figure 18B:
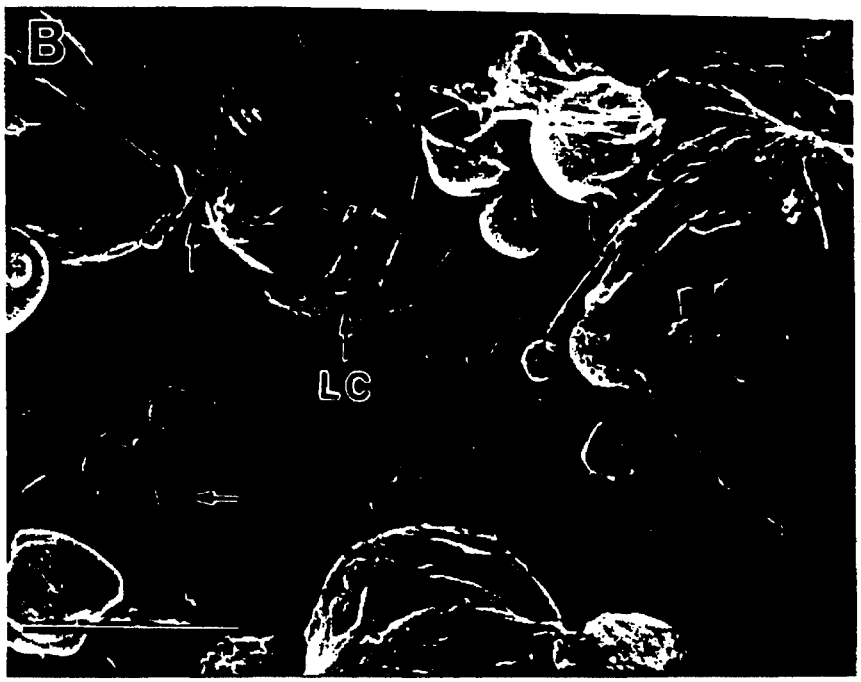
Figure 18C:
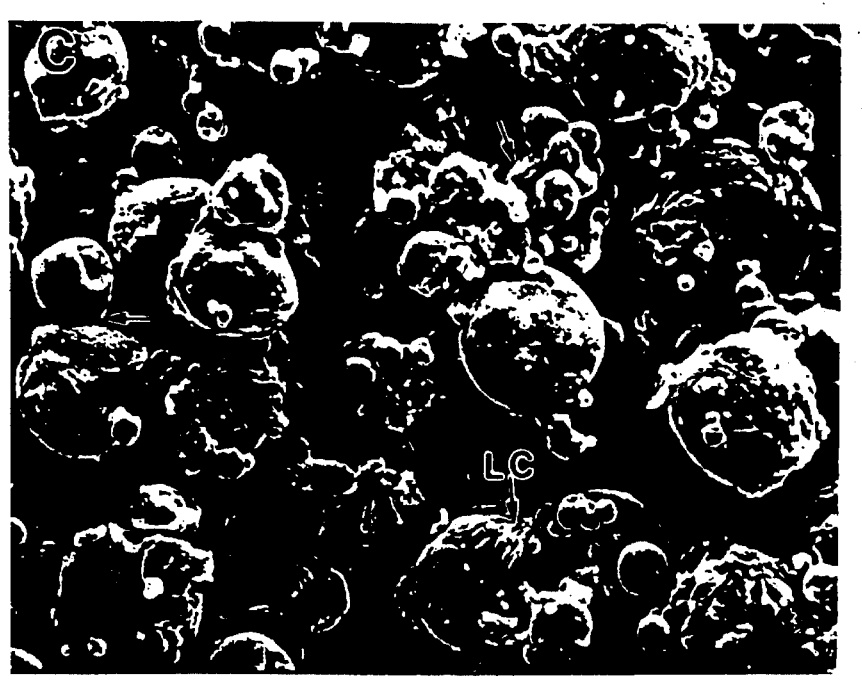
Figure 18D:
Figure 19:
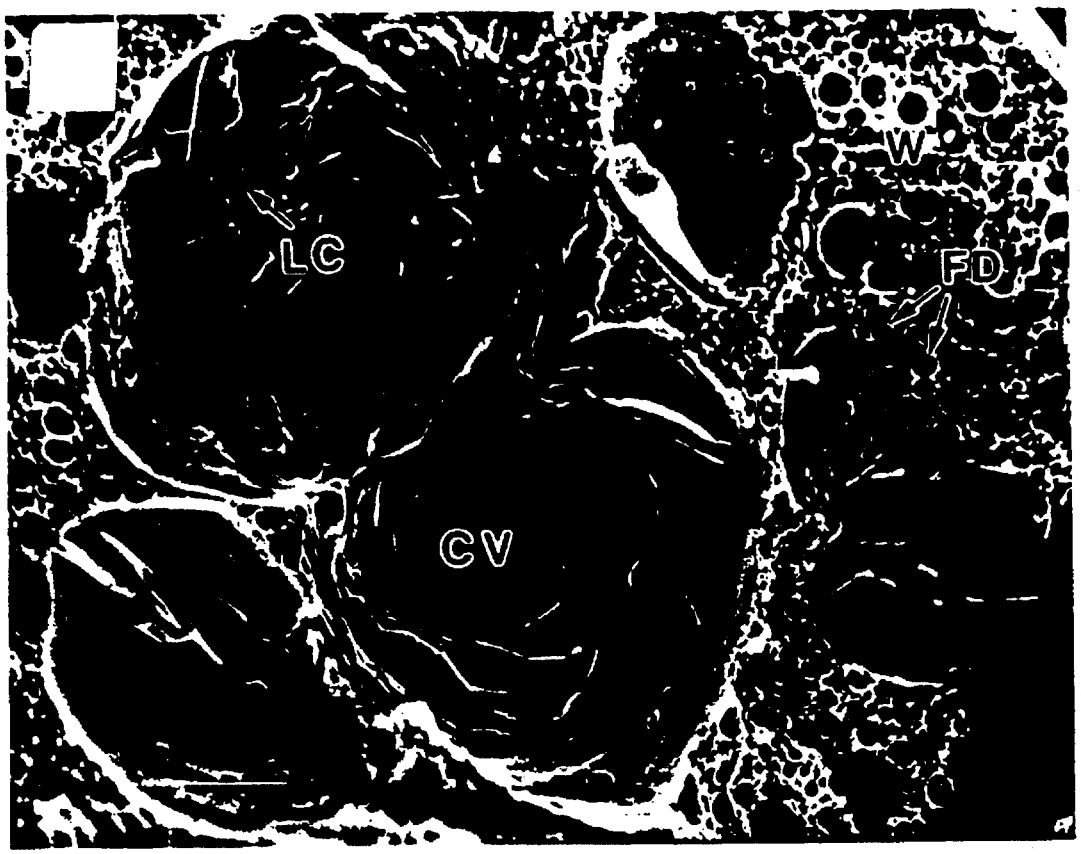
FIG. 19 shows the inner structure of microcapsules after incubation at different water activities.

FIG. 18 are micrographs revealing the structure of AMF containing, spray-dried microcapsules consisting of WPI/Lac wall systems after incubation at relative humidity of 53% (FIGS. 18A and 18B) and 64% (FIGS. 18C and 18D). The microcapsules were prepared from the emulsion denoted as system 4 in Table 5. FIG. 18 shows lactose crystals (LC), and a formation of solid bridges between microcapsules (arrows). FIGS. 18A–D have a bar of 10 µm.

No significant structural changes were detected in the WPI/lactose systems after incubation at water activities of up to 0.53; however, at $a_w$ of 0.53, formation of needle and plate-like crystals of different sizes was evident (FIG. 18A). The relatively high $a_w$, at which crystallization was evident in the present study, is due to a high fat content of the microcapsules. At $a_w$ of 0.53 and higher, large lactose crystals were formed on the microcapsule surfaces and moisture uptake resulted in the formation of solid bridges between microcapsules (FIGS. 18B, 18C, and 18D). These structural changes indicate changes in lactose state as a function of moisture uptake.

FIG. 19 represents a typical inner structure of microcapsules after incubation at relative humidity of 64%. The microcapsule shown in FIG. 19 was prepared from the emulsion denoted as system 4 in Table 5. Lactose crystals (LC), AMF droplets (FD), central voids (CV), and wall matrix (W) are visible. FIG. 19 represents a bar of 1 µm. At $a_w$ of 0.64, lactose crystals were found not only on the outer surfaces but also on the surfaces of the central voids located inside the microcapsules. These well-developed crystals were similar to those found on the outer surfaces and covered large areas of the inner void surfaces. Aside from this structural change, no other structural changes related to moisture-uptake could be detected in the inner structure of the capsular wall. Incubation of microcapsules at $a_w$ higher than 0.64 resulted in significant changes in the structure of the microcapsules. These changes led to a gradual destruction of the original capsular structure as a function of $a_w$.

Figure 20:
FIG. 20 shows the structure of microcapsules prepared from system 4 (Table 3) after incubation at water activity of 0.9.

FIG. 20 presents the structure of microcapsules prepared from the emulsion denoted as system 4 in Table 5 after incubation at relative humidity of 90%. FIG. 20 shows large structures (LS) at a bar of 5 µm. After incubation at water activity of 0.9, partial dissolution of the wall system and flow of the resulting viscous mass led to the formation of large structures in which the original capsular structure could no longer be observed.

The structural changes observed in the lactose-containing systems could not be detected in WPI-based microcapsules incubated under the conditions described above, thus indicating better structural stability during humidification in the absence of lactose.

Figure 21A:
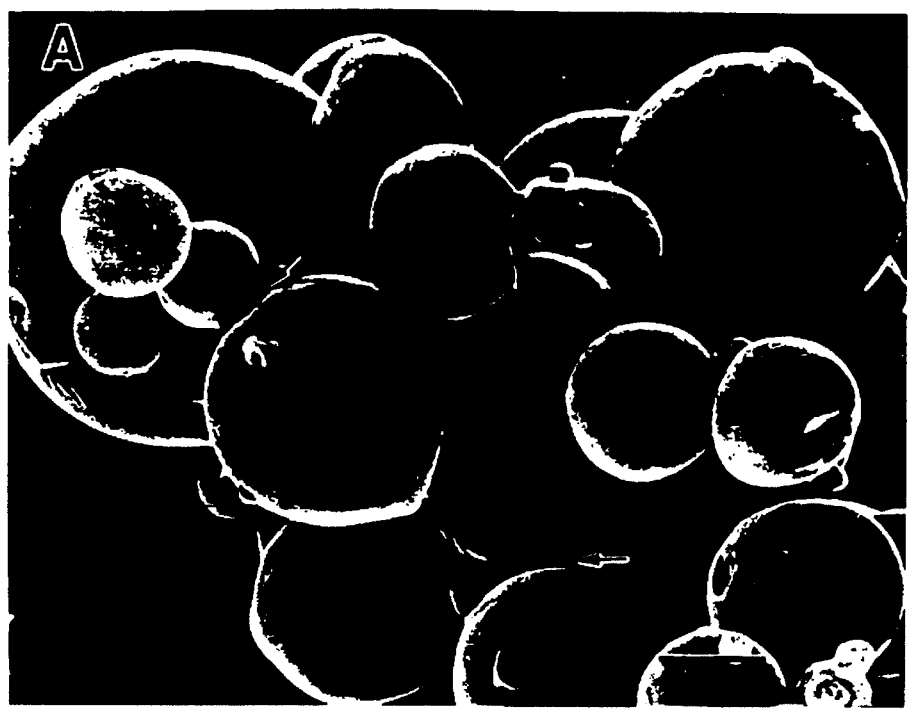
FIGS. 21A and 21B show spray-dried microcapsules prepared from system 1 (Table 3) after incubation at water activity of 0.6 (21A) and 0.9 (21B).
Figure 21B:
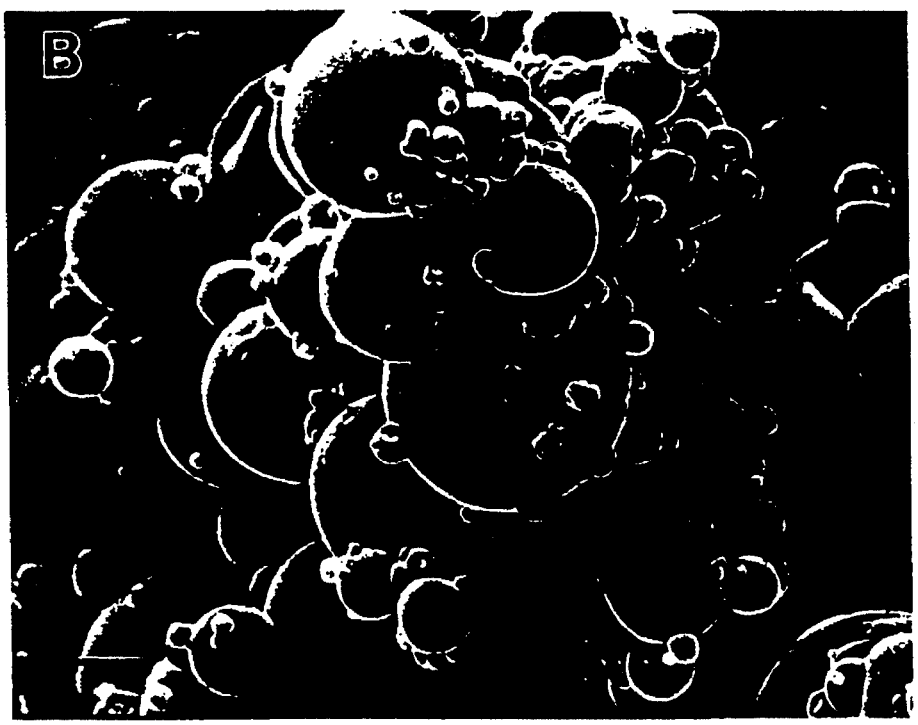

FIGS. 21A and 21B are representative micrographs of WPI-based capsules after humidification at relative humidity of 64% and 90%, respectively. The microcapsules presented in FIG. 21 were prepared from the emulsion denoted as system 1 in Table 5 and dried at inlet and outlet air temperature of 160° C. and 80° C., respectively. FIG. 21 shows a formation of solid bridges between capsules (arrows). A bar is 10 μm. FIG. 21 reveals that moisture uptake was associated with aggregation of the capsules as a result of solid bridges that had been formed between capsules. The formation of such bridges between microcapsules is due to a partial dissolution of the wall material at the capsule surface, as a result of moisture uptake, and of the subsequent physical connection of adjacent capsules by this dissolved mass. Solid bridges like those described above were not evident prior to humidification or after incubation at water activity lower than 0.64. The significant changes in the original microstructural features of the microcapsules, that were observed for the lactose-containing capsules, were not observed in the case of WPI-based microcapsules.

The structural changes associated with lactose crystallization observed in the lactose-containing microcapsules coincided with the moisture desorption region exhibited by the moisture sorption isotherm of this powder. The lack of lactose in the WPI systems explains the differences in both sorption isotherms and the structural changes along these isotherms between the two systems.

The results presented above indicate that moisture uptake by WPI-based microcapsules result in structural changes that are by far less dramatic than those associated with moisture uptake by WPI/Lac microcapsules. The results indicate that WPI-based capsules maintain their original structural features even after exposure to high relative humidities. The results also indicate that the moisture uptake-related structural changes in the case of WPI/Lac microcapsules are mainly due to lactose crystallization that occur at $a_w$ higher than 0.53.

Lactose content has been shown to affect the extractability of microencapsulated AMF by overall increase of the hydrophilicity of the wall system. Differences in porosity between lactose containing and lactose-free systems can explain the effect of lactose on limiting the extractability of AMF. In the study where the WPI and WPI/Lac wall systems were compared under the same conditions, 244 mg AMF/g solids were extracted from the AMF containing WPI-lactose free wall system and only 19 mg of solids were extracted from AMF containing WPI/lactose wall system microcapsules prepared from the emulsions denoted as systems 1 and 4 in Table 5 after spray-drying.

Figure 22A:
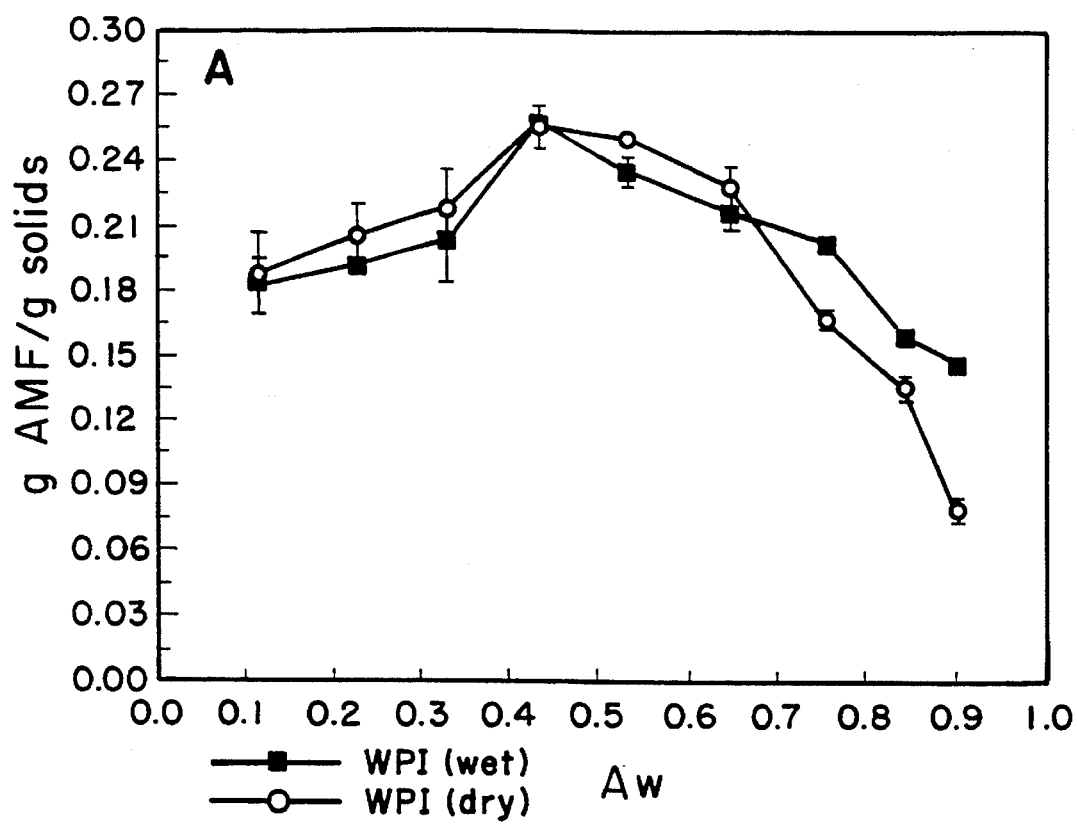
FIGS. 22A and 22B show amount of milkfat extracted by petroleum ether from WPI or WPI/lactose microcapsules after incubation at different water activities.
Figure 22B:
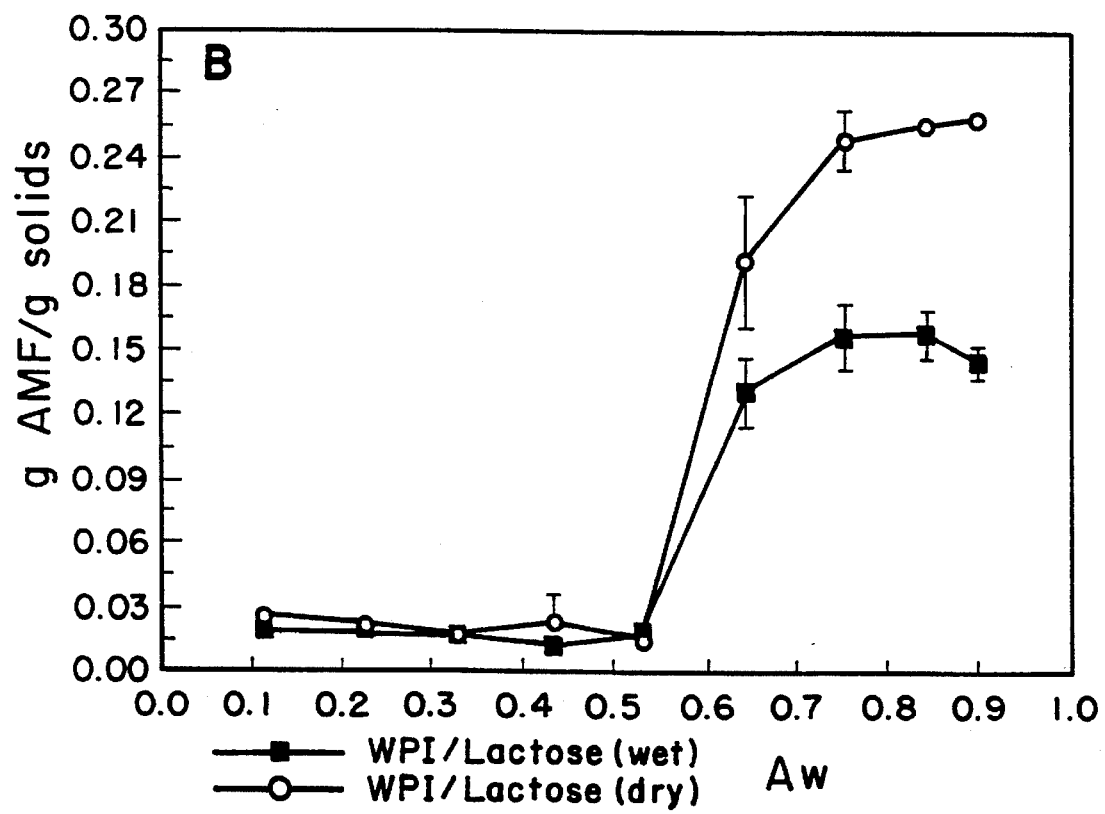

The effect of moisture uptake during incubation at different water activities on the extractability of AMF from WPI-based microcapsules prepared from the emulsion denoted as system 1 in Table 5 and from WPI/Lac-based microcapsules prepared from the emulsion denoted as system 4 in Table 5 is shown in FIGS. 22A (WPI) and 22B (WPI/Lac). FIGS. 22A and 22B shows the amount of AMF that was extracted from the humidified microcapsules (-■- wet systems) as well as the amount of AMF that was extracted from the humidified microcapsules after a post-humidification drying, as described in Example 9 (-o- dry systems).

FIGS. 22A and 22B reveal that the extractability of AMF from WPI-based microcapsules and WPI/lactose-based microcapsules differed significantly. Up to $a_w$ of 0.53, the WPI/lactose wall system provided a much better barrier to AMF extractability than the WPI wall system (as measured for the wet systems). The extractability of the AMF from the WPI/lactose system was very low (13 and 19 mg AMF/g solids for the wet and dry systems, respectively) after incubation at water activities of up to 0.53 but it was dramatically increased at higher relative humidities. 145 and 260 mg AMF/g solids were extracted from the wet and dry WPI/lactose systems, respectively after incubation at $a_w$ of 0.9.

Comparing the extractability curve of the WPI/lactose system with the moisture sorption isotherm of this system as seen in FIG. 17, and considering the microstructural changes observed after incubating the capsules at different water activities as seen in FIGS. 18–21, it becomes clear that the extractability is affected not only by the mere presence of lactose but also by its state. The increase in the core extractability coincided with the moisture desorption region in the sorption isotherm and with the initiation of lactose crystallization observed after humidification at $a_w > 0.53$. The extraction of AMF from the microcapsules is a time-dependent leaching process in which the solvent, such as petroleum ether, extracts microencapsulated AMF from the interior of the microcapsules, along with a small amount of AMF that may be on the capsule's outer surface in the form of surface fat. The results show that as long as lactose is in its amorphous state, it acts as a barrier limiting the diffusion of the apolar substance (solvent in the present case) into the capsule and thus limits the extractability of encapsulated AMF. Lactose in its crystalline form does not provide the barrier to extraction. Once crystallization and, consequently, rearrangement of lactose is initiated, the porosity increases. The increased porosity and the rearrangement of lactose distribution in the wall system results in enhanced penetration of the solvent that leads to an increased AMF extractability. Although lactose crystallization was evident (microscopically) at $a_w = 0.53$, increased extractability was observed only after incubation at $a_w = 0.64$. This and the gradual increase in extractability at $a_w > 0.64$ shows that the extractability of the encapsulated core material is determined by ratio of crystallized-to-amorphous lactose. These results confirm the role of lactose in preventing the diffusion of apolar substance through the wall matrix and thereby prevents losses of the core.

As seen in FIG. 22A, a different pattern of core extractability as a function of $a_w$ was observed for the WPI-based lactose-free systems. The extractability curve exhibited a maximum of 257 mg AMF/g solids obtained after incubation at $a_w = 0.43$. Although no noticeable visible microstructural changes were observed for WPI-based systems along the moisture sorption isotherm, these results suggest that some structural changes associated with moisture uptake did occur. After incubation at $a_w$ higher than 43%, a decrease in AMF extractability was observed for the WPI based microcapsules. This phenomenon, observed for both the dry and the wet lactose free WPI systems are due to a decrease in porosity. The increasing amount of water held by the wall matrix in the case of the wet systems, introduced a hydrophilic barrier that limited the diffusion of the apolar solvent. This effect of water is significant after incubation at relatively high water activities corresponding to moisture contents above the monolayer. In this region of the sorption isotherm, water fills capillaries and forms a barrier to the penetration of any apolar substance. The substantial differences in AMF extractability observed between the dry and wet WPI/lactose systems is due to the effect of moisture held by the matrix. In these systems, the extractability increased as a function of $a_w$. However, the proportion of AMF that was extracted from the wet systems was lower, by 62 to 115 mg AMF/g, than that extracted from the dry systems.

For the WPI-based systems, higher proportions of AMF were extracted from most of the dry systems that had been incubated at water activities of up to 0.75. Powders that were dried prior to extraction after being incubated at water activities higher than 0.75 exhibited lower extractability levels than the corresponding wet systems.

The above results indicate that the drying prior to extraction results in formation of dry protein films that block pore openings, lower the porosity, and in this way limit the core extractability. The presence of lactose crystals and a lower protein content in the WPI/lactose systems explain the differences observed between the two wall systems, that is between the WPI and the WPI/Lac systems.

The results presented above show that lactose plays a critical role in determining the extent to which apolar substance can diffuse through the wall of whey protein containing microcapsules. The effect of lactose is highly dependent on its state. In the amorphous state, as is the case after spray-drying of the emulsion, the lactose limits the diffusion of apolar substance through the WPI-containing wall system thus resulting in high MEE levels. Once lactose crystallization begins, at water activities higher than 5.3%, an appreciable reduction in the barrier against diffusion of apolar substance through the wall occur. Controlling both the proportion and the state of lactose in spray-dried, whey protein/lactose based microcapsules provide means to control the extent to which apolar substance can migrate through the microcapsule's wall matrix. The wall system consisting of 50% (w/w) WPI and 50% (w/w) amorphous lactose provides a good barrier and prevents diffusion of an apolar substance through the wall matrix.

VI. Microencapsulation of Anhydrous Milkfat in Wall Systems Consisting of Combinations of Whey Protein Isolate and Carbohydrates In developing the present invention it has become clear that whey protein alone or in combination with lactose, milk-derived carbohydrate, are very effective microencapsulating agents for the microencapsulation of anhydrous milkfat and that a combination of whey proteins and lactose can control the extent to which apolar substances can diffuse through the microcapsule's wall.

To determine whether other non-milk derived carbohydrates show similar properties, the combinations of whey proteins and various carbohydrates were investigated for microencapsulation of anhydrous milkfat. The used carbohydrates were selected from the group of maltodextrins, such as maltodextrins of different dextrose equivalence, or corn solids syrup, which are known to be non-surface active and not possessing the emulsification properties, or from commercial carbohydrates possessing emulsification properties. The detailed procedure is described in Example 11.

A. Emulsion Characteristics

Figure 23A:
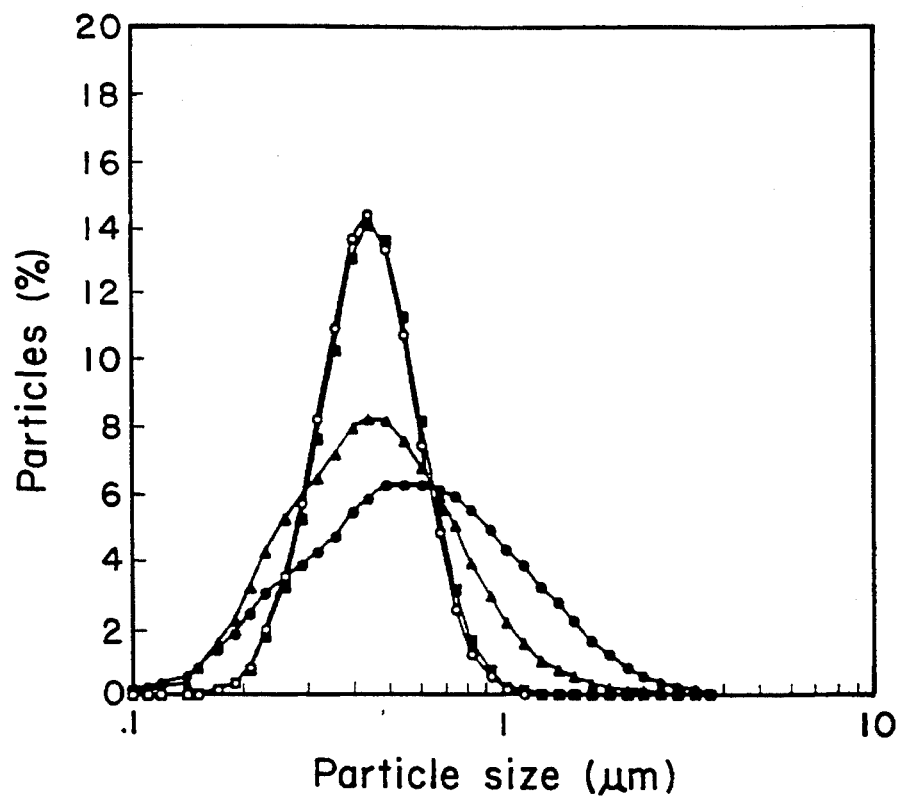
FIGS. 23A and 23B are representative spectra of particle size distribution of anhydrous milkfat emulsified in various wall solutions.
Figure 23B:
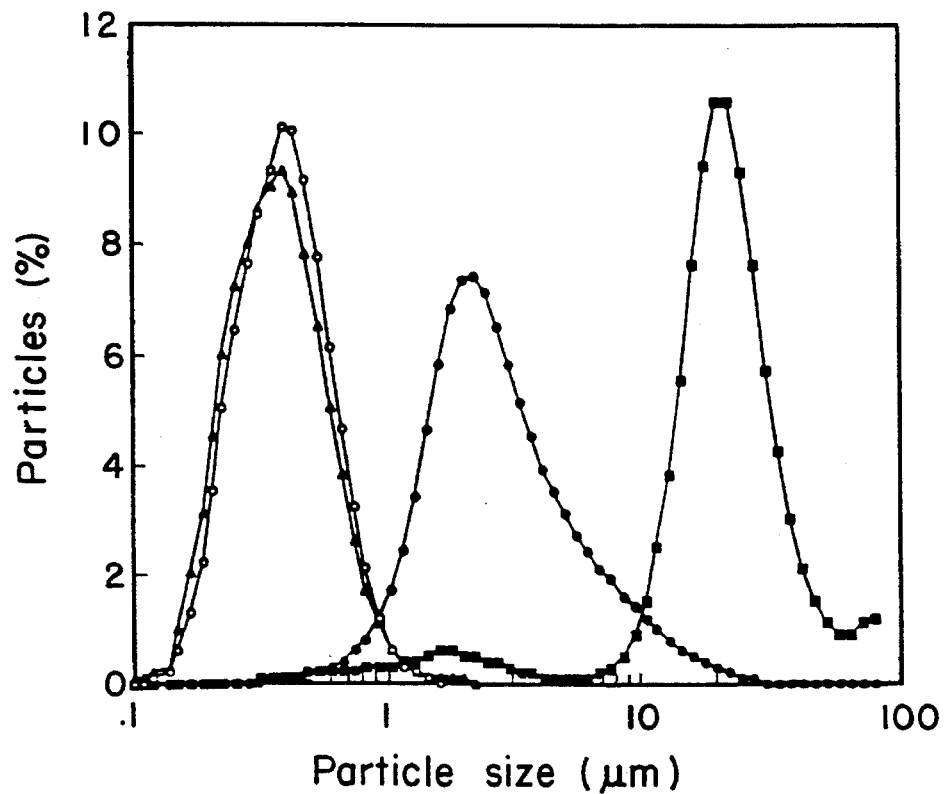

Table 6 and FIGS. 23A and 23B provide the particle size distribution, mean particle size, and specific surface area of the dispersed phase of the various combination emulsions which were investigated.

FIG. 23A shows results obtained from 3:1 mixture of maltodextrin with dextrose equivalent of 11 and whey protein isolate (■), 3:1 mixture of maltodextrin with dextrose equivalent of 18 and whey protein isolate (●), 3:1 mixture of corn syrup solids with dextrose equivalent of 28 and whey protein isolate (▲), and 1:1 mixture of maltodextrin with dextrose equivalent of 11 and whey protein isolate (○).

FIG. 23B shows results obtained from 1:1 mixture of commercial dextrin encapsulating agent (Enc 855) and whey protein isolate (○), 1:1 mixture of commercial modified dextrin encapsulating agent (Nat46) and whey protein isolate (▲), sole Nat46 (■), and sole Enc855 (●).

In all systems consisting of WPI or its combinations with each of the non-surface-active carbohydrates (MD11, MD18, and CSS28), uni-modal particle size distributions with a mean particle size ranging from 0.34 to 0.54 μm were obtained. The mean particle size of the WPI-based emulsion did not differ significantly ($P<0.05$) from that of each of the emulsions in which combinations of WPI and non-surface-active carbohydrate were used. The calculated specific surface area of these emulsions, which indicates emulsification capacity, ranged from 13.8 to 18.9 $m^2$/ml. Increasing the concentration of any of these carbohydrates from 5 to 15% (w/w of wall solids) resulted in decreased specific surface area of the AMF in the emulsions (Table 6). The largest specific surface area was obtained at 25% replacement of WPI by CSS28.

The obtained results indicate that even a relatively low concentration of WPI (5% w/w) present in the wall system is sufficient to enable good emulsification at high (75%, w/w, of wall solids) AMF load.

The two commercial encapsulating agents (NAT46 and ENC855) when used alone were inferior to WPI in their emulsifying capacity. NAT46 alone was inferior to ENC855 alone. However, at a 1:1 (w/w) ratio of WPI to each of these materials, fine emulsions with a mean particle size smaller than 0.4 μm, similar to that obtained for the WPI-based emulsions, as described above, were obtained.

The results clearly show that combinations of maltodextrins or corn solids syrup at ratio WPI: carbohydrate ranging from 3:1 to 1:3 allow good emulsification of high AMF loads (75% w/w of wall solids). In the case of maltodextrins, such emulsification cannot be achieved without the presence of WPI. After homogenization at 50 Mpa (four passes), all combinations of WPI with carbohydrates resulted in fine emulsions having a mean particle size smaller than 0.5 μm. These conditions were therefore selected for preparing the emulsions prior to spray-drying.

TABLE 6

The Effects of Wall Composition on Anhydrous Milk Fat Mean Particle Size and Specific Surface Area, and on Microencapsulation Yield

| WALL COMPOSITION (%) wt/wt | MEAN PARTICLE SIZE (μm) | SPECIFIC SURFACE AR ($m^2$/ml) | MICROENCAPSULATION YIELD (%) |
|---|---|---|---|
| 20% WPI[1] | .40$^c$ | 16.2$^{bc}$ | 97.5$^{ab}$ |
| 15% WPI + 5% MD11 | .37$^c$ | 17.0$^{ab}$ | 96.4$^{ab}$ |
| 10% WPI + 10% MD11 | .42$^c$ | 15.1$^{cd}$ | 98.3$^{ab}$ |

TABLE 6-continued

The Effects of Wall Composition on Anhydrous Milk Fat
Mean Particle Size and Specific Surface Area,
and on Microencapsulation Yield

| WALL COMPOSITION (%) wt/wt | MEAN PARTICLE SIZE (μm) | SPECIFIC SURFACE AR ($m^2$/ml) | MICROENCAPSULATION YIELD (%) |
|---|---|---|---|
| 5% WPI + 15% MD11 | .42$^c$ | 14.9$^c$ | 99.1$^a$ |
| 15% WPI + 5% MD18[3] | .40$^c$ | 17.1$^b$ | 98.5$^{ab}$ |
| 10% WPI + 10% MD18 | .47$^c$ | 15.3$^{cd}$ | 98.3$^{ab}$ |
| 5% WPI + 15% MD18 | .54$^c$ | 13.8$^d$ | 99.4$^a$ |
| 15% WPI + 5% CSS28[4] | .34$^c$ | 18.9$^a$ | 99.3$^a$ |
| 10% WPI + 10% CSS28 | .41$^c$ | 15.1 | 98.7$^{ab}$ |
| 5% WPI + 15% CSS28 | .43$^a$ | 16.1$^{bc}$ | 98.1$^{ab}$ |
| 20% NAT46[5] | 10.10$^a$ | .7$^f$ | 78.2$^c$ |
| 10% WPI + 10% NAT46 | .36$^c$ | 18.2$^a$ | 97.7$^{ab}$ |
| 20% ENC855[6] | 2.38$^b$ | 2.9$^e$ | 95.7$^b$ |
| 10% WPI + 10% ENC855 | .38$^c$ | 17.5$^{ab}$ | 96.9$^{ab}$ |
| SEM | .21 | .60 | 1.03 |

$^{a,b,c,d,e,f}$Means within a column with the same superscript are not different (P > .05). Mean of observations on four preparations.
[1]Whey protein isolate.
[2]Maltodextrin with dextrose equivalent of 11.
[3]Maltodextrin with dextrose equivalent of 18.
[4]Corn solids syrup with dextrose equivalent of 28.
[5]Commercial encapsulating agent, a modified starch.
[6]Commercial encapsulating agent, a dextrin.

Table 6 illustrates the effects of wall composition on mean particle size, on the specific surface area, and on the microencapsulation yield of the microencapsulated anhydrous milk fat in whey protein-carbohydrate wall system.

B. Microencapsulation Yield and Efficiency

Table 6 presents the microencapsulation yield achieved with the various wall systems after spray-drying. In all cases, wall solids concentration was 20% (w/w) and the AMF load was 75% (w/w of wall solids). All combinations of WPI with non-surface-active carbohydrates, that is with MD11, MD18, or CSS28, resulted in MEY of more than 96% and up to about 99.4%. The systems consisting of 5% WPI in combination with 15% MD11 or MD18, or 15% WPI in combination with 5% CSS28 resulted in MEY of more than 99%. This MEY was significantly higher (P<0.05) than that obtained when WPI served as the sole wall material.

The NAT46 showed the lowest MEY obtained with any wall solution and the systems consisting of NAT46 or ENC855 as a sole wall material resulted in MEY that was lower than that obtained with WPI or to that observed for any of the combinations of WPI with non-surface-active carbohydrates. However, a combination of either NAT46 or ENC855 with WPI at a 1:1 ratio (w/w) resulted in MEY that was equal to that of the WPI-based system. The low MEY obtained with the two surface-active carbohydrates is due to their inferiority as an emulsifier for AMF evidences by the presence of the large mean particle sizes in their emulsions as seen in Table 6.

The retention of core material during microencapsulation by spray-drying has usually been studied using volatile core materials. Core losses can be expected until a dry crust is formed around the drying particle (in Flavor Encapsulation. Am. Chem. Soc. Symp. No. 370., page 45, at Am. Chem. Soc. Washington, D.C.). Although AMF is not a volatile material, some losses did occur during the drying process. This can be attributed to the removal of AMF droplets from the surface of the drying particles at an early stage of the drying. The presence of AMF droplets on the outer surfaces of the particles is attributed to the effects of atomization as well as to the effects of internal mixing (in the drying particles) at early stages of the drying, as explained in Am. Inst. Chem. Eng. J., 26:718, (1980). The differences in MEY obtained with the different wall compositions suggest differences in atomization and drying properties among the various emulsions. Such differences are likely to affect the proportion of AMF that can be swept off the surface of the drying particles at early stages of the drying.

Figure 24:
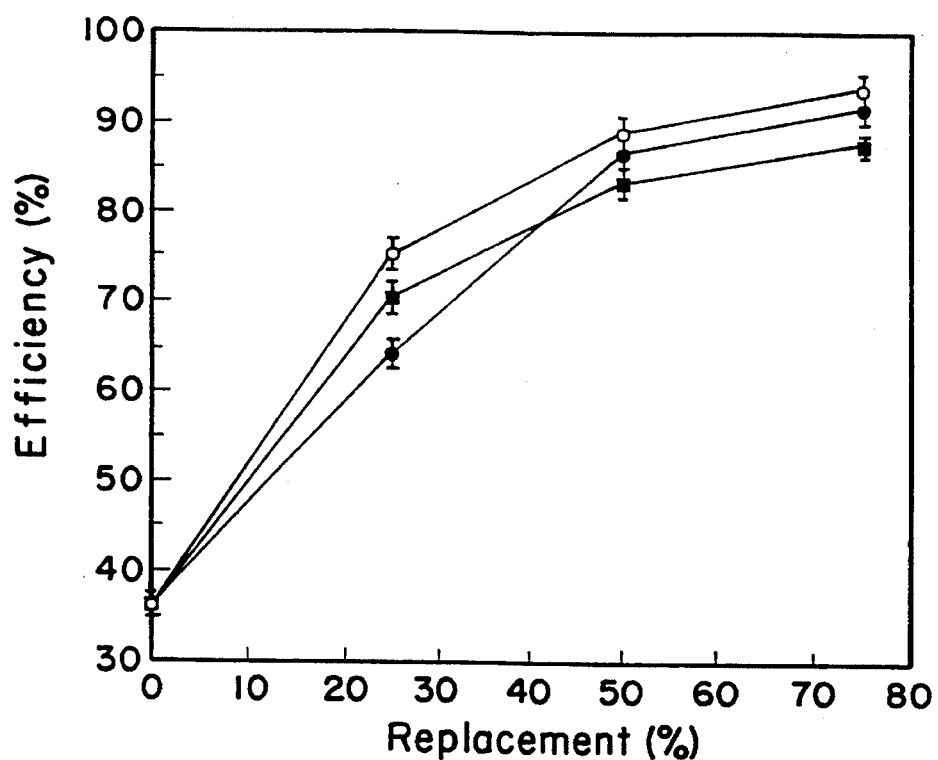
FIG. 24 illustrates microencapsulation efficiency as affected by partially replacing whey protein isolated with maltodextrins.
Figure 25:
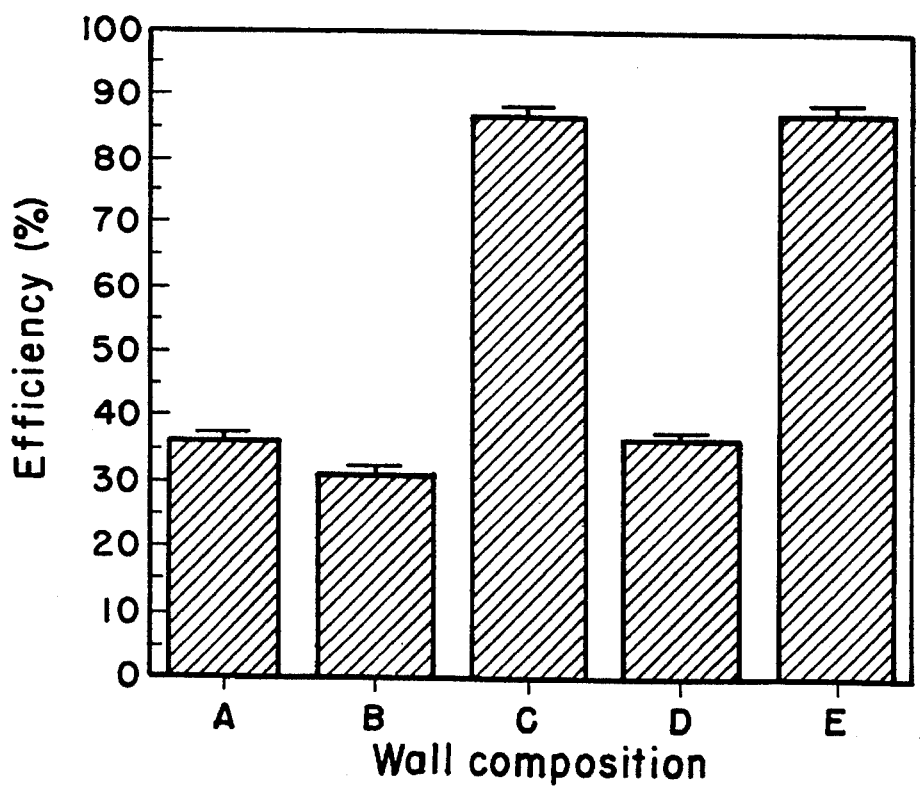
FIG. 25 illustrates effect of wall composition on microencapsulation efficiency.

FIGS. 24 and 25 show the MEE found for the different wall compositions. FIG. 24 illustrates microencapsulation efficiency as affected by partially replacing whey protein isolated with maltodextrins with dextrose equivalent of 11 (■), maltodextrin with dextrose equivalent of 18 (●), or with corn solids syrup with dextrose equivalent of 28 (o). Each data point represents the mean of observations of four preparations. Bars represent standard errors of the means. All combinations of WPI with any of the carbohydrates resulted in MEE higher than that obtained with WPI as a sole wall material are seen in FIG. 24. MEE levels ranging between 70 and 84%, 64 and 91%, and between 74% and 93.5% were obtained for the wall systems containing combinations of WPI with MD11, MD18, and CSS28, respectively, wherein replacement of WPI with the appropriate carbohydrate was 25%, 50%, or 75%. The results seen in FIG. 24 clearly indicate that for all maltodextrin carbohydrates, MEE was increased with increasing proportions of the carbohydrate included in the wall system. The highest MEE was obtained with wall systems consisting of WPI and CSS28 (-o-).

FIG. 25 presents the microencapsulation efficiency of systems consisting of AMF (75% w/w of wall solids) microencapsulated in WPI alone (A), NAT46 alone (B), in a 1:1 (w/w) combination of WPI and NAT46 (C), in ENC855 alone (D), and in a 1:1 (w/w) combination of WPI and ENC855 (E). In all these cases shown in FIG. 25, the wall solids concentration (in the emulsion) was 20% (w/w). Each data represents the mean of observations on four preparations. Bars represent standard errors of the mean. The MEE values of the systems consisting of a combination of WPI and either one of the surface-active carbohydrates NAT46 or ENC855 were similar to each other and were higher (P<0.05) than those obtained for WPI or any of these carbohydrates used as a sole wall material.

The results seen in FIGS. 24 and 25, showing the effects of non-surface-active carbohydrates on the MEE, are in agreement with the results of the effect of lactose on MEE. The results seen in FIGS. 24 and 25 show that higher MEE is obtained in wall system combining WPI with carbohydrates containing higher proportions of low-molecular weight constituents, that is carbohydrates having higher dextrose equivalence values. The high MEE values than that of WPI systems obtained with combination of WPI and carbohydrates wall systems are due to the carbohydrates ability to limit and restrict the diffusion of the extracting solvent through the wall matrix. The results further indicate that the extent to which an apolar substance can diffuse in a whey protein-containing wall matrix is dependent upon the proportion of carbohydrate included in the wall system as well as on the molecular weight profile of the carbohydrate. The carbohydrate included in the wall system acts as a hydrophilic sealant or filler that enhances the hydrophilicity of the wall matrix thus limiting the diffusion of an apolar substance through the wall.

A synergistic effect between WPI and the carbohydrates could be observed in all the systems. In these systems, the WPI served as an effective emulsifier, enabling the fine dispersion of AMF in the wall system either as a single surface-active material or by enhancing the overall emulsification capacity of the wall solution in the presence of other surface-active materials, such as NAT46 or ENC855. In the case of wall solutions consisting of WPI and non-surface-active maltodextrins MD11, MD18, or CSS28, the whey proteins enable the microencapsulation which cannot be achieved otherwise with these carbohydrates in the absence of addition of some surface-active material. In these systems, the carbohydrates act as a filler that enhances the wall hydrophilicity and in this way limits the extraction of AMF from interior parts of the microcapsule.

The improvement of MEY, in the case of the NAT46-containing systems, and MEE for both surface-active carbohydrates NAT46 and ENC855 in the presence of WPI is linked on the effect of WPI on the emulsion properties and on the ability to form stabilizing films at the core/wall interfaces. The low MEE obtained with each of the commercially available microencapsulating agents shows that in these systems significant proportion of AMF was present in the form of surface fat. The latter is linked to the larger mean particle size of AMF in these emulsions.

The results show that the combinations of whey proteins, such as WPI, with carbohydrates that normally lack emulsification properties, such as maltodextrins or corn solids syrup, are effective and functional wall systems, and are advantageously utilized as microencapsulating agents for microencapsulation of AMF or other cores by spray-drying. The results further show that by selecting wall components that exhibit different functional properties, both MEE and MEY can be increased. By using combinations of whey proteins and carbohydrates as wall material, these parameters were improved through enhancement of emulsification properties due to WPI presence, and through the effects of the carbohydrates due to their capability to limit the diffusion of an apolar substance through the wall matrix. Although all the maltodextrins, that is MD11, MD18, and CSS28, combined with WPI, resulted in increasing MEE values compared to the values obtained for WPI-based systems, carbohydrates having high maltodextrin equivalence (DE) are preferred.

WPI can also be used conveniently as a wall constituent for improvement of the microencapsulating properties of commercially available, carbohydrate-based microencapsulating agents, such as NAT46 or ENC855.

These agents combined with WPI, at a weight ratio from about 1:10 to 10:1, preferably about a 1:1 resulted in wall system that has better microencapsulation efficiency and emulsification properties than those achieved by using wall systems consisting of only the carbohydrate alone or the whey protein alone.

The diffusion or migration of an apolar substance through the microcapsule's wall in systems containing whey proteins are determined and controlled by the proportion and type of carbohydrate included in the wall system. A proportion of carbohydrate ranging from 25% to 75% (w/w of wall solids), preferably 75% (w/w of wall solids) minimizes the diffusion of an apolar substance through the wall matrix and its inclusion in the wall system thus improves the microencapsulation properties of the wall system, well beyond what can be achieved by using each of them alone, thereby resulting in synergistic effect.

C. Microstructure of AMF Containing, Spray-dried Microcapsules Where the Wall System is a Combination of WPI and Carbohydrates As seen from the above, mixtures of whey protein isolate and carbohydrates are effective and functional microencapsulating agents for the microencapsulation of anhydrous milkfat by spray-drying and exhibit microencapsulating properties superior to those exhibited by wall systems consisting only of the carbohydrate alone used microencapsulating agents.

The structural characteristics of spray-dried microcapsules are of critical importance to the functionality of the microencapsulated system. The physical characteristics of the microcapsules as well as the protection provided to the encapsulated core by the wall system are affected by the structural features of the microcapsules and by the way the core is organized within the capsule.

The microstructural characteristics, that is the outer and inner structure, of AMF containing spray-dried microcapsules consisting of whey protein isolate and carbohydrates have been investigated using the electron microscopic techniques as described for WPI and WPC systems.

Figure 26:
FIG. 26 is a representative micrograph revealing the outer structure of spray-dried microcapsules containing anhydrous milkfat.

FIG. 26 is a representative micrograph revealing the outer structure of spray-dried microcapsules containing anhydrous milkfat.

FIG. 26 presents a typical outer structure of AMF containing, spray-dried microcapsules consisting of WPI and carbohydrate. The microcapsules presented in FIG. 26 were prepared from an emulsion containing 20% (w/w) wall solids consisting of a 1:1 (w/w) of WPI and a maltodextrin with a DE value of 11. AMF load in the emulsion was 75% (w/w of wall solids). The emulsion was prepared as described above. The emulsion was spray-dried at inlet and outlet temperatures of 160° C. and 80° C., respectively. FIG. 26 presents a bar of 20 μm.

Spherical capsules (2 to 25 μm in diameter) like those presented in FIG. 26 were obtained with all evaluated wall compositions consisting of WPI and carbohydrates. The outer topography does not reveal the deep indentations that are typical to gum arabic or dextrin-based microcapsules, as described in *Food Microstructure,* 7:15 (1988). However, the capsule surfaces are more wrinkled than those found for WPI or WPI/Lac, AMF-containing, spray-dried microcapsules. The surfaces of the AMF containing, NAT46 or ENC855 microcapsules were smooth but exhibited deeper dents than those observed in capsules containing solely WPI or combinations of WPI with these carbohydrates. In all cases the AMF was found to be organized in the form of small droplets (0.1–0.6 μm) embedded in the capsule wall. No visible cracks or pores exposing the AMF droplets to the environment could be detected in the capsules consisting of combinations of WPI and carbohydrates. The addition of carbohydrates did not, in any way, adversely affect the microencapsulation process or formed microencapsules.

The results of these studies show that the addition of carbohydrates, such as maltodextrins, corn solids syrup, NAT46 or ENC855 to the whey proteins improves the microencapsulation of anhydrous milkfat by spray-drying. The results further show that the weight ratio ranging between 1:3 to 3:1 (w/w) of WPI:carbohydrate achieves microencapsulation which provides good physical protection to the encapsulated AMF by such WPI/carbohydrate-based wall system.

VII. Microencapsulation of Volatiles in Wall Systems Consisting of Whey Proteins Among the most important field of application for microencapsulation in food system is the microencapsulation of flavoring and aroma ingredients cores. Such ingredients contain volatile compounds and, in most cases, are prone to deterioration by oxidation, light, etc. Success in microencapsulation of these ingredients depends on their high retention during the microencapsulation process and during the storage, on the way they are organized within the microcapsules, and on the overall protection provided to these cores by the wall system.

Retention of volatiles during microencapsulation by spray-drying has been studied using various cores and wall systems. Volatiles retention during microencapsulation by spray-drying has been shown to be affected by the physicochemical properties and concentration of the wall material, the properties and concentration of the core volatiles, and by atomization and drying conditions. Studies described in *Flavor Encapsulation*, pages 55–76, American Chemical Society Symposium, No. 370, Washington, D.C., (1988) concern encapsulation of the volatile cores using wall systems consisting solely of carbohydrates such as maltodextrins or modified starches, and natural gums such as gum arabic. Microencapsulation of volatiles in whey protein-based wall system has not been previously studied, achieved or reported.

In developing the present invention, the microencapsulation of volatile compounds in wall systems consisting of whey proteins alone or a combination of whey proteins and lactose has been investigated.

A. Effect of Wall Composition on Emulsion Particle Size Distribution

The first stage in microencapsulation by spray-drying is the formation of an emulsion consisting of the core material dispersed in the wall solution.

Figure 27:
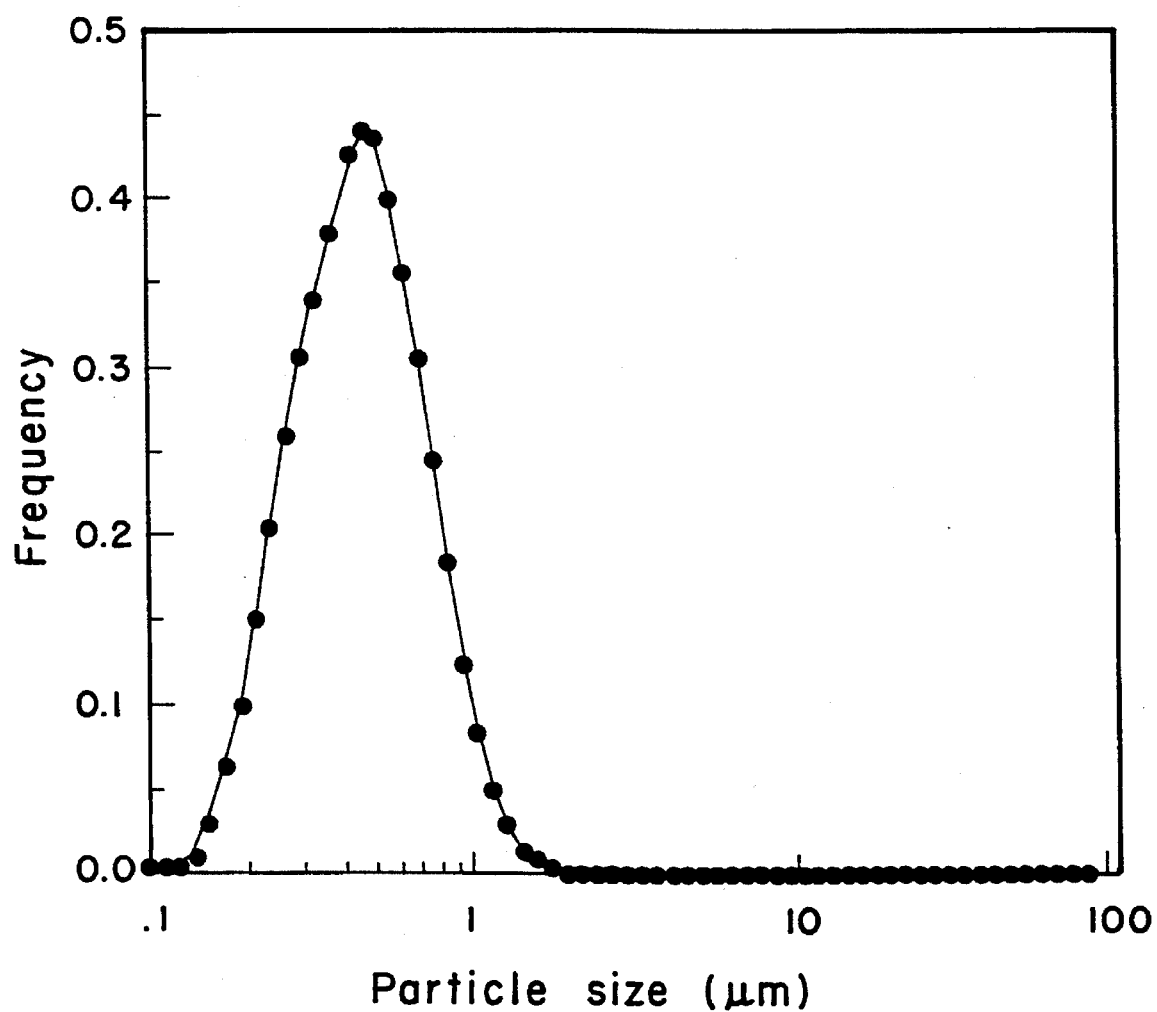
FIG. 27 is a representative particle size distribution of an emulsion consisting of ethyl caprylate and whey proteins isolate.

FIG. 27 is a representative particle size distribution of an emulsion consisting of 30% ethyl caprylate (w/w of wall solids) and 20% WPI solution (w/w). FIG. 27 shows a uni-modal distribution of particles with a mean particle size of about 0.4 µm.

For all of the ECY containing emulsions whether for WPI or WPI/Lac, such uni-modal particle size distribution, similar to that presented in FIG. 27, was observed. Mean particle size ($d_{32}$) ranged from 0.39 to 0.43 µm. Specific surface area in these emulsions ranged from 15.7 to 17.0 m²/ml. No adverse effect of wall type, solids concentration, or core concentration on particle size distribution in the emulsion was detected.

B. Microstructural features

As discussed above, microstructure of the capsules provides important information on the functionality of microcapsules and on the retention of the core within.

Figure 28A:
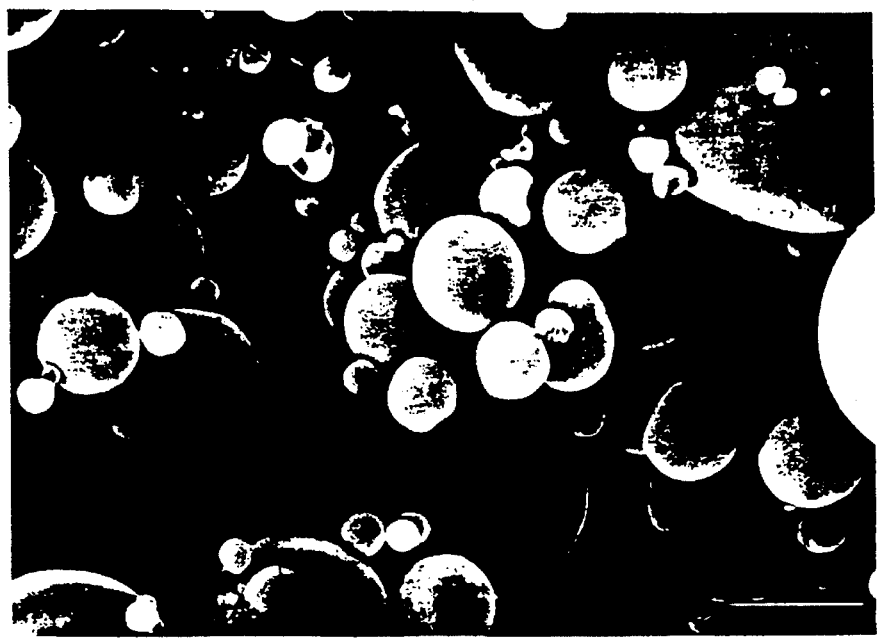
FIGS. 28A and 28B are micrographs of spray dried, whey protein isolate-based, ethyl-caprylate (ECY) containing microcapsules.
Figure 28B:

FIG. 28 are micrographs of spray dried, whey protein isolate-based, ethyl-caprylate (ECY) containing microcapsules. FIG. 28 presents representative micrographs revealing the outer (FIG. 28A) and inner (FIG. 28B) structure of these microcapsules. The presented microcapsules were prepared from an emulsion consisting of 20% (w/w) WPI and 20% (w/w of wall solids) ECY that was dried at inlet and outlet temperatures of 160° C. and 80° C., respectively. FIGS. 28A and 28B present a bar of 10 and 1 µm, respectively. FIG. 28B shows a presence of a central void (CV), ester droplets (ED), outer surface (OS), and the wall (W).

Spherical microcapsules having a diameter ranging from 3 to 40 µm were observed for both WPI and WPI/Lac systems, regardless of ester type or load. In all cases, the microcapsules exhibited only a very limited extent of surface indentation. Regardless of the solids concentration or initial ester load, no cracks or visible pores could be detected on the surface of the capsules.

In all cases, the ester was found to be organized in the form of small droplets (50–600 nm in diameter) embedded in the capsule wall (FIG. 28B). For EB containing capsules, these features were observed only for microcapsules containing more than 30 mg ester/ g wall solids. This finding can be attributed to the partial water solubility of this ester and to major volatile losses that occurred prior to the solidification of the wall matrix as described in *Food Microstructure*, 7:15–23, (1988). The results of these studies indicated that the encapsulated volatile droplets were well isolated from the environment. No visible pores or channels connecting the embedded core droplets with the atmosphere were detected.

C. Volatiles retention and Microencapsulation Efficiency

Achieving a high retention and stability of volatiles within the microcapsules is a primary aim of their microencapsulation. The % retention of the two model volatile esters into whey protein and whey proteins/lactose containing wall systems is seen in Table 7. The amount of ester retained by a unit mass of wall solids after spray-drying is presented in FIG. 29.

TABLE 7

Retention of Volatiles in Whey Protein Containing Wall System

| | | Wall system | | | | | |
|---|---|---|---|---|---|---|---|
| | | WPI | | | WPI/Lac | | |
| Core system | | 10%[1] | 20% | 30% | 10% | 20% | 30% |
| EB | 10%[2] | 2.5[a] | 28.5[b] | 51.0[c] | 12.6[a]* | 21.0[b] | 47.3[c] |
| | 20% | 4.2[a] | 45.0[b] | 59.5[c] | 13.1[a]* | 30.4[b] | 65.7[c] |
| | 30% | 6.4[a] | 52.0[b]* | 65.7[c] | 14.7[a]* | 41.4[b] | 70.4[c]* |
| | 50% | 15.3[a] | 50.6[b]* | | 28.0[a] | 54.3[b] | 76.7[c]* |
| | 75% | 18.8[a] | 35.0[b] | | 41.0[a] | 59.2[b] | 71.3[c]* |
| ECY | 10% | 56.6[a] | 79.5[b] | 87.3[c] | 71.9[c] | 78.2[b] | 92.4[c] |
| | 20% | 46.5[a]* | 74.8[b] | 84.0[c] | 66.5[a]* | 71.9[b]* | 84.5[c]* |
| | 30% | 44.9[a]* | 71.2[bc] | 75.6[c] | 66.6[a]* | 70.3[b]* | 83.5[c]* |
| | 50% | 40.9[a]** | 48.8[b] | | 66.5[a]* | 73.6[b]* | 76.2[c] |
| | 75% | 38.8[a]** | 30.5[b] | | 66.8[a]* | 70.7[a]* | 70.0[a] |

[1]Concentration of wall material (% w/w in wall solution).
[2]Concentration of ester (% w/w of dry wall solids) in the emulsion.
[a,b,c]For a given wall system and core material, means within a row having different letters are significantly different (P < 0.05).
*For a given wall material and core, means within the same column that are marked with the same number of asterisks are not significantly different from each other (P > 0.05).

Table 7 illustrates the retention (%) of ethyl butyrate (EB) and ethyl caprylate (ECY) in wall systems consisting of whey proteins isolate (WPI) or of a 1:1 (w/w) mixture of WPI and lactose (WPI/Lac) during microencapsulation by spray-drying.

FIG. 29 illustrates effects of wall solids concentration and initial ester load on the amount of ethyl butyrate (29A) and ethyl caprylate (29B) retained by a unit mass of wall solids consisting of whey proteins isolate (WPI) or a 1:1 (w/w) mixture of WPI and lactose (WPI/lac).

Figure 29A:
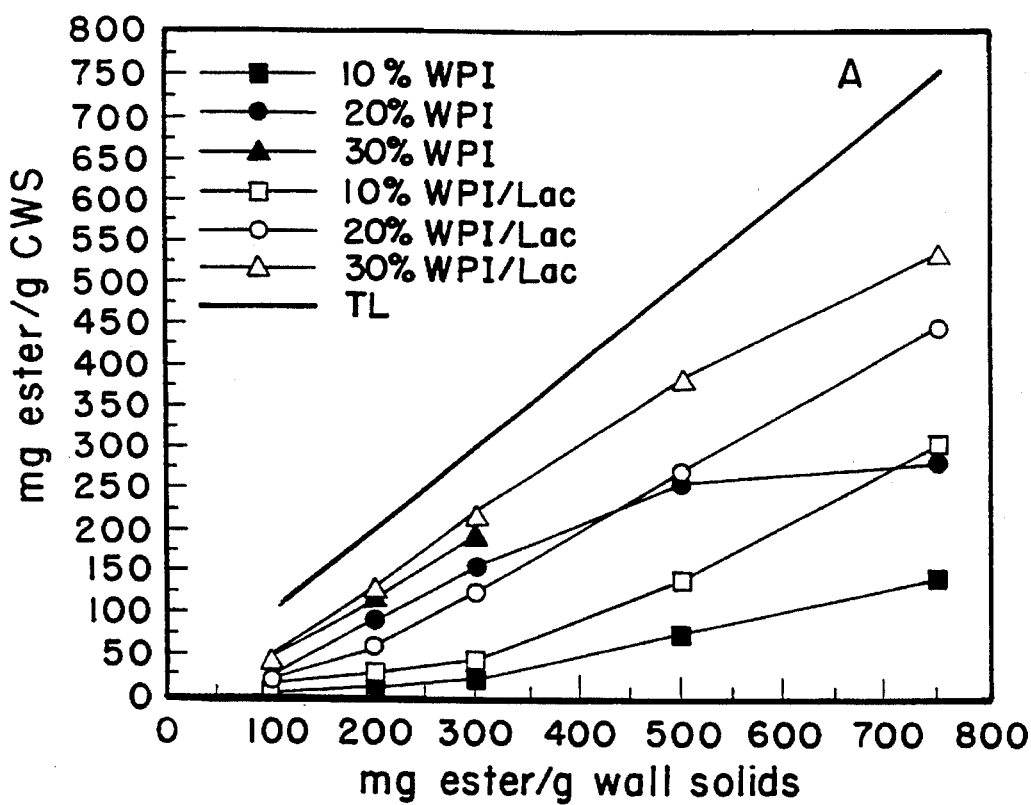
FIGS. 29A and B illustrate effects of wall solids concentration and initial ester load on the amount of ethyl butyrate and ethyl caprylate (29B).
Figure 29B:
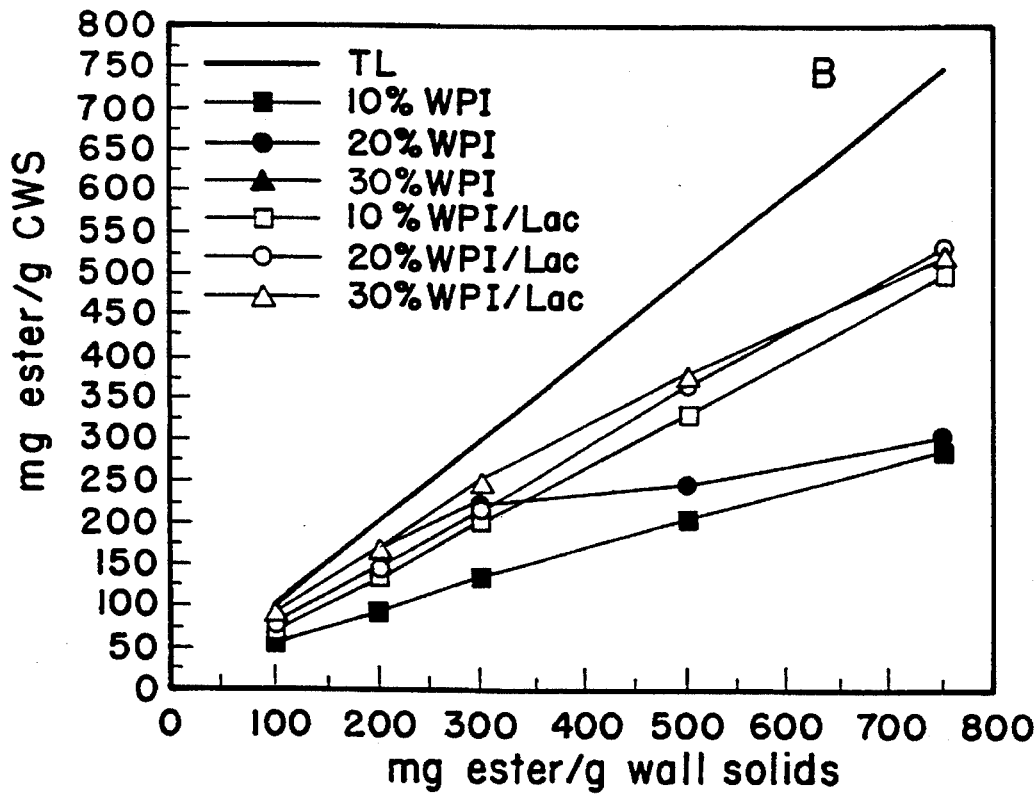

FIG. 29 presents the effects of wall solids concentration (% w/w), wall type (WPI or WPI/Lac), and ester load in the emulsion (mg ester/g wall solids) on the ester content of the dry capsules (mg ester/g wall solids) for the microencapsulation of ethyl butyrate (FIG. 29A) and ethyl caprylate (FIG. 29B).

The results seen in Table 7 and in FIG. 29 indicated that ester retention was influenced by the composition and solids content (prior to drying) of the wall system, by the type of volatile, and by the initial ester load in the emulsion.

As seen in Table 7, for a given ester load, and regardless of ester or wall type, increasing the solids content of the wall solution significantly increased the retention ($P<0.05$). The system that contained 75% ECY emulsified in WPI/Lac was exceptional in this regard. In all cases, the retention of EB in WPI/Lac wall systems was significantly different, and in most cases higher ($P<0.05$) than its retention in WPI. The retention of ECY was less affected by the wall material type. For this case, significant differences ($P<0.05$) in ECY retention (at a given ester load) by the two wall systems were observed for all the initial ester loads only at a 10% wall solids concentration. In the ECY system containing 20% wall solids concentration used for encapsulation of ECY, the superiority of WPI/Lac over WPI was observed only at a certain range of initial ester loads.

At a given wall solids concentration, the amount of EB or ECY retained by a unit mass of wall solids was increased as a function of the initial ester load regardless of wall material type (FIG. 29). However, this effect was more pronounced in the EB (FIG. 29A) containing system than in the ECY (FIG. 29B) one.

In most cases, the % retention of EB was significantly increased ($P<0.05$) by the initial ester load. The % retention of ECY was significantly reduced ($P<0.05$) by increasing initial ECY loads in emulsions consisting of 20% or 30% (w/w) WPI and, to a lesser extent, in those containing 30% (w/w) WPI/Lac.

The lowest % retention of EB or ECY was obtained with wall systems consisting of 10% WPI. The highest % retention of EB (76%) and of ECY (92.4%) was observed after drying the emulsion consisting of 30% WPI/Lac and initial ester loads of 50% and 10% respectively.

Overall, the largest amount of EB that was retained by a unit mass of wall solids (530 mg/g) was observed after drying emulsions consisting of 30% WPI/Lac and 75% (w/w of wall solids) ester. For ECY, a similar maximum was obtained after drying emulsions consisting of 20% or 30% WPI/Lac and 75% (w/w of wall solids) ester. For both EB and ECY, the maximum amounts of ester retained by a unit mass of WPI were 281 and 303 mg/g wall solids respectively. The amounts were observed after drying the emulsion consisting of 20% WPI and having an initial ester load of 750 mg/g wall solids.

At 10% and 30% wall solids concentrations, the retention of ECY in WPI wall systems was significantly higher ($P<0.05$) than that of EB at any of the initial ester loads. However, for the systems containing a 20% wall solids concentration, the above trend was observed only up to an initial ester load of 30% (w/w of wall solids).

The WPI/Lac systems exhibited significantly higher retention of ECY than EB ($P<0.05$) at 10% and 20% wall solids concentration for any of the initial ester loads. At a 30% wall solids concentration, the WPI/Lac- based systems showed higher retention of ECY only at initial ester loads of up to 30% (w/w of wall solids).

The retention levels of EB in both WPI and WPI/Lac wall systems and the retention of ECY in WPI/Lac wall systems were higher and the retention levels of ECY in the WPI based systems were lower at the 10% wall solids concentration, and higher at the 20% or 30% wall solids concentration than those reported in *J. Ag. Food Chem.*, 8:1288–1294, (1990) for gum arabic based systems containing the same esters type and loads.

The results indicated significant effect of WPI or WPI/Lac wall type on the retention of both EB and ECY. The main difference between these two wall systems is the presence of lactose in the WPI/Lac. The results suggest that lactose enhanced crust formation by improving the drying properties of the wall system.

The appreciable differences that were observed between the retention of EB and ECY seem to be due to differences in the physico-chemical characteristics of these esters. Ethyl butyrate has a limited water solubility of 1:150 parts of water, while ECY is not water soluble. These differences affect the mechanism of volatile retention during spray-drying.

The results indicated that the amount of ester retained by the dry wall systems increased as a function of the initial ester load. However, calculating the amounts of ester that were lost in each case indicated that increasing proportions of ester were lost as the initial ester load was increased. Increasing the ester load in the emulsion increased the number of core droplets per unit volume of emulsion. This increased the proportion of ester that was lost during or immediately after atomization as well as increased the proportion of ester that was present at the outer surface and can thus be lost during early stages of drying. Additionally, the average path from core droplets to the surface is reduced as the proportion of ester droplets in the drying particle increases, and thus higher losses can be expected as long as mobility towards the surface is possible. For systems containing core materials that are partially water soluble, such as EB, the ultimate retention is determined by the combined effects of molecular diffusion and core droplet mobility.

Figure 30A:
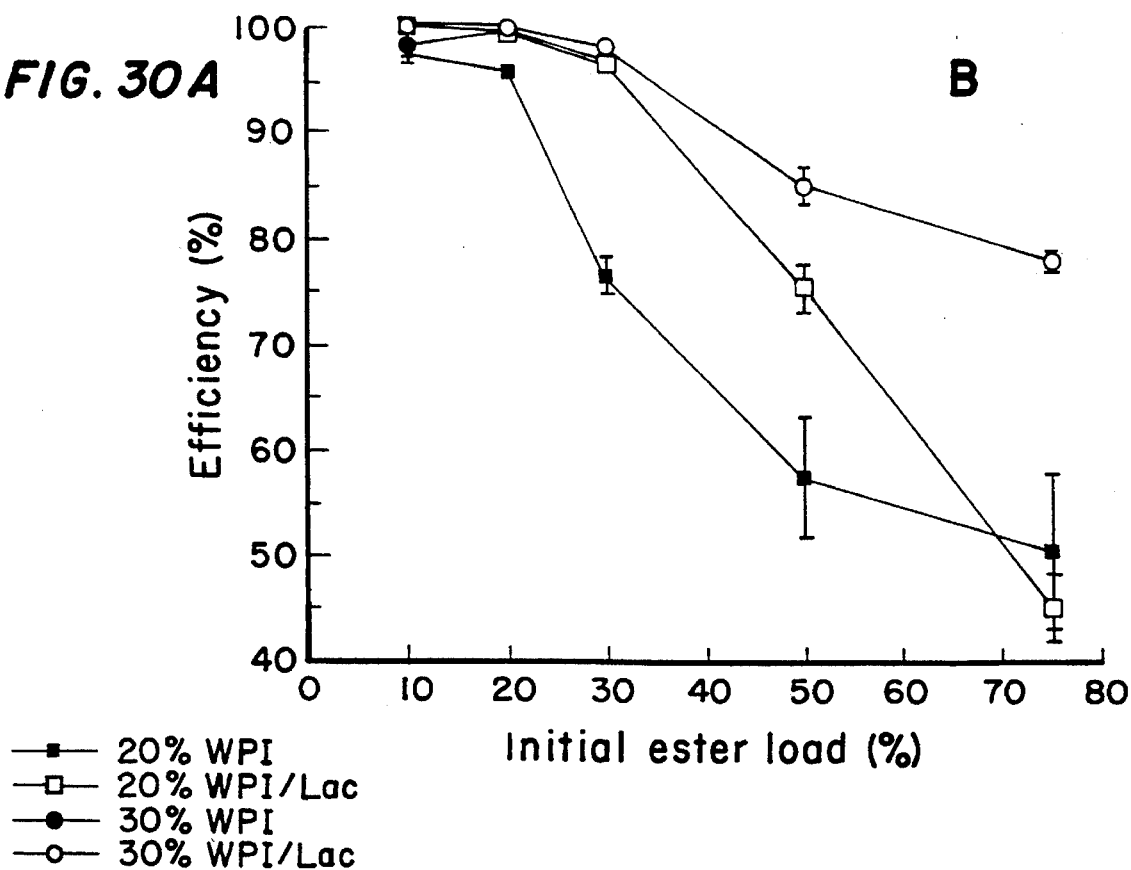
FIGS. 30A and 30B show effect of wall solids concentration and initial ester load on microencapsulation efficiency for systems containing ethyl butyrate (A) or ethyl caprylate (B).
Figure 30B:
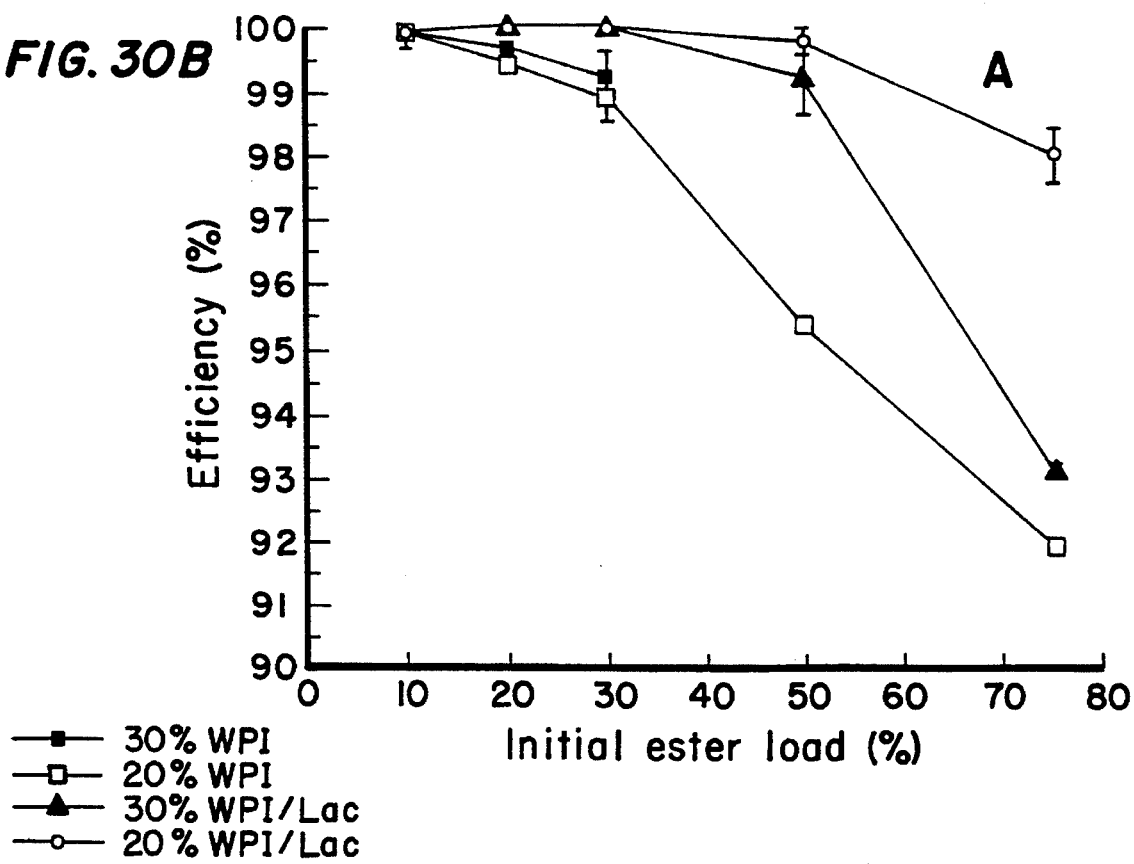

Representative encapsulation efficiency data is presented in FIG. 30. The results show that the amount of ester that could be extracted from the dry microcapsules was affected by wall material type and concentration as well as by the initial ester load. For both EB and ECY, wall systems consisting of WPI/Lac provided better protection against extraction than the WPI ones. The superiority of WPI/Lac became more evident as ester content was increased. For microcapsules that have been prepared from emulsions containing up to 30% (w/w of wall solids) ester and wall systems consisting of 20% or 30% WPI/Lac or 30% WPI, more than 99% of the encapsulated ester could not be extracted during a short contact time with the solvent. This, and the good solubility of the esters in the solvent, shows that the most of the ester was truly encapsulated. Lower efficiency values were observed at higher initial ester loads and this can be attributed to both higher proportions of surface core and to an increase in the amount of retained ester that is available to solvent diffusing through the wall matrix.

The results show that wall systems consisting of whey proteins alone or in a combination with lactose are effective microencapsulating agents for the microencapsulation of volatile substances. The wall solids concentrations ranging from 10 to 30%, preferably 30%, are suitable in the microencapsulation of volatile compounds and high retention levels of more than 90% of volatiles can be obtained using whey protein based wall system. The wall systems consisting of a 1:1 (w/w) combination of whey protein isolate and lactose are superior to those consisting of WPI. The presence of lactose is of importance for volatile core microencapsulation when potential losses of the product through the capsule wall and during storage is considered.

VIII. Microencapsulation of Volatiles in Wall Systems Consisting of Whey Proteins and Carbohydrates The microencapsulating properties of wall systems consisting of combinations of whey proteins and carbohydrates for microencapsulation of non-volatile core material were described previously. An effect of the microencapsulating properties of the wall systems consisting of whey proteins and carbohydrates was investigated on microencapsulation of volatile core materials. Procedure used for these studies is described in Example 8.

A. Emulsion Characteristics

The particle-size distribution of ECY emulsified in the various wall solutions containing carbohydrates (COH) is presented in FIG. 31, and the specific surface area and mean droplet diameter ($d_{32}$) of the emulsions are presented in Table 8.

Figure 31A:
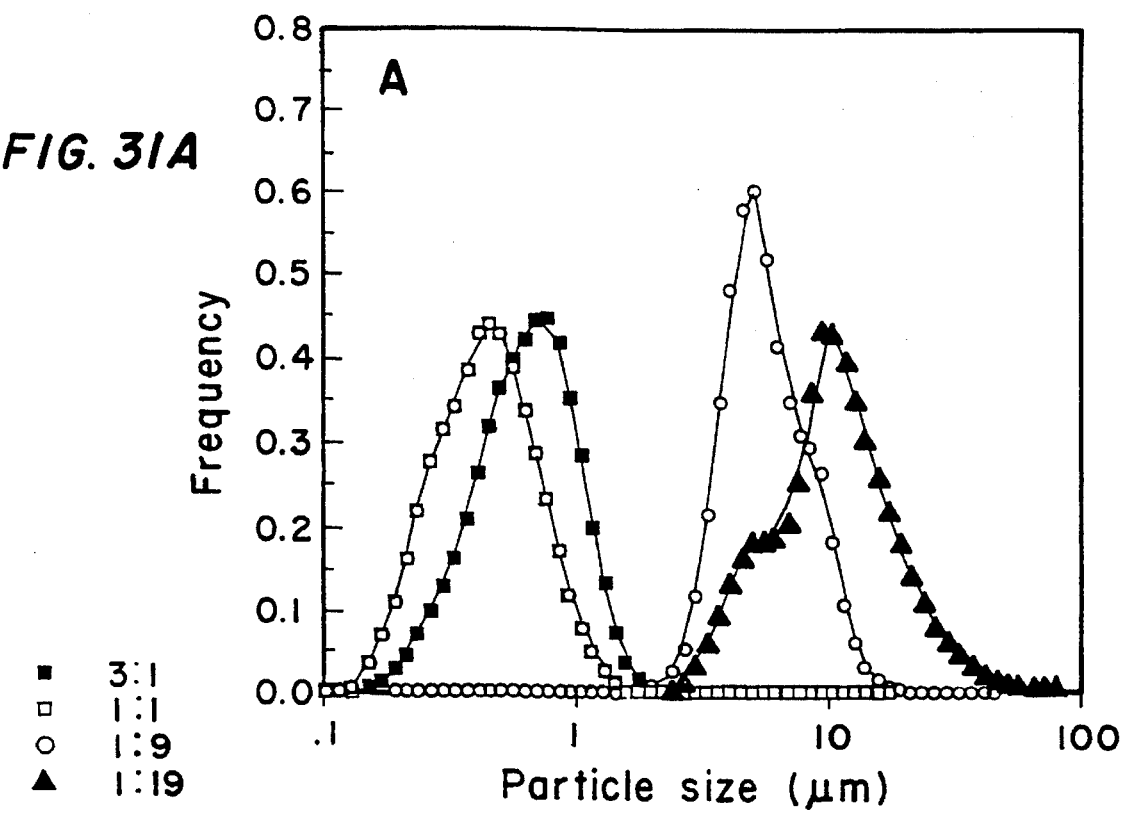
FIGS. 31A and 31D show particle size distribution of microcapsules containing a volatile core.
Figure 31B:
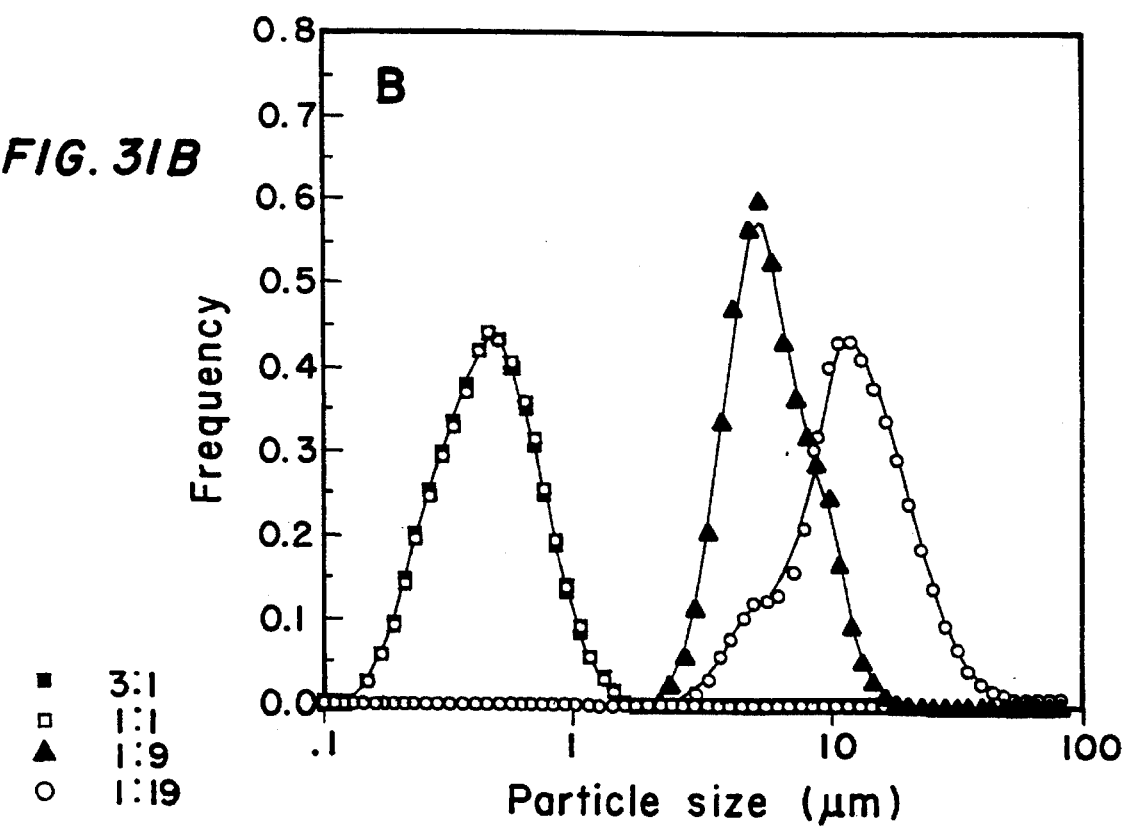
Figure 31C:
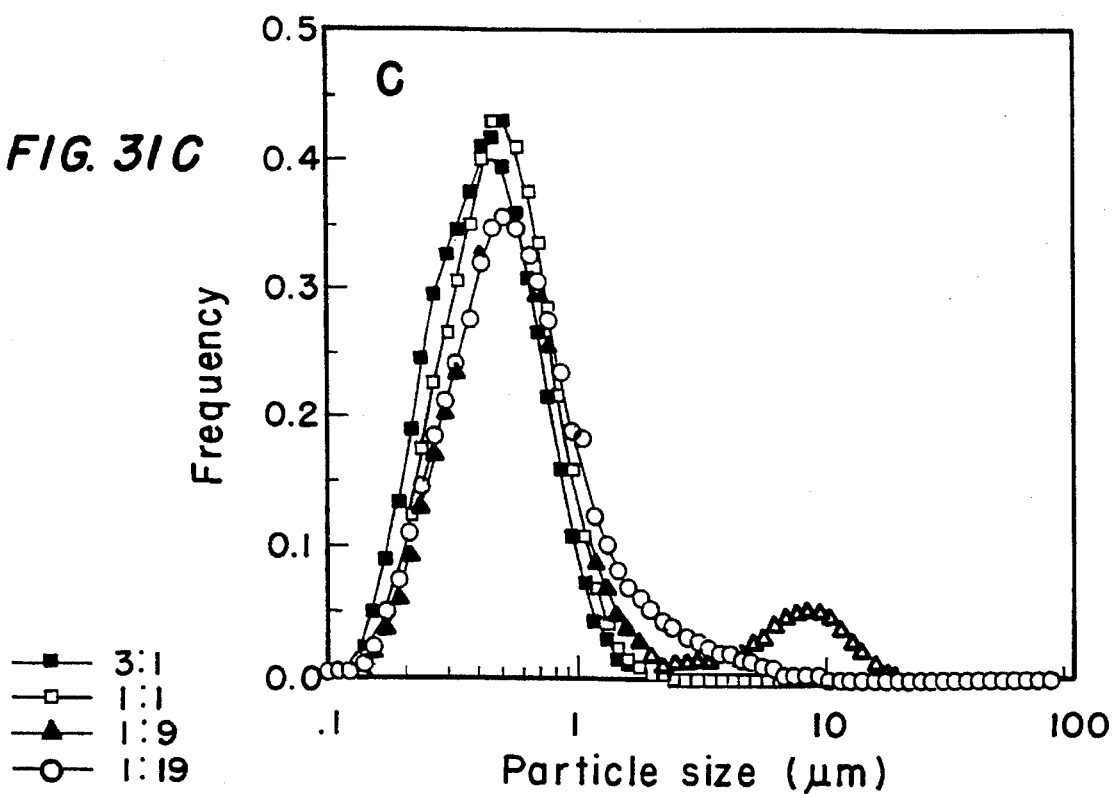
Figure 31D:
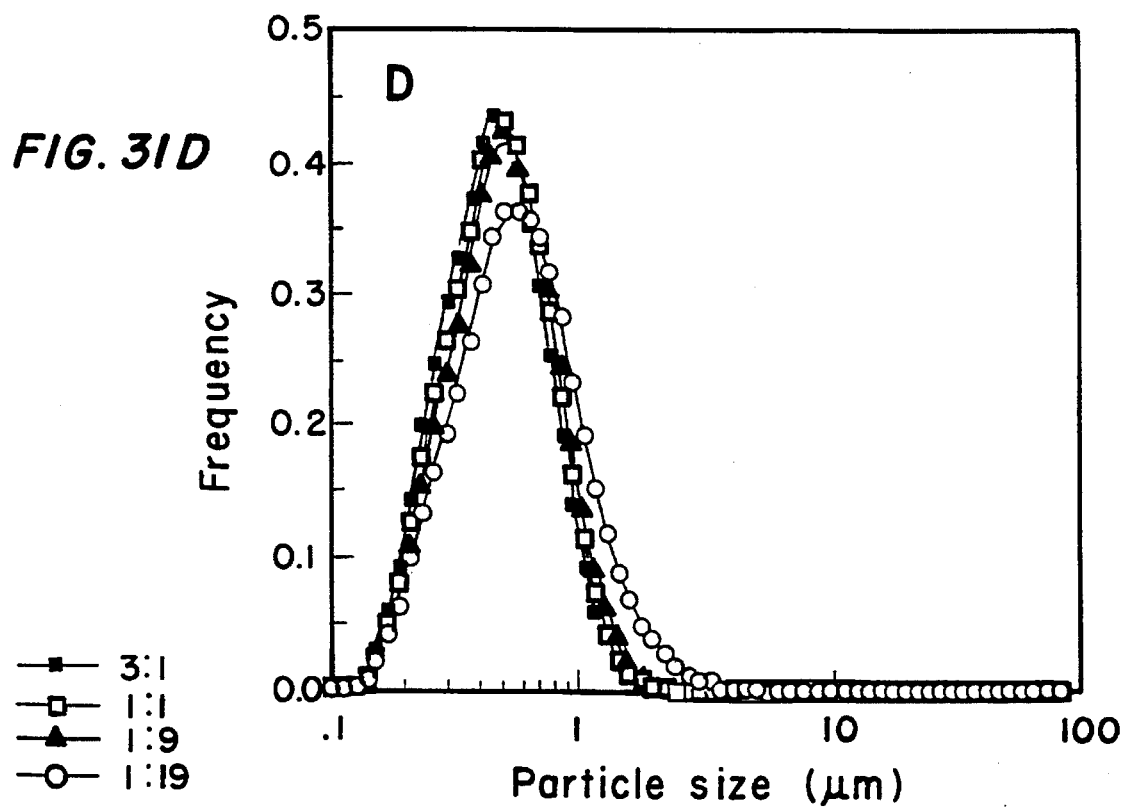

FIG. 31 shows representative particle size distributions of ECY in emulsions stabilized by different combinations of WPI with MD5 (FIG. 31A), MD10 (FIG. 31B), MD15 (FIG. 31C), and CSS (FIG. 31D). In all of these cases, the concentration of wall solids was 25% (w/w), and the ECY concentration was 30% (w/w of wall solids). FIG. 31 presents WPI/COH ratios of 1:19, 1:9, 1:1, and 3:1.

were observed within each of these two groups. The systems consisting of WPI and carbohydrate at a 1:1 ratio did not show any significant effect of DE value on $d_{32}$, while at the 3:1 ratio, a significant effect (P<0.05) was observed only for MD5. The $d_{32}$ of the WPI-based system was 0.43 µm and significantly differed from that of the WPI/MD5 and the WPI/MD10 systems at the 1:19 and 1:9 mass ratios.

The results of these studies show that for wall systems consisting of WPI and one of the above mentioned carbohydrates, careful adjustment of the WPI/COH ratio is needed in order to achieve a core mean particle size of about 0.5 µm. Most suitable ratio for WPI/MD5 is ratio ranging from 1:19 to 3:1, preferably 1:1. The most suitable ratio for WPI/MD10 is from 1:19 to 3:1, preferably 1:1 or 3:1. The most suitable ratio for MD15 is ratio ranging from 1:19 to 3:1, preferably 1:1 or 3:1. The most suitable ratio for WPI/CSS is ratio ranging from 1:19 to 3:1.

B. Ester Retention

TABLE 8

Microencapsulation of volatiles in Whey Proteins Carbohydrate Wall System

| | Ratios of WPI to carbohydrates | | | | | | | |
|---|---|---|---|---|---|---|---|---|
| | 1:19 | | 1:9 | | 1:1 | | 3:1 | |
| | $d^1$ | $A^2$ | d | A | d | A | d | A |
| MD5[3] | 8.71$^a$ | 0.70$^x$ | 5.07$^b$ | 1.19$^x$ | 0.37$^c$ | 16.4$^y$ | 0.53$^c$ | 11.6$^z$ |
| MD10 | 9.94$^a$ | 0.62$^x$ | 5.05$^b$ | 1.20$^x$ | 0.39$^c$ | 15.81$^y$ | 0.39$^c$ | 16.0$^y$ |
| MD15 | 0.46$^a$ | 13.50$^x$ | 0.48$^a$ | 13.01$^x$ | 0.41$^a$ | 15.07$^x$ | 0.36$^a$ | 17.23$^x$ |
| CSS | 0.46$^a$ | 13.31$^x$ | 0.42$^a$ | 14.50$^x$ | 0.41$^a$ | 15.1$^x$ | 0.39$^a$ | 15.80$^x$ |

[1]$d_{32}$ mean values (µm).
[2]Specific surface area mean values (m$^2$/ml).
[3]MD5, MD10, MD15 are: maltodextrins with DE value of 5, 10, and 15, respectively; CSS — Corn syrup solids with a DE of 24.
$^{a,b,c}d_{32}$: means within the same row followed by different letters are significantly different (P < 0.05).
$^{x,y,z}$Specific surface area means within the same row followed by different letters are significantly different (P < 0.05).

Table 8 illustrates mean particle size ($d_{32}$) and specific surface area of ethyl caprylate (ECY) emulsified in wall solutions consisting of mixtures of WPI and various carbohydrates. In all cases, ester load was 30% (w/w of wall solids) and wall solids concentration was 25% (w/w).

The results indicated appreciable influence of both the ratio between WPI and the carbohydrate (WPI/COH) and dextrose equivalence value (DE) on emulsion particle-size distribution. For emulsions consisting of WPI and MD5 or MD10, the effect of wall solution composition on particle-size distribution was more pronounced at WPI/COH ratios of 1:19 and 1:9 than in systems containing higher proportions of WPI. The systems containing WPI/MD5 or WPI/MD10 at a WPI/COH ratio of 1:1 or 3:1 exhibited particle-size distribution similar to that reported for WPI/ECY emulsions. Particle-size distribution of emulsions consisting of MD15 or CSS were less sensitive to the WPI/COH ratio than the emulsions containing MD5 or MD10. The results indicated a significant effect (P<0.05) of the WPI/COH ratio on $d_{32}$ in systems consisting of WPI and MD5 or MD10, while in systems consisting of MD15 or CSS this effect was not evident. Comparing the effect of the carbohydrate DE values at a given WPI/COH ratio on $d_{32}$, revealed differences among the various wall systems. At WPI/COH ratios of 1:19 and 1:9, significant differences (P<0.05) were observed between systems containing MD5 or MD10 and those containing MD15 or CSS. No significant differences The retention of ECY in the various wall systems after microencapsulation by spray-drying is presented in Table 9.

TABLE 9

Retention of Volatiles in Whey Protein-Carbohydrate Wall System

| | Ratio of WPI to carbohydrates | | | |
|---|---|---|---|---|
| | 1:19 | 1:9 | 1:1 | 3:1 |
| Maltodextrin (DE = 5) | 70.33$^{d1}$ | 75.38$^c$ | 82.30$^{abx}$ | 84.73$^{ax}$ |
| Maltodextrin (DE = 10) | 86.85$^{abx}$ | 91.35$^{ax}$ | 73.99$^c$ | 81.64$^{bx}$ |
| Maltodextrin (DE = 15) | 79.72$^b$ | 90.10$^{ax}$ | 80.02$^{bx}$ | 79.16$^{bx}$ |
| Corn syrup solids (DE = 24) | 85.50$^{abx}$ | 90.70$^{ax}$ | 81.00$^{bx}$ | 90.43$^{ax}$ |

[1]Means within the same row followed by different letters are significantly different (P < 0.05).
$^x$Means within the same column that are not significantly different (P < 0.05).

Table 9 illustrates retention (%) of ethyl caprylate in wall systems consisting of mixtures of whey protein isolate (WPI) with various carbohydrates. In all cases, wall solids concentration was 25% (w/w) and ester load was 30% (w/w of wall solids).

The highest retention level (91.35%) was exhibited by wall systems consisting of WPI/MD10 (1:9) and was similar (P>0.05) to that obtained by wall systems consisting of WPI/MD10 (1:19), WPI/MD15 (1:9), and WPI/CSS (1:9 and 3:1). All of the other wall systems exhibited retention levels that were significantly lower (P<0.05). Comparing the retention levels obtained by using a wall system consisting of a 25% WPI solution (71.85%) with that obtained by using the various WPI/COH wall systems revealed that with exception of three systems (WPI/MD5 1:19, WPI/MD5 1:9; and WPI/MD10 1:1), the retention level of the WPI-based system was significantly lower (P<0.05) than that obtained by the WPI/COH-based wall systems.

The wall systems consisting of WPI/MD5 combinations exhibited a significant increase (P<0.05) in ester retention with an increasing proportion of WPI in the wall system. However, the retention levels observed for the 1:1 and 3:1 combinations were similar. The retention of volatiles during microencapsulation by spray-drying was enhanced by reducing the mean particle size of the dispersed core material. This, and the aforementioned observations regarding the $d_{32}$ of the WPI/MD5 emulsions, shows that ECY retention in these wall systems was improved by reducing the $d_{32}$ of ECY. The retention levels observed for the WPI/MD15, and for the WPI/CSS indicated a smaller effect of the WPI/COH ratio on the retention than that observed for the WPI/MD5 or the WPI/MD10 systems. These findings are in accord with the results regarding the effect of COH type and ratio on core particle size distribution in the emulsion stage and thus provide evidence for the role of $d_{32}$ in affecting volatile retention in WPI/COH systems and further indicates that the type of carbohydrate used, and especially its DE value affects volatile retention.

The mean particle size was not the only parameter that affected ECY retention. As has been mentioned above, most of the WPI/COH wall systems resulted in retention levels that were significantly higher than that exhibited by a WPI-based wall system. Although the $d_{32}$ of some of the systems (such as WPI/MD10 1:19) was significantly (P<0.05) larger than that of the WPI-based system, the retention levels obtained with the WPI-based system was lower. In other cases, although no significant differences were observed between the $d_{32}$ of the WPI-based system and some of the WPI/COH systems, the retention level obtained with the WPI-based system were inferior to those obtained with the WPI/COH-based wall systems. The incorporation of carbohydrates into the wall systems seems to improve the drying properties of the wall matrix and thus enhance the formation of a dry crust around the drying droplets.

The retention of volatile core in whey proteins containing wall systems is enhanced by incorporating maltodextrins or corn solids syrup into the wall system. Both the proportions of the included carbohydrate and its DE value affect volatile core retention. WPI/COH ratio ranging from 1:19 to 3:1, preferably 3:1 for MD5, 1:19 or 1:9 for MD10, 1:9 for MD15, and 1:9 or 3:1 for CSS are the most preferable and are to be selected in order to achieve high volatile retention level.

C. Microstructure

FIG. 32 presents representative micrographs revealing the structural characteristics of ECY containing, spray-dried microcapsules consisting of various WPI/COH-based wall systems. FIGS. 32A, 32B, and 32C reveal the outer topography of microcapsules prepared from emulsions having the following wall compositions. Wall composition in FIG. 32A is WPI/MD5 (1:19); in FIG. 32B is WPI/MD15 (1:19); in FIG. 32D is WPI/MD15 (3:1); in FIG. 32D is WPI/CSS (1:9). Visible in the Figure are ester droplets (ED), inner void (IV), outer surface (OS), surface cracks (SC). In all cases, the total solids concentration of the continuous phase was 25% (w/w) and the ester load was 30% (w/w of wall solids). In all cases the emulsions were dried at inlet and outlet temperatures of 160° and 80° C., respectively. Bar is 10 μm for FIGS. 32A to 32C, and 5 μm for FIG. 32D. Representative inner structure of the microcapsules is presented in FIG. 32D for microcapsules prepared from an emulsion consisting of WPI/CSS at a 1:9 (w/w) ratio.

In general, wall systems containing high proportion of carbohydrates, and especially in the case of MD5 and MD10, were associated with a very high extent of surface indentation. Increasing the proportion of WPI in the wall systems impressively limited the extent of this phenomenon. The significant structural differences suggest appreciable differences in the drying properties of the various systems and in their rheological properties (prior to complete drying). Similar effects observed for whey proteins highlight the positive effect of whey proteins on the microstructural features of spry-dried microcapsules were described above. Additionally, the observed structural differences suggest different effective surface-to-volume ratios during drying of the different systems. These differences affect the ECY retention during drying and can thus be accounted, to a certain extent, for the various retention levels obtained with the different wall systems.

Figure 32A:
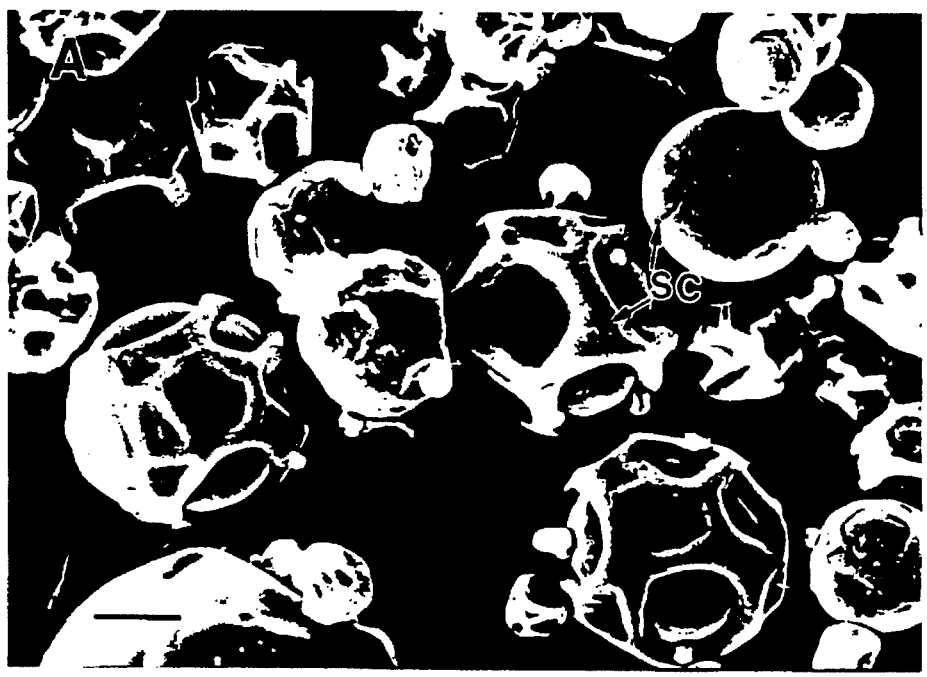
FIGS. 32A through 32D are representative micrographs showing the outer topography (A–C) and inner structure of ECY-containing microcapsules.
Figure 32B:

The structural analyses revealed the presence of surface cracks in systems containing high proportions of MD5 or MD10 (FIG. 32A). These features were not found in capsules containing MD15 or CSS. The presence of surface cracks in some of the systems containing maltodextrins can be attributed to the brittle nature of the dry matrices in these cases. The absence of surface cracks in systems containing carbohydrates with relatively high DE values may be attributed to the better film-forming properties of these materials in comparison to those having a lower DE value, increasing the proportion of WPI in MD5 or MD10 containing wall systems eliminated surface cracks.

Figure 32C:
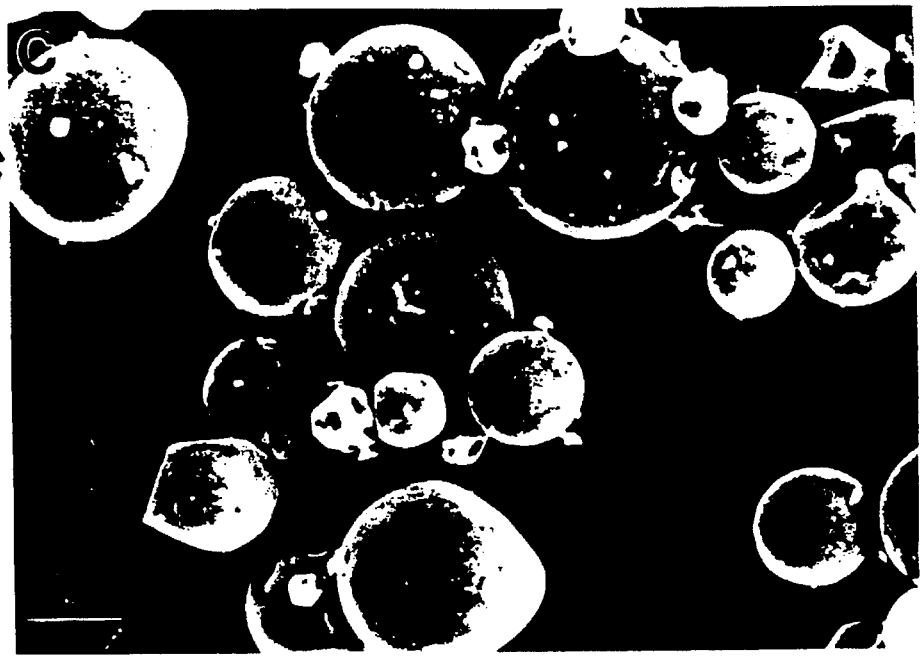
Figure 32D:

The inner structure of the capsules seen in FIG. 32D show that in all cases the core material was organized in the form of small droplets embedded in the wall matrix. The inner structure of the capsules was similar to that reported for spray-dried, volatiles containing microcapsules in general, and to that of whey protein-based ones as well. The structural characteristics were similar to those reported above for WPI or WPI/Lac based microcapsules. For systems consisting of WPI in combination with MD15 or with CSS, and for systems consisting of WPI and MD5 or MD10 at a (w/w) ratio of WPI:COH of 1:1 or 3:1, no cracks or visible pores connecting the outer environment with the core droplets were detected. In these cases, the structural features indicate good physical protection provided to the core material by the wall systems.

The results show that the proportion of WPI included in the wall system significantly affect the extent of surface indentation. This effect is important considering the adverse effect of surface indentation on the flowability and wettability of powders.

The wall systems consisting of WPI and maltodextrins or corn solids syrup are effective microencapsulating agents for volatile core materials. WPI/COH ratio ranging from 1:19 to 3:1, preferably 1:1 or 3:1 for MD5, 1:9, 1:1, or 3:1 for MD10, and 1:1 to 3:1 for MD15 or CSS should be selected in order to prevent structural defects in the form of cracks. In all WPI/COH wall systems, the volatile core is organized in the form of droplets (0.1–0.6 μm in diameter) embedded in the wall matrix.

D. Core extractability and Microencapsulation Efficiency

Figure 33:
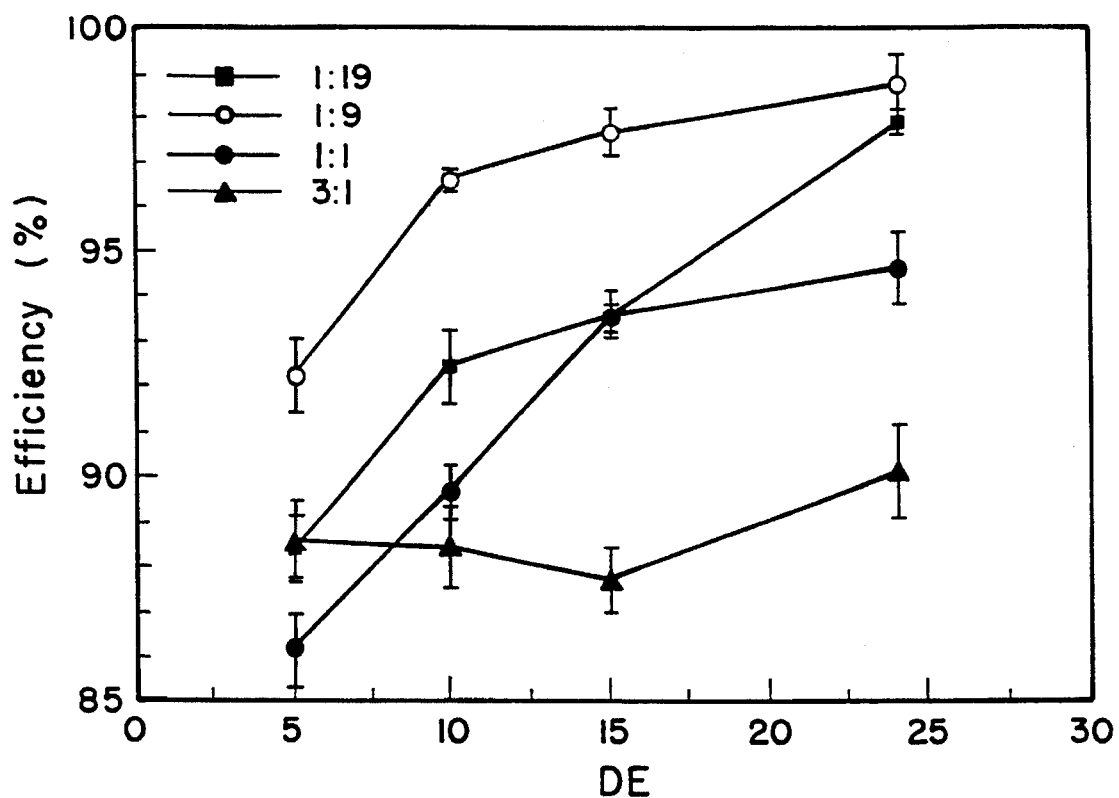
FIG. 33 illustrates microencapsulation efficiency of whey protein carbohydrate mixtures for volatile cores.

The proportion of ester that could not be extracted from the dry capsules (MEE) is presented in FIG. 33.

FIG. 33 presents the MEE for microcapsules prepared from emulsions consisting of WPI in combination with MD5, MD10, MD15, and CSS. WPI/COH ratio of 1:19 (-■-), 1:9 (-o-), 1:1 (-●-), and 3:1 (-▲-) are presented for each of the COH used.

The results shown indicated that increasing the DE value of the carbohydrate appreciably limited the proportion of ester that could be extracted from the dry microcapsules. The highest MEE values were obtained at a WPI/COH ratio of 1:9. The amount of core material that can be extracted from whey protein-containing, spray-dried microcapsules represents the proportion of core that was on the surface of the dry particles and a proportion of a truly encapsulated core that was extracted by a leaching process. Carbohydrates limit core extractability by increasing the hydrophilic nature of the wall system which limits the diffusion of an apolar substance through the wall matrix. The positive effect of DE value on MEE, as presented in FIG. 33 is due to increasing proportions of low molecular weight carbohydrates associated with increasing DE values. Overall, the lowest MEE values were obtained with wall systems having a WPI/COH ratio of 3:1, almost regardless of the DE value. In most cases, the MEE values observed for systems containing carbohydrates with a DE value higher than 5 were higher than that of WPI-based, ECY-containing microcapsules (87%) that were prepared under the same conditions. In light of the above, it was expected that a higher proportion of COH in the wall system would always lead to high MEE values. However, some of the systems containing high proportions of MD5 or MD10 resulted in relatively low MEE. In these cases, the presence of cracks that could be identified on the surface of the dry capsules as seen in FIG. 32A was linked to the relatively low MEE. MEE was affected by the type of carbohydrate used and by its proportion in the wall relative to the proportion of whey proteins. MEE was influenced by these parameters through their effects on the hydrophilicity of the wall, the ratio of high to low molecular weight carbohydrates, and by the structural characteristics of the dry systems. Additionally, the effect of DE on ester particle size (in the emulsion) also affected MEE through the effect on the ester proportion that was in the form of surface oil.

Combinations of whey proteins and maltodextrins or corn syrup solids are effective microencapsulating agents for volatiles. The DE value of the carbohydrate and the mass ratio between the whey proteins and the carbohydrate affect the particle size distribution of the core in the infeed emulsion, the retention of the volatile, its extractability from the dry capsules, and the microstructural characteristics of the microcapsules. Mixtures of whey proteins and maltodextrins or corn syrup solids are effective for volatile cores microencapsulation by spray-drying, and high volatile retention levels is accomplished even at a low WPI/COH ratio. In these wall systems the whey proteins serve as emulsifying and film-forming components while the carbohydrates serve as matrix or filler compounds having good drying properties and incorporation of carbohydrates into whey protein-containing wall systems limits the extractability of the core by an apolar solvent. The latter may be advantageous in various applications. A selection of the particular carbohydrate and its proportion in the wall system to be used for particular volatile cores allow high retention levels. In this regard, MD15 and CSS carbohydrates are superior over MD5 or MD10 for volatile core microencapsulation.

IX. Microencapsulating Properties β-lactoglobulin, Mixture of β-lactoglobulin and α-lactalbumin, and Heat-treated Whey Proteins In developing this invention, the microencapsulating properties of fractionated whey proteins, that is, β-lactoglobulin (β-lg) and a mixture of separated β-lactoglobulin (β-la) and α-lactalbumin (α-la), and of heat treated whey proteins were studied. Anhydrous milkfat served as a model core materials. Procedure used for these studies is described in Example 12.

A. Emulsion Characteristics

The viscosity of the emulsion was significantly affected by the type of wall system as seen in Table 10. The viscosity of the heated WPI system was higher than that prepared from WPI that was not heated. The effect of heating on viscosity is attributed to the unfolding of the globular proteins and the formation of S-S bonds between protein molecules as described in *Proteins at Interface: Physicochemical and Biochemical Studies*, ACS Sym, No. 343. Washington D.C., (1987), page 629. The viscosity of the β-lg based system was higher than that of the WPI based system and can be linked to polymerization of this protein at the oil/water interfaces as a result of the formation of intermolecular disulfide bonds. The highest viscosity was observed for the system consisting of a 1:1 mixture of β-lg and α-la. This seems to be due to extensive polymerization that resulted from the formation of inter- and intramolecular S-S bonds. The high extent of polymerization results from denaturation that is associated with the commercial α-la. This was supported by the finding that after 24 hours of storage at 4° C., a solution of 20% (w/w) solids consisting of a 1:1 mixture of β-lg and α-la gelled, thus indicating high extent of intra-and inter-molecular S-S bonds formation. No other system exhibited such behavior.

Table 10 presents the mean particle size and specific surface area of AMF in emulsions stabilized by WPI, β-lg, a mixture (3:1 w/w) of β-lg and α-la, and by heated WPI. The mean particle size and the specific surface area ranged from 0.38 to 0.45 μm and from 13.78 to 16.54 m²/ml, respectively. Except for the system stabilized by heated WPI, no significant differences in these two parameters were observed among the different wall systems. The slightly larger particle size that was observed for the heated WPI system can be linked to the effect of the protein denaturation resulted from the heating.

TABLE 10

Emulsion Characteristics and Microencapsulation Results For Whey protein-based, AMF containing Systems[a]

| Wall material | W.S.C[1] (%/w) | M.P.S[2] (mm) | S.S.A[3] (m²/ml) | M.Y (%)[4] | M.E. (%)[5] | Visc.[6] (mPa s) |
|---|---|---|---|---|---|---|
| β-lg | 20 | 0.38 | 16.41 | 98.9 | 63.1 | 9.8 |
| β-lg/ α-la(3:1) | 20 | 0.38 | 16.54 | 98.3 | 65.5 | 29.1 |
| WPI | 20 | 0.40 | 16.34 | 96.0 | 44.8 | 7.6 |
| WPI | 10 | 0.42 | 15.45 | 97.3 | 34.5 | 4.8 |
| H. WPI[7] | 10 | 0.45 | 13.78 | 99.1 | 80.23 | 11.1 |

[a]In all cases, AMF load in the emulsion was 50% (w/w of wall solids).
[1]Wall solids concentration.
[2]Mean particle size of the core in the emulsion.
[3]Specific surface area of the core in the emulsion.
[4]Microencapsulation yield, that is the retention.
[5]Microencapsulation efficiency.
[6]Viscosity of the emulsions.
[7]Heated WPI (30 minutes at 80° C).

B. Microencapsulation yield and efficiency

Table 10 presents the retention of AMF during the microencapsulation by spray-drying and the microencapsulation efficiency for the AMF-containing microcapsules consisting of different whey protein-based wall systems. The highest retention (99.1%) was obtained using a 10% WPI solution that was heated to 80° C. for 30 minutes (prior to the emulsification step). These results were higher than those obtained using unheated 10% or 20% (w/w) WPI-based wall solution, and seems to depend on the protein denaturation that was associated with the heat treatment. The positive effect of heating on the MEE is due to the improvement in film-forming properties and increase in viscosity of the wall solution that were induced by the heat treatment. As has been described above, the core retention during microencapsulation by spray-drying is affected, among others, by the viscosity of the emulsion and by the type and nature of the wall material films that are formed around the core droplets. The relatively high viscosity of the heated WPI-based system, and the higher extent of intermolecular S-S bonds in this case explains the increase in retention in comparison to that obtained with the unheated WPI systems. Both the β-lg, and the β-lg/α-la systems exhibited retention levels that were higher than those obtained with unheated WPI wall systems. This can attributed to the higher viscosity associated with these wall systems as well as to possible differences regarding the film-forming properties of these systems.

The highest efficiency (80.23%), among the AMF containing systems, was obtained with the heated WPI-based wall system. Additionally, the MEE values of the unheated WPI-based systems were lower than those of the other wall systems. This is due differences in the hydrophobicity, as well as to differences in film structure among these systems.

Figure 34:
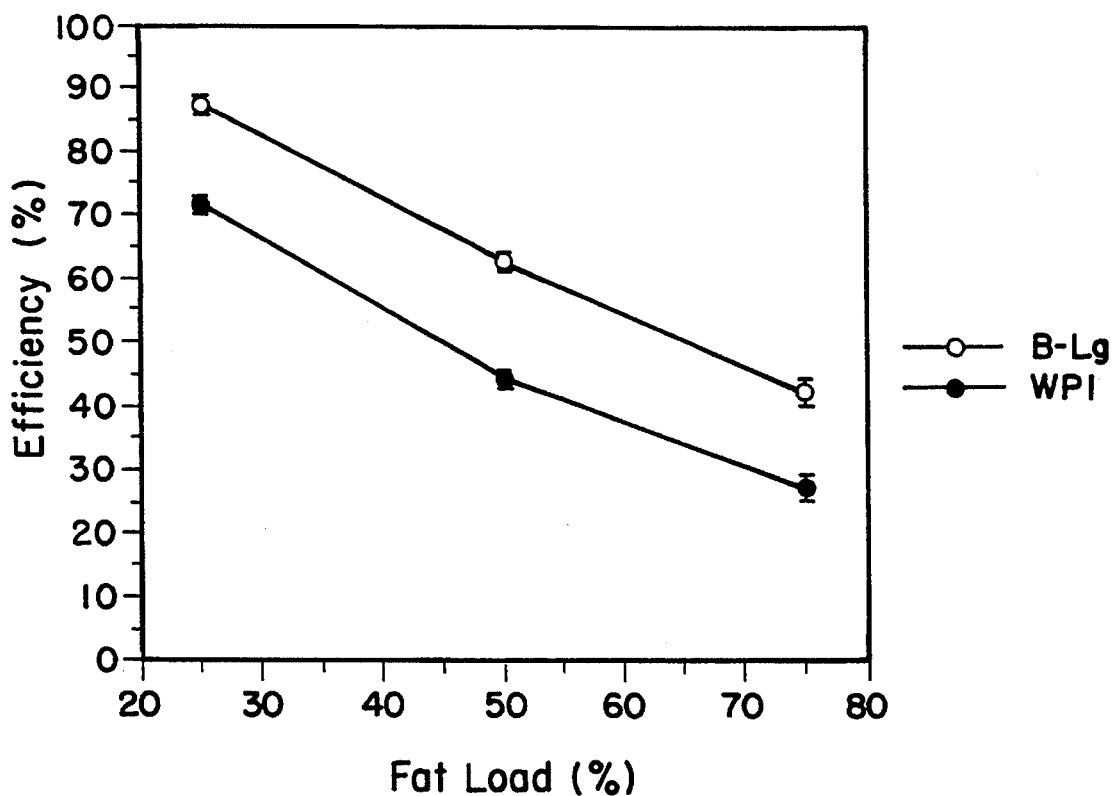
FIG. 34 illustrates efficiency of microencapsulation of AMF encapsulated in β-lactoglobulin as a function of initial anhydrous milkfat load.

FIG. 34 present the MEE values obtained with AMF containing systems consisting of WPI (-●-) or β-lg (-o-). The microcapsules were prepared from emulsions containing 20% (w/w) wall solids and AMF load ranging from 25% to 75% (w/w of wall solids). The results presented in FIG. 34 show that regardless of AMF load, higher MEE were obtained with the β-lg wall systems than those obtained with the sole WPI-based ones. The results indicate that the diffusion of apolar material through the capsule's wall matrix can be limited by inducing controlled denaturation and polymerization (through S-S bonds). The differences in MEE that were observed between WPI-based wall systems and the other wall systems confirm that MEE can be controlled by changing the composition of the whey protein based wall system as well as by inducing protein-protein interactions, such as the formation of S-S bonds, between the wall constituents.

Both the core retention and microencapsulation efficiency can be improved in whey protein based wall systems by introducing heat denaturation of the proteins or by using certain fractions of the whey proteins, such as β-lg or a blend of isolated individual whey proteins. The retention and MEE of wall solutions consisting of 10% heated WPI is higher than that obtained with 20% unheated WPI.

X. Stability of Anhydrous Milkfat Microencapsulated in Whey Protein-based Wall systems One of the main objectives for microencapsulation is to provide a protection against deterioration, such as oxidation, to substances sensitive to oxidation. For example, in the case of milkfat, the unsaturated fatty acids in milkfat are prone to oxidation in the presence of oxygen. Linoleic acid, a polyunsaturated fatty acid present in milkfat, can be oxidized to hexanal, octanal, and 2,4 decadienal which further decompose into hexanal. These and other low molecular weight compounds produced by lipid oxidation are typically responsible for the development of cardboard-like, tallowy, oily and rancid flavors, and hence result in a shorter shelf-life. To prevent oxidation, cold storage and/or the addition of antioxidants must often be employed for the storage of milkfat. Microencapsulation of milkfat according to this invention provides a solution to this oxidation problem by providing the milkfat with protection against oxidation, without need for using antioxidants.

In developing the present invention, the stability of anhydrous milkfat microencapsulated in whey protein-based wall systems has been investigated. Stability of microencapsulated milkfat was studied by monitoring the development of hexanal, a headspace volatile, that is commonly used to gauge the extent of lipid oxidation, and by monitoring oxygen uptake by the microcapsules. Stability of microencapsulated milkfat was assessed during up to 8 month of storage at different temperatures in the dark as well as under light. Procedure used for these studies is described in Example 7.

A. Oxygen Uptake

Figure 35C:
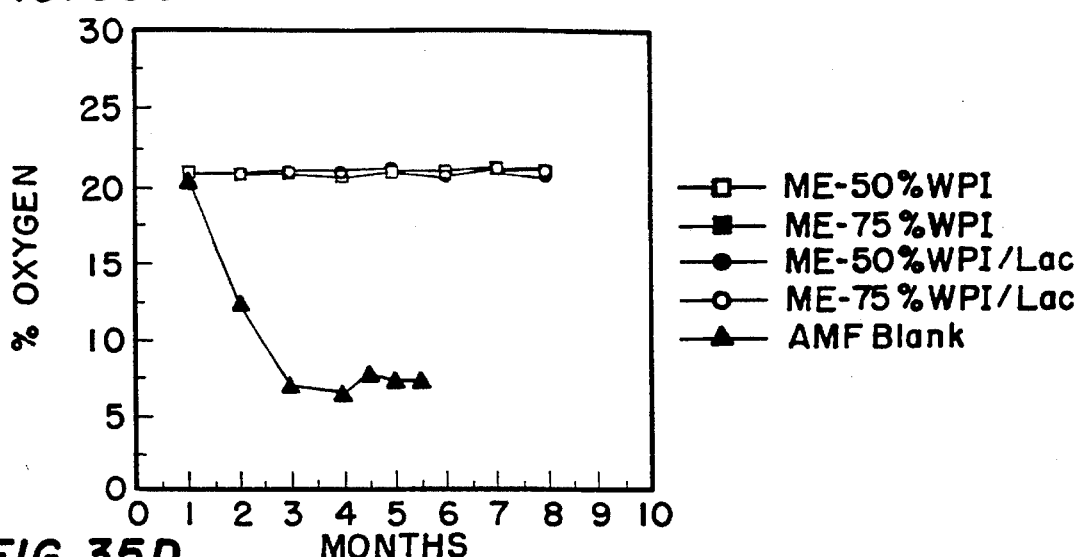
Figure 35D:
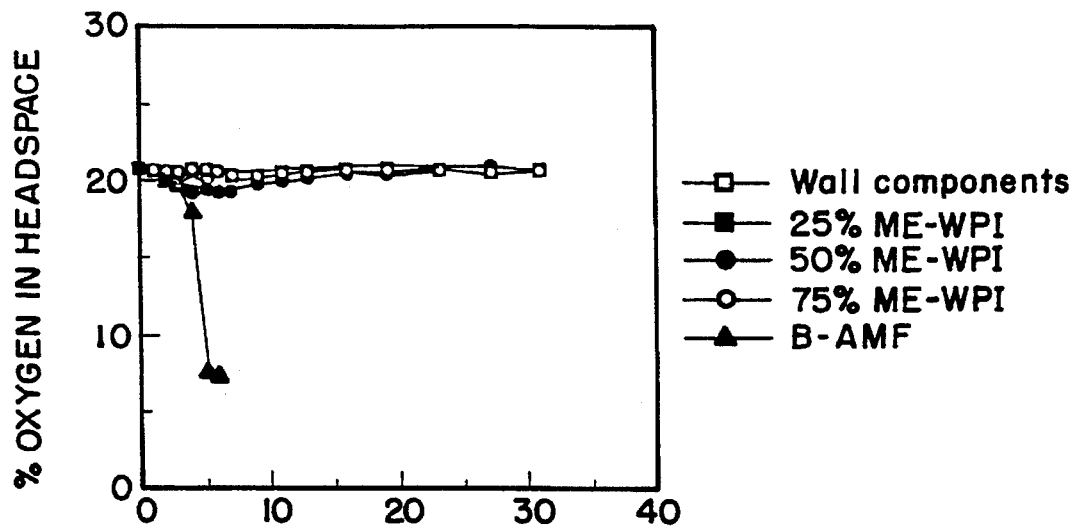
Figure 35E:
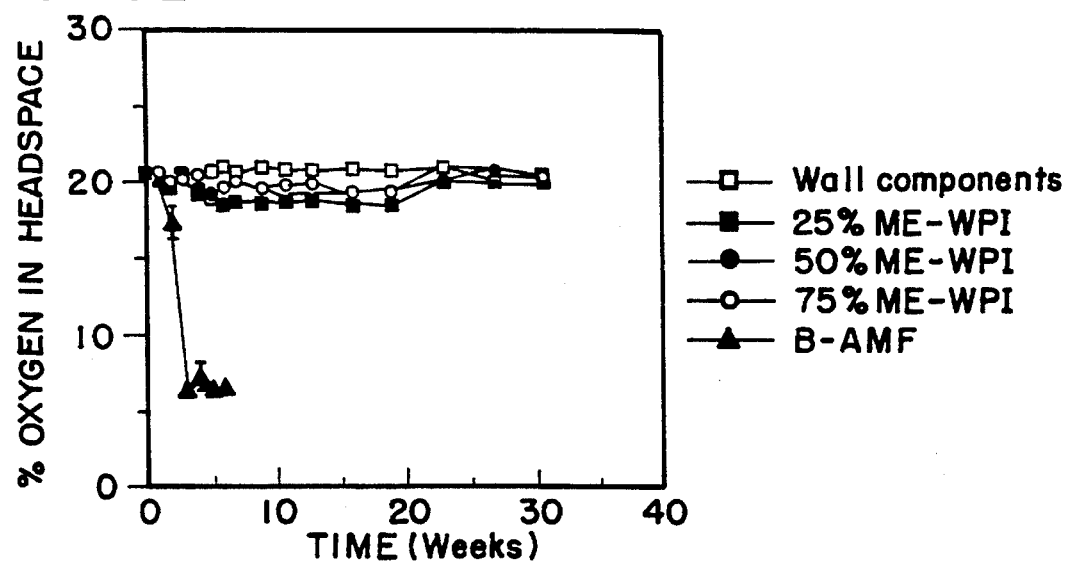

FIG. 35 illustrates the effect of temperature on changes in oxygen headspace. FIG. 35A shows changes in oxygen headspace during storage at 20° C. under light. FIG. 35B shows changes in oxygen headspace as a function of storage time at 30° C. FIG. 35C shows changes in headspace oxygen during storage at 40° C. FIG. 35D shows changes in headspace oxygen during storage at 50° C. FIG. 35E shows changes in headspace oxygen during storage at 50° C., under light.

Molecular oxygen, which is consumed in the oxidation of milkfat, was monitored as an indicator of the oxidative stability of microcapsules containing milkfat.

At 20° C., under light, significant oxygen uptake by the bulk AMF was observed after 2 months and continued as a function of storage time. After 5 month of storage, the oxygen level in the headspace was lower than 5%. In all of the microencapsulated systems, that is AMF encapsulated in WPI or WPI/Lac wall systems, no significant oxygen uptake was detected during 8 month storage (FIG. 35A).

At 30° C., oxygen uptake by the bulk AMF was detected after 6 storage months and continued as a function of time. The microencapsulated AMF showed no oxygen uptake during 8 storage months, regardless of wall system type or AMF load as seen FIG. 35B.

At 40° C., oxygen uptake by the bulk AMF was detected after 1 month of storage and continued as a function of time. None of the microencapsulated AMF samples showed oxygen uptake during 8 storage months, regardless of wall type or AMF load (FIG. 35C).

At 50° C., oxygen uptake by the bulk AMF was noticed after 2 weeks of storage and continued as a function of time. After 5 weeks of storage oxygen level in headspace of AMF samples was about 7%. The oxygen level in headspace of the microencapsulated AMF samples was 20–21% throughout 32 storage weeks of storage (FIG. 35D).

At 50° C., under light, oxygen uptake by bulk AMF samples was noticed after 1 week of storage and continued as a function of storage time. After 5 weeks, oxygen level in the headspace was of about 7%. The oxygen levels in the microencapsulated AMF system's headspace was 19–21% throughout 32 weeks of storage (FIG. 35E).

Wall components that were stored without AMF showed no oxygen uptake even under the most extreme storage conditions (50° C., under light) FIG. 35E.

The oxygen uptake curves of the B-AMF samples exhibited, in all cases a typical profile as described for oxidizable substrate in *J. Chem. Edu.*, 61(4):335–339, (1984). During the initiation stage of oxidation, a lag phase was observed in which only a small amount of oxygen was absorbed. Once initiated, the autoxidation proceeded at an exponential rate in which larger amounts of oxygen were absorbed in the propagation steps of the oxidation. Finally, during the termination step, all oxidizable substrates have reacted and no longer consume oxygen.

Light has been known to play a major role in the stability of unsaturated fats (*Prog. Lipid Res.*, 23:197–221, (1985)). The light induced type of oxidation, known as photosensitized oxidation, can occur in addition to normal triplet state oxidation. In AMF, any trace amounts of riboflavin or heme products associated with the milkfat can act as photosensitizers. As a result of its susceptibility to photosensitized oxidation, milkfat is less stable in the presence of light. This effect is illustrated in FIGS. 35D and 35E. The obtained results indicate significant differences in oxygen levels between AMF samples stored in the dark (FIG. 35D) and under light (FIG. 35E). The differences in oxygen uptake by bulk AMF that are evident, are linked to the effect of light in enhancing the oxidation.

In contrast to the oxygen uptake exhibited by bulk AMF samples, all microcapsules showed little or no oxygen uptake over 6 weeks of storage at 50° C., even in the presence of light. These results show that even under conditions that are known to promote lipid oxidation (50° C., and light), the microcapsules wall system of this invention provided protection against oxidation by preventing or significantly limiting the diffusion of oxygen through the wall matrix towards the AMF droplets embedded in the wall, and by preventing the adverse effect of light on lipid stability.

The wall systems consisting of whey proteins or of a combination of whey proteins and lactose provide protection to microencapsulated materials that are prone to oxidation, such as in the case of AMF. The headspace oxygen levels show that the wall matrix forms good barrier properties against oxygen diffusion. Limiting, or preventing oxygen diffusion through the wall provide the encapsulated core with protection against oxidation and thus with much longer shelf life. The protection against oxidation is manifested in the whey protein and whey protein/lactose-based wall systems at a broad range of storage temperature (20° C. to 50° C.). No deterioration of the barrier to oxygen diffusion was detected as a function of temperature.

B. Hexanal level

Figure 36:
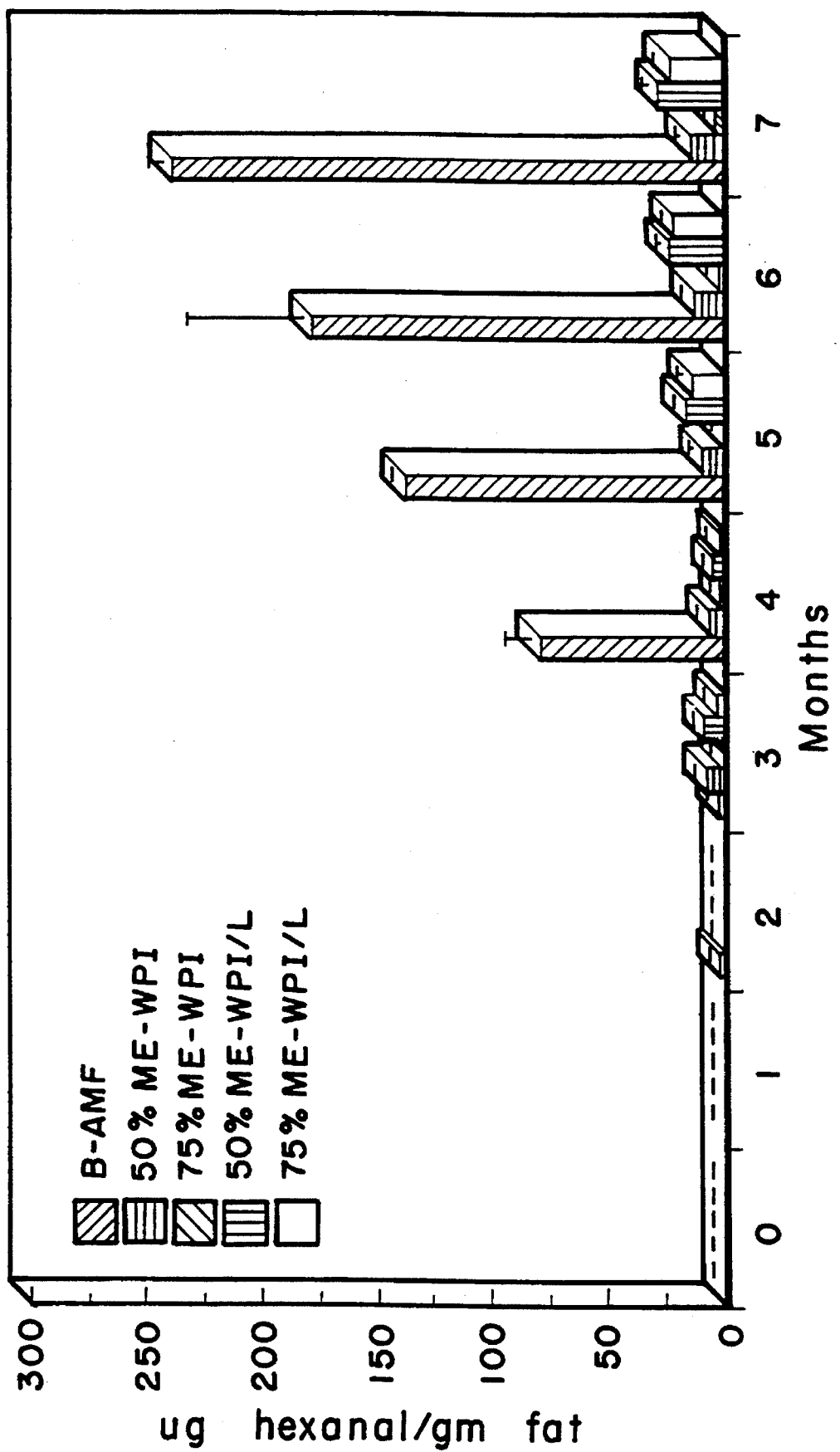
FIG. 36 illustrates hexanal development during storage at 20° C. under light.
Figure 37:
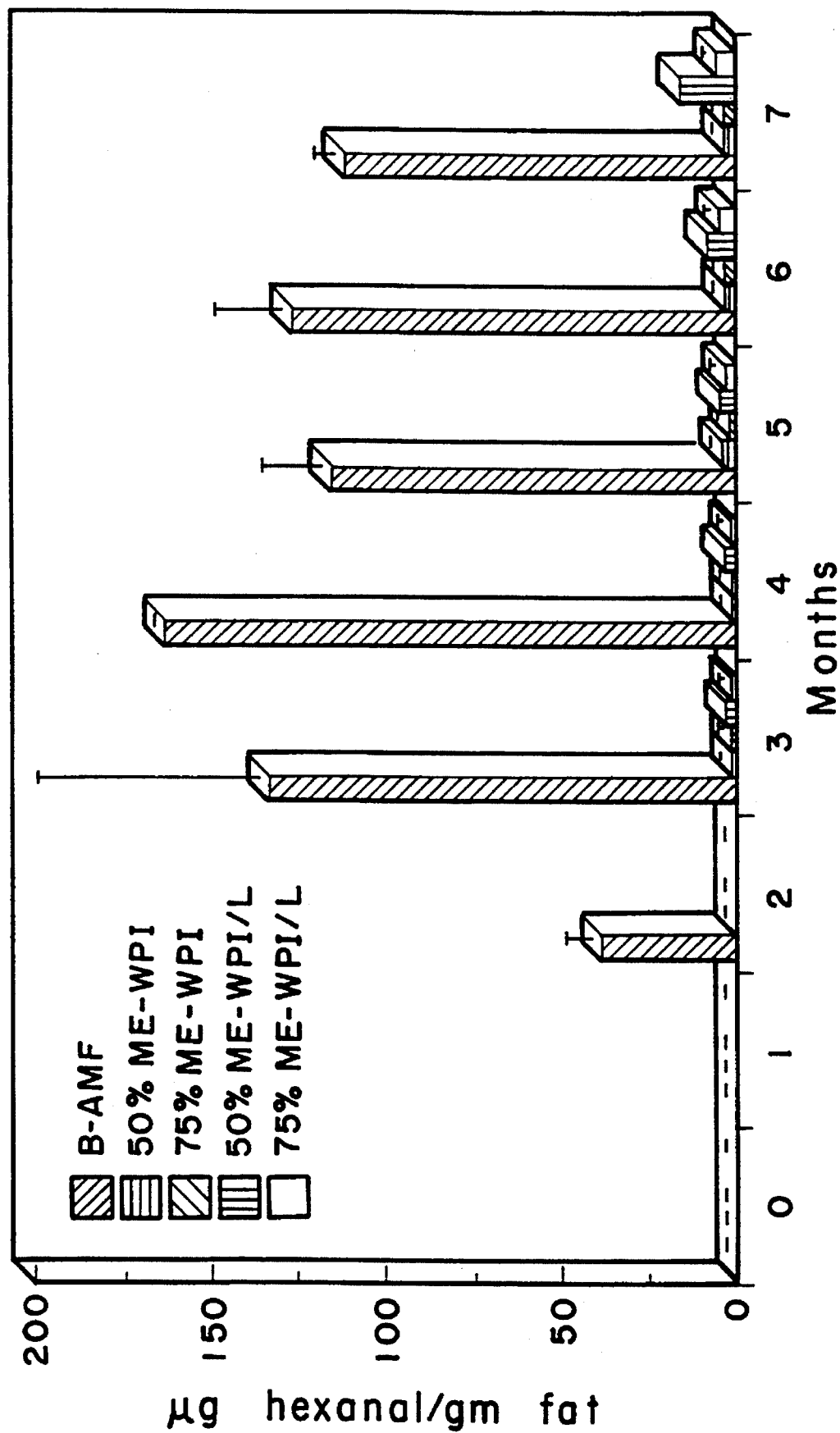
FIG. 37 illustrates hexanal development during storage at 40° C.

FIGS. 36 and 37 present representative results regarding the accumulation of hexanal in bulk AMF and microencapsulated AMF (in WPI and WPI/Lac) during storage. FIG. 36 presents the hexanal levels in bulk AMF, AMF encapsulated in WPI and in WPI/Lac wall systems at 50% and 75% (w/w of wall solids) fat load during 7 months of storage at 20° C. under light. FIG. 37 presents the hexanal levels in bulk AMF, AMF encapsulated in WPI and in WPI/Lac wall systems at 50% and 75% (w/w of wall solids) fat load during 7 months of storage at 40° C.

At 20° C., hexanal accumulation was observed in the bulk AMF samples after storage of more than 3 months. After 7 storage month, hexanal levels of about 240 mg/g fat were detected in bulk AMF samples. All of the microencapsulated AMF samples were characterized with minimal quantities of hexanal, and after 7 storage months, hexanal level was of about 25 mg/g fat. The results show the presence of significant oxidation in the case of unencapsulated AMF and only marginal oxidation in the microencapsulated AMF systems. The oxidation in the bulk AMF samples as represented by hexanal levels, was almost ten times higher than that present in the encapsulated systems.

At 40° C., significant accumulation of hexanal was detected in the unencapsulated AMF samples after storage for 1 month. The microencapsulated AMF samples showed almost no hexanal accumulation throughout 7 storage months. The hexanal levels in the bulk AMF samples reached a maximum after 4 storage months and than declined as a function of time. This profile is typical for the oxidation and represents the transformation of hexanal to secondary oxidation products as a function of time. The results show that although significant oxidation occurred in the case of unencapsulated AMF, the encapsulated AMF maintained its stability during 7 month of storage and therefore the current invention significantly extends the life of the product.

Results similar to those presented above were obtained with all WPI or WPC systems stored at various temperatures. No effect of wall composition were detected. In all investigated cases, when the unencapsulated AMF was oxidized during the storage, the microencapsulated AMF maintained its stability, and no appreciable oxidation occurred.

The results regarding oxygen uptake and the accumulation of hexanal during storage show that microencapsulation of substances that are prone to oxidation, such as anhydrous milkfat, in wall systems consisting of whey proteins or of combination of whey proteins and lactose significantly enhances the stability of these materials. The results show that microcapsular wall consisting of whey proteins or a combination of whey proteins and lactose provide good barrier properties that prevent or appreciably limit oxygen diffusion through the wall matrix. These characteristics are in accord with the structural findings reported earlier in this invention and clearly indicate that whey protein-based wall systems are indeed effective and highly functional in microencapsulation.

XII. Microencapsulation of Essential Oils

Other core materials which is, under normal circumstances, very sensitive to the environmental conditions and prone to oxidation or destruction by other elements are citrus essential oils. These oils are advantageously microencapsulated in whey proteins by procedure described in detail in Example 5.

Microencapsulation of citrus essential oil and particularly orange oil by whey proteins is achieved by method according to the invention. The naturally derived orange flavor is very delicate and sensitive. Because of these properties, the handling of these oils is very difficult, particularly as they are very sensitive to oxidation and resinification. These oils are advantageously microencapsulated using the current method.

Citrus essential oil and orange oil are encapsulated in whey protein concentrates having 50 or 75% protein or in whey protein isolate. Oil load is typically from 10–40% (w/w), preferably about 20%. Wall solids concentration is typically in the range from 10–40%. Emulsification spray-drying process and microencapsulation yield and content are carried out as described for volatiles in Section VII.

Typically, microencapsulation of essential oils is by preparing an emulsion of a solution containing from 15%–30%, preferably 20%–30%, of wall material solids and the oil to be microencapsulated in amount from 5%–30%, preferably 20% to 30% (w/w) of wall materials. Both the solution of wall material solids and the oil are first tempered to about 3° C.–10° C., preferably to 4° C.–5° C. Emulsification is carried out as described previously. Throughout the emulsification, the emulsion is kept at temperatures between 10° C.–20° C., preferably between 10° C.–15° C. After homogenization, the temperature is lowered to about 3° C.–10° C., preferably to 4° C.–5° C., until spray-drying.

The emulsion is spray-dried in the concurrent mode. The emulsion is atomized using preferably the centrifugal atomizer of the dryer operated at 40,000–60,000 rpm, preferably at 50,000 rpm. Emulsion temperature is between 3° C.–10° C. preferably 4° C.–5° C. Inlet temperature is from 140° C.–170° C., preferably about 160° C. Outlet temperature from about 60° C.–90° C., preferably about 80° C. The oil containing microcapsules are collected at the dryer's cyclone.

Mean particle size and specific surface area of the emulsions are presented in Table 11.

TABLE 11

Mean Particle Size and Specific Surface Area of WPI/Orange Oil Emulsions

| | MEAN PARTICLE SIZE ($\mu$m) | SPECIFIC SURFACE AREA ($m^2$/ml) |
|---|---|---|
| 20% WPI & 20% Oil load | 0.35 | 18.92 |
| 20% WPI & 30% Oil load | 0.41 | 16.35 |
| 25% WPI & 20% Oil load | 0.36 | 18.30 |
| 25% WPI & 30% Oil load | 0.39 | 17.00 |

In all cases, a mean particle size of about 0.4 $\mu$m was observed. These results are very similar to those reported earlier for WPI stabilized emulsions containing anhydrous milkfat or volatile esters. The results indicate that WPI is capable of emulsifying orange oil to yield the emulsion characteristics desired for the microencapsulation process. In all cases, the mean particle size obtained in the present case was appreciably smaller than that reported in *Flavor Encapsulation*, 67–77 (1988), ACS, Washington, D.C., for orange oil emulsified in gum arabic. As has been reported earlier, a small mean particle size of the core in the wall system is desired in microencapsulation by spray-drying. The results thus indicate the superiority of whey proteins as microencapsulating agents in this regard.

Table 12 illustrates MEY of orange oil in whey protein based microcapsules.

TABLE 12

Retention of Orange Oil in Whey Protein-based Microcapsules

| Sample | Retention (%) |
|---|---|
| 20% WPI; 20% Orange oil | 82.16 |
| 20% WPI; 30% Orange oil | 67.6 |
| 25% WPI; 20% Orange oil | 93.24 |
| 25% WPI; 30% Orange oil | 89.66 |

The retention of orange oil in whey protein-based, spray-dried microcapsules is presented in Table 12.

In all cases, high retention levels were observed. The highest retention was achieved at 25% wall solids concentration and 20% core load. It has been previously described that orange oil load in spray-dried microcapsules ranges between 20% to 30%. The loads used in the present case are in agreement with that recommended load. The retention levels resulted, in the present study, in final oil content of 16 to 23 g oil/100 g powder. These results are competitive with those reported ibid for orange oil content in spray-dried, gum arabic-based microcapsules (14–19 g oil/100 g powder). The retention levels obtained in the present case indicate the functionality of whey protein isolate as microencapsulating agent for orange oil and for oils in general.

UTILITY

Whey proteins of the invention are used to successfully microencapsulate any volatile or non-volatile cores. The method of the invention is particularly useful for microencapsulation of anhydrous milk fat of which microencapsulation is at high fat loads very difficult to achieve with methods known in the art. Using the current method, high microencapsulation yield is feasible even at high core loads.

The invention is useful for long-term preservation and storage of core materials, including fats, oils, such as essential orange oil, oil soluble compounds such as vitamin A, volatile and aroma compounds, which are sensitive to oxidation and deterioration by various factors. The preservation is achieved by microencapsulation of these compounds in whey proteins alone or in combination of whey proteins with lactose or carbohydrates. Resulting free-flowing powder provides higher stability, longer shelf-life of the microencapsulated product and allows easy handling. The method is economical because it utilizes microencapsulating agents which are waste products of cheese production, and because it does not require special equipment, it is easy, fast and practical. The method is safe for use in food products as the microencapsulating agents are natural products.

Whey proteins possess many properties required for microencapsulating agents. The microcapsules produced by spray-drying of core/whey protein wall emulsions have a high degree of integrity, they are of spherical shape and are characterized by smooth, almost dent free surfaces. The core material is embedded in the wall system in the form of droplets. In the case of anhydrous milkfat, high encapsulation yields are feasible even at up to 75% high fat loads. The diffusion of hydrophobic material through the capsule's wall is further reduced and method is improved by incorporating lactose or carbohydrates in the whey protein wall system.

Whey proteins form continuous, well-defined protein layer film around the fat droplets indicating their good emulsification properties. The formation of these stabilizing films at the oil/water interfaces is critical for the microencapsulation process.

The newly discovered application for whey proteins, namely their use as microencapsulating agents overcomes many problems previously encountered. In the case of milkfat, its microencapsulation result in its transformation to dry powder. In case of oil and volatile compounds, it provides barrier against their migration, against their oxidation and against their evaporation.

The whey protein microencapsulation is useful for microencapsulation of food, health, pharmaceutical, industrial or other products.

EXAMPLE 1

Microencapsulation by Spray-drying of Anhydrous Milkfat Core Using Whey Proteins Microencapsulation Agents This example illustrates preparation of microencapsulated anhydrous milkfat core by spray-drying of whey proteins microencapsulating agents.

Whey protein concentrates of 50 and 75% protein (WPC 50 and WPC 75) were purchased from Calpro Ingredients (Corona, Calif). Whey protein isolate (WPI) was purchased from Le Sueur Isolates (Le Sueur, Minn.). The composition of these materials is shown in Table 1.

D-Lactose monohydrate was purchased from Sigma Chemical Company (St. Louis, Mo.).

One group of carbohydrates consisted of those lacking surface-active and microencapsulating properties, such as maltodextrins with dextrose equivalents of 11 (MD11) and 18 (MD18), and corn solids syrup with dextrose equivalent of 28 (CSS28). These were purchased from American Maize-Products Company (Hammond, Ind.).

Second group consisted of carbohydrates exhibiting microencapsulating properties, such as two commercial microencapsulating agents, a modified starch National® 46 (NAT460) and a dextrin Encapsul® 855 (ENC855) purchased from National Starch and Chemical Corp. (Bridgewater, N.J.).

Anhydrous milkfat (AMF) containing 99.8% of fat was purchased from California Cooperative Creamery, Hughson, Calif. It was used as core material.

Preparation of Emulsion for Spray-drying

Wall solutions containing 5% to 30% (w/w) solids, whey proteins, carbohydrates or their mixtures were prepared in deionized water. In cases where the wall system consisted of combinations of WPI with lactose, or other carbohydrate, the lactose or the carbohydrate was introduced into the wall solution by partially replacing the WPI.

The wall solutions were de-aerated at 35° C. and 13 kPa to remove trapped air.

The AMF load was emulsified into the wall solutions at proportions of 25%, 50%, and 75% (g AMF/g dry, non-fat wall solids X 100). The emulsification was carried out in two stages. A coarse emulsion was prepared using an Ultra-Turrax® T25-S1 homogenizer (IKA Works, Cincinnati, Ohio) operated at 13,500 rpm for 30 seconds. The second stage consisted of four successive homogenization steps using a type 8.30H, Mini-Lab high pressure homogenizer (APV Rannie, St. Paul, Minn.) operated at 500 bar. The emulsion constituents were heated to 50° C. prior to the emulsification and this temperature was maintained throughout the emulsification process.

Microencapsulation was carried out by spray-drying emulsions of AMF in wall solutions.

The emulsions were spray-dried using an APV Anhydro Laboratory Spray Dryer (APV Anhydro A/S, Soborg, Denmark). The dryer had an evaporation rate of 7.5 kg/hour, and a chamber diameter of 1 m. The height, width, and length of the dryer were 2.6, 1.2, and 1.3 m, respectively. Drying was carried out in the concurrent mode. The emulsions (at 50° C.) were atomized by the centrifugal atomizer of the dryer operated at 50,000 rpm. The emulsions were dried at inlet air temperatures between 105–210° C., mostly at 160° C., and at outlet air temperatures between 60° C. and 100° C. mostly at 80° C. were used. The microcapsule powder was collected at the bottom of the dryer's cyclone. Microencapsulations were carried out in two replicates of each emulsion composition.

The mean particle size of the emulsion, AMF content, microencapsulation yield, and microencapsulation efficiency were evaluated.

The mean particle size of the emulsions was determined using a Malvern Mastersizer MS20 (Malvern Instruments, Malvern, England). A 2 mW He-Ne laser beam (633 nm) and a 45 µm focus lens were used. In all cases, sizing of the emulsions was conducted using the 0807 presentation code of the instrument. Particle size distribution is presented in this study by volume frequency distribution of the AMF droplet diameter.

The moisture content of the microcapsules was determined gravimetrically after 12 hours of vacuum drying at 65° C. and at 6.7 Kpa.

The anhydrous milkfat content of the dry capsules was determined according to the method described in *Official Methods of Analysis*, 15th Ed., ADAC, Arlington, Va., at page 835 (1990), and was expressed as g AMF/g dry non-fat solids which was defined as the microencapsulated fat load. The microencapsulation yield (MEY) was defined as the ratio (expressed in %) of microencapsulated fat load to the fat load in the emulsion.

The protein contents of the whey concentrates and isolates were determined according to the macro-Kjeldahl method and the ash content was determined using a muffle furnace at 550° C. Both methods are described in *Official Methods of Analysis*, ibid.

EXAMPLE 2

Determination of Microencapsulation Efficiency

This example illustrates method used for determination of the microencapsulation efficiency. A microencapsulation efficiency (MEE) parameter was defined as the percent of AMF that could not be extracted from the microcapsules by petroleum ether using a modified method of the method described in *J. Food Sci. Technol. Ind.*, 25:352 (1988).

One gram of dry capsules was weighed into a glass extraction flask and 25 ml of petroleum ether (Sigman Chemical Company, St. Louis, Mo.) was added. The extraction flask was placed on a model 360 Garver shaker (Garver Mfg., Union City, Ind.) and the extraction was carried out for 5 minutes at 25° C. The mixture was filtered through a GN-6 filter (Gelman Science, Ann Arbor, Mich.), the solvent was evaporated over a water bath at 70° C., and the solvent-free extract was dried under vacuum (45° C., 50 µm Hg). The amount of extracted fat was then determined gravimetrically. The encapsulation efficiency was defined according to equation.

$$MEE(\%) = \frac{(MFL - MEF)}{MFL} \times 100$$

where MEF is extracted fat and MFL is microencapsulated fat load.

The fat content of the WPI and WPCs and the AMF that were extracted by solvent from these materials were determined by the same methods. Appropriate corrections were made when microencapsulation yield and microencapsulation efficiency of the microencapsulated systems were determined. In all cases, the analyses were carried out in duplicates, and the presented results are the mean values.

Moisture Uptake

In order to study the effect of moisture uptake on microencapsulation efficiency, samples of microcapsules in which WPI or a combination of 1:1 (w/w) WPI and lactose served as wall systems were incubated at different relative humidities. About 3 g powder was weighed (in triplicates) into glass weighing dishes (after 12 hours drying at 65° C. and 6.7 Kpa µm Hg) and placed into desiccators containing saturated salt solutions at relative humidities ranging between 11.3 and 64.3% at 25° C. No fat losses could be detected when the fat content of the microcapsules before and after the drying stage were compared. The relative humidity of the solutions were determined at 25° C. using a Fisher electronic hygrometer (Fisher Scientific, Pittsburgh, Pa.). The samples were incubated until no change in weight was detected.

EXAMPLE 3

Determination of Microstructure of Whey Protein Stabilized Emulsions

This example describes electron microscopy methods used for determination of microstructure of whey protein stabilized emulsions.

Preparation of emulsions

A solution of 5% (w/w) WPI in deionized water was prepared at 25° C. AMF was emulsified in the protein solutions at 30% and 50% (w/w). The emulsification was carried out in two stages. A coarse emulsion was prepared using an Ultra-Turrax T-25 (IKA Works, Cincinnati, Ohio) homogenizer operated at 13,500 rpm for 30 seconds. The second stage consisted of four to twelve successive homogenization steps using a Mini-Lab type 8.30H high pressure homogenizer (APV Rannie, St. Paul, Minn.) operated at either 50 or 80 MPa. The emulsion constituents were heated to 50° C. prior to the emulsification and this temperature was maintained throughout the emulsification process.

The mean particle size of the emulsions was determined as described above.

Scanning electron microscopy (SEM)

Emulsion specimens were prepared in agar tubes in a way similar to that described in *Food Microstruc.*, 3:197 (1984). An emulsion sample was aspirated into a glass Pasteur pipet. The lower end of the pipet was sealed with a drop of 3% agar sol at 40° C. After the agar was solidified, the pipet was dipped and rotated in 3% agar sol at 40° C. to form a uniform end and the pipet was withdrawn, leaving the sample in the agar tube. The open end of the gel tube was then sealed with drops of agar sol. The specimens were fixed in 4% glutaraldehyde in 0.1M imidazole-phosphate buffer at pH 7 at 4° C. for 12 hours. Post fixation with 2% osmium tetraoxide in the same buffer was carried out for 4 hours at 25° C. The fixed specimens were washed three times with the same buffer and then dehydrated using a series of 50%, 70%, 80%, 90%, and 100% (v/v) ethanol solutions. Dehydration was carried out for 30 minutes in each of these solutions. The specimens were frozen in Freon 22, freeze fractured under liquid nitrogen, and then dried by critical point drying using carbon dioxide as carrier.

The dry specimens were mounted onto specimen stubs using colloidal silver paint, gold coated (50Å), and analyzed microscopically using and ISI-DS 130 scanning electron microscope (Topcon Technologies, Pleasanton, Calif.) operated at 15 kV accelerating voltage.

Cryo-scanning Electron Microscopy (C-SEM)

The analysis was conducted using an Hitachi S-800 (Tokyo, Japan) microscope equipped with a cryo-preparative unit (EM Scope, London, England). Emulsion samples were mounted on the cryo-specimen-holder, cryo-fixed in liquid nitrogen, transferred to the cryo-unit in the frozen state, fractured using the in situ fracturing knife, sublimed at −80° C. for 3 minutes, cooled to −196° C., coated with platinum using the cryo unit sputter coater, transferred to the microscope cold stage, and analyzed at 2 kV.

Transmission Electron Microscopy (TEM)

Emulsions samples were fixed, postfixed and dried in ethanol as described for the SEM analysis. After dehydration in ethanol, the specimens were stained with uranyl acetate and lead citrate (Ted Pella). The specimens were embedded in Medcast quick-mix epoxy (Ted Pella, Redding, Calif.). Thin sections (90 nm) of the specimens were examined using a model EM109 Zeiss transmission electron microscope (Carl Zeiss, New York, N.Y.) operated at 80 kV.

Microstructure of Whey protein-based Microcapsules

Specimens for examining the outer structure of the microcapsules were prepared according to the methods described in *J. Food Sci.*, 50:139 (1985). In order to examine the inner structure of the capsules they were fractured by moving a razor blade perpendicularly through a layer of capsules attached to the specimen holder by a double-sided adhesive tape (Ted Pella, Redding, Calif.). In all cases, the specimens were subsequently coated with gold using a model E-50050 Polaron Sputter Coater (Bio-Rad, San Jose Calif.), and analyzed using an ISI DS-130 scanning electron microscope (International Scientific Instrument, Inc., Pleasanton, Calif.) operated at 10 or 20 kV. Polaroid film (Polaroid Corp., Cambridge, Mass.) was used to produce micrographs.

In a separate set of experiments, the possibility to fracture microcapsules embedded in Lowicryl HM-20 (Electron Microscopy Sciences, Forth Washington, Pa.) was evaluated. Polymerization was carried out by exposure to UV radiation at 360 nm (30W) at 10° C., at a bulb-to-sample distance of 35 cm for 1 hour. The blocks were fractured using a model 820 Rotary Microtome (American Optical, Buffalo, N.Y.), gold coated, and examined by SEM under the conditions described above. In several cases, hardening of the microcapsules by suspending them for 1 hour in glutaraldehyde (10%, w/w) prior to embedding was evaluated. At the end of the hardening stage, the microcapsules were washed with ethanol, dried (55° C., 7 mPa, for 12 hours), and embedded as described above.

EXAMPLE 4

Microencapsulation of Volatile Compounds by Whey Proteins

This example illustrates microencapsulation of volatile compounds by whey proteins.

Wall and Core Materials

Whey proteins isolate (WPI) was purchased from Le Sueur Isolates (Le Sueur, Minn.). D-Lactose monohydrate, ethyl butyrate (EB), and ethyl caprylate (ECY) were purchased from Sigma Chemical Company (St. Louis, Mo.).

Emulsion Preparation

Wall solution containing 10, 20, or 30% (w/w) solids consisting of WPI, or a 1:1 (w/w) WPI/lactose combination were prepared in deionized water (25° C.) and were then cooled to 4° C. The model core esters EB or ECY were emulsified individually at 4° C. into the wall solutions at a load ranging from 10 to 75% (w/w) of wall solids. Emulsification was carried out in two stages. A coarse emulsion was prepared using an Ultra-Turrax T-25-S1 homogenizer (IKA Works, Cincinnati, Ohio) operated at 13,500 rpm for 30 seconds. The second stage consisted of four successive homogenization steps using a Mini-Lab high pressure homogenizer (type 8.30H; Rannie, St. Paul, Minn.) operated at 50 MPa. The temperature of the emulsion was maintained during the homogenization at 15° C., and the final emulsion was kept at 5° C. until drying.

Spray drying

The emulsions were spray-dried using an APV Anhydrous Laboratory Spray Dryer (APV Anhydro A/S Soborg, Denmark). The dryer had an evaporation rate of 7.5 kg/hour and a chamber diameter of 1 m. The emulsions were atomized by the centrifugal atomizer operated at 50,000 rpm and dried in the concurrent drying configuration of the dryer. Feed temperature of 5° C., inlet air temperature of 160° C., and outlet air temperature of 80° C. were used in all cases. The dry powders were collected at the bottom of the dryer's cyclone.

Emulsion particle Size Distribution

The particle size distribution of the emulsions was determined using a Malvern Mastersizer MS20 (Malvern Instruments, Malvern, Worcs., UK). A 2 mW He-Ne laser beam (633 nm) and a 45 μm focus lens were used.

Chemical Analyses

Moisture content of the microcapsules was determined gravimetrically (in triplicates) after 4 hour vacuum drying (40° C., 3 kPa). If needed, corrections for weight losses due to volatile losses were made by determining volatile content prior to and following vacuum drying, using the method described below.

The ester content of the dry microcapsules was determined using a modification of the method described in *J. Ag. Food Chem.*, 1288–1294 (1990). One gram of powder was dissolved in 100 ml deionized water at 25° C. After incubation for 15 minutes at this temperature, a 0.5 ml aliquot of the emulsion was mixed with 4.5 ml of 50% ethanol solution. Then, 4 ml of afresh reagent mixture consisting of a 1:1 ratio of 3N sodium hydroxide and 13.9% hydroxylamine was added, the system was thoroughly mixed, and was incubated for 10 minutes at 25° C. Then, 2 ml of 3N hydrochloric acid was added to stop the reaction. A brownish color was developed after the addition of 2 ml of 10% ferric chloride solution in 0.1N hydrochloric acid. The absorbance of the supernatant at 525 nm was determined and the amount of ester in the powder was calculated using ester and wall specific calibration curves.

The amount of ester that could be extracted from the capsules by petroleum ether was determined by method described in *J. Dairy Sci.*, 76:2868 (1993). One gram of dry capsules was extracted with 10 ml of petroleum ether in a 30 ml hermetically sealed extraction flask for 5 minutes at 25° C. The mixture was filtered through a GN-6 filter (0.45 μm; Gelman Science, Inc., Ann Arbor, Mich.). One ml of the filtrate was mixed with 4 ml of 95% ethanol and the ester determination method described above was then used. In all cases, ester determination was carried out in triplicates.

The ratio (expressed as percentage) of the encapsulated ester to the initial ester load in the emulsion was defined as the retention (MEY). The proportion (expressed as %) of ester that could not be extracted from 1 gram of dry microcapsules was denoted as the MEE.

Scanning Electron Microscopy (SEM)

Scanning electron microscopy studies of the inner and outer structural features of the dry microcapsules powder were carried out using the methods described Example 3.

Statistical Analyses

The significance (P<0.05) of the experimental results was studied using the ANOVA, Student-Newman-Keuls, and t-test procedures using the SigmaState® software (Jandel Scientific, San Rafael, Calif.).

EXAMPLE 5

Microencapsulation of Orange Oil in Whey Proteins

This example illustrates microencapsulation of orange oil in whey proteins.

Whey proteins isolate (WPI) was purchased from Le Sueur Isolates (Le Sueur, Minn.) Cold pressed orange oil (Navel-type, anti-oxidant free) was purchased from Sunkist Processed Products (Ontario, Calif.). Chemicals were purchased from Sigma Chemical Company (St. Louis, Mo.).

Emulsion preparation

Solution containing either 20, or 25% (w/w) wall material (WPI) was prepared in deionized water. The solution was deaerated and then cooled to 4° C.–5° C. Orange oil was also tempered to this temperature. Emulsification was then carried by two steps. The oil (20% or 30% (w/w of wall materials) was emulsified into the wall solution using an Ultra-Turrax T-25 (IKA Works, Inc., Ohio) homogenizer at 13,500 rpm for 30 seconds. Further emulsification was accomplished by four successive passes through a Rannie Lab Homogenizer (APV Rannie, Inc., St. Paul, Minn.) operated at 50 MPa. The temperature of the emulsion was maintained at 10° C.–15° C. throughout the emulsification process. The emulsions were tempered to 4° C.–5° C. after homogenization, and were kept at this temperature pending spray-drying.

Spray-drying

The emulsions were spray-dried using an APV Anhydrous Laboratory Dryer (APV, Chicago, Ill.). Drying was carried out in the concurrent mode. The emulsions were atomized using the centrifugal atomizer of the dryer operated at 50,000 rpm. Emulsion temperature, inlet and outlet air temperatures were 5° C., 160° C. and 80° C., respectively. The microcapsule powders were collected at the bottom of the dryer's cyclone.

Emulsion Particle size Determination

Particle size distribution of the emulsions was determined using a Malvern Mastersizer MS20 (Malvern Instruments, Malvern, Worcs., UK). A 2 mW He-Ne Laser beam (633 nm) and a 45 μm focus lens were used.

Total Oil Determination

Total encapsulated orange oil was determined by Gas Chromatography method as described in *Performer and Flavorist*, 12:34–39 (1987) with slight modifications. Microcapsules (0.5 g) were reconstituted with 1 ml water in a test tube. Acetone (4 ml) was added to the reconstituted sample and the resulting mixture was thoroughly mixed using the aforementioned Ultra-turrax T25 homogenizer. One ml acetone containing 1 mg 2-nonanone, as an internal standard, was added. Four ml of acetone was used to rinse the homogenizer's generator and was combined with the sample. The mixture was centrifuged to remove precipitate, and supernatant was then dried using 0.75 g of anhydrous magnesium sulfate.

Proper calibration curves containing orange oil and WPI were prepared according to the above procedure.

A Varian 6000 gas chromatograph (Varian Analytical Instruments, Sugar Land, Tex.) equipped with a flame ionization detector was use to determine the orange oil content in the samples. The gas chromatographic conditions were as follows:

Column: 0.25 μm i.d.×30 m (0.25 μm film thickness) ECONO-CAP capillary column (Alltech, Deerfield, Ill.).

Stationary phase: SE-30

Carrier gas: Helium

Split ratio: 1:50

Column temperature: 60° C.–175° C. at 4° C./minute

Injection port temperature: 225° C.

Detector temperature: 250° C.

Sample size: 1 μL

Retention (RT) was calculated by the equation below:

RT%=(MO/AO)*100 where AO is the amount of added oil on dry base, and MO is the microencapsulated oil after spray-drying.

EXAMPLE 6

Microencapsulation of Vitamin A by Whey Protein

This example illustrate microencapsulation of Vitamin A by whey proteins.

Vitamin A was emulsified in whey protein concentrates having 35–80% protein or in whey protein concentrate. Wall solids concentrations were from 10–40% (w/w). Core of vitamin A to wall solids ratio was from 10–75%.

Drying condition were: fee emulsion temperature was 30° C.; inlet air temperature was 150° C.; outlet air temperature was 90° C. Homogenization of the emulsion was single stage homogenization at 250 bars.

The vitamin A content of the dry powder was determined by HPLC. All other process condition were the same as those described in Examples 1–4.

EXAMPLE 7

Stability of Anhydrous Milkfat Microencapsulated in Whey Proteins

This example illustrates test for determination of stability of microencapsulated AMF in whey proteins.

Whey protein isolate (WPI) was purchased from Le Sueur Isolates (Le Sueur, Minn.). The WPI consisted of 95.4% protein, 1.84% ash, and 2.68% moisture. AMF (California Cooperative Creamery, Hughson, Calif.) containing 99.8% milkfat was used as a core material. The AMF was stored at −18° C. until use. n-Hexanal (>98%) was purchased from Sigma Chemical Company (St. Louis, Mo.).

Preparation of Emulsions

Microencapsulating agent solutions (wall solutions) of WPI containing 20% (w/w) solids were prepared in deionized water. The wall solutions were deaerated (35° C., 13 kPa, 1 hour) to remove trapped air. AMF was then emulsified into these solutions at proportions of 25%, 50% and 75% (w/w of dry wall solids). The emulsification was carried out in two stages. A coarse emulsion was prepared using an Ultra Turrax T-25 (IKA Works, Cincinnati, Ohio) homogenizer operated at 13,500 rpm for 30 seconds. The second stage consisted of four successive homogenization steps using a type 8.30-H Mini-lab pressure homogenizer (APV Rannie, St. Paul, Minn.) operated at 50 MPa. Both the fat and the wall solution were heated to 50° C. prior to the emulsification and this temperature was maintained throughout the emulsification process.

Spray-drying

Microencapsulation by spray-drying was carried out as described in Examples 1–4. Emulsions (at 50° C.) of AMF in wall solutions were spray-dried in the concurrent mode using an APV Anhydro Laboratory Spray Dryer (APV Anhydro A/S, Soborg, Denmark). The dryer had an evaporation rate of 7.5 kg/hour, and a chamber inner diameter of 1 m. The emulsions were atomized by centrifugal atomizer of the dryer operated at 50,000 rpm. The emulsions were dried at inlet air temperature of 160° C. and an outlet temperature of 80° C. The microcapsule powders were collected at the bottom of the dryer's cyclone and were stored in glass jars in a desiccator at 25° C.

Sample Identification: A total of six preparations were studied for their oxidative stability.

B-AMF: Bulk anhydrous milkfat, that is AMF that has not been microencapsulated

ME-WPI: AMF microencapsulated in WPI at four different loads: 25%, 50% and 75% (w/w of wall solids).

ME-WPI/L: AMF microencapsulated in WPI/Lac wall systems, at core load of 50% or 75% (w/w of wall solids).

Wall blanks: WPI or a 1:1 (w/w) WPI/Lac blend were also studied (without AMF) for their oxidative stability.

Long-Term Storage Test: 5 grams of each of the 4 microcapsule samples ( 50% ME-WPI, 50% ME-WPI/L, 75% MEW-PI, 75% ME-WPI/L) were added to individual 30 ml headspace vials (Sunbrokers, Wilmington, N.C.). 2.5 grams of anhydrous milkfat was placed in a 20 ml headspace vial (Sunbrokers, Wilmington, N.C.), resulting in identical headspace volume as the other samples. Vials were hermetically sealed with silicon/PTFE 19×3 μm crimp cap (Phase Separations, Inc. Norwalk, Conn.). For each sample, in each incubation chamber, for each sampling time, three replicates were prepared.

Samples were stored at, 20° C., 30° C., and 40° C., in the dark. Samples at 20° C. were also stored under light. The light was provided from a 13 watt fluorescent bulb at a source to sample distance of 15 cm. Sample vials were periodically analyzed (separate samples every time) for a period of 8 months, on a monthly basis. As indicators of lipid oxidation, samples were analyzed for oxygen uptake and hexanal by gas chromatography.

5 grams of each of the systems: WPI, 25% ME-WPI, 50% ME-WPI, and 75% ME-WPI (25%, 50%, and 75% are the AMF loads in the three microcapsule types) were added to individual 30 ml headspace vials (Sunbrokers, Wilmington, N.C.). 2.5 grams of anhydrous milkfat was placed in a 20 μm, 20 ml headspace vial (Sunbrokers, Wilmington, N.C.), resulting in identical headspace volume as the other samples (B-AMF). Vials were hermetically sealed with silicon/PTFE 19×3 μm crimp cap ( Phase Separations, Inc. Norwalk, Conn.). For each sample, in each incubation chamber, for each sampling time, three replicates were prepared.

Samples were stored at 50° C., in the dark as well as under light. The light was provided from a 13 watt fluorescent bulb at a source to sample distance of 15 cm. Storage time for the different samples ranged from 6 to 32 weeks. As indicators of lipid oxidation, samples were analyzed for oxygen uptake and hexanal by gas chromatography.

Oxygen Uptake

The percentage of oxygen in the headspace of the sample vials was determined by gas chromatography. The analysis conditions were as follows:

GC apparatus: Varian 3400 Star (Varian Instruments, Walnut Creek, Calif.) gas chromatograph equipped with a thermal conductivity detector.

Sample size: 100 ml headspace

Column type: 6 ft×⅛ SS column packed with 80/100 5Å molecular sieve

Helium flow rate=27 ml/minute

Column temperature=35° C.

Splitless injector temperature=125° C.

Detector temperature=175° C.

filament temperature=225° C current intensity=175 mA

Samples were allowed to reach 25° C. (in the dark) prior to analysis. For calibration, samples of air were collected and processed using a CR501 Chromatopac Integrator (Shimadzu, Kyoto, Japan). Analysis was carried out in duplicates.

Hexanal Content: Hexanal content was monitored by gas chromatography static headspace technique, using the method described in *Lipids,* 26:479–484, (1991) with some modification for milkfat emulsion samples. The conditions were as follows:

GC apparatus: Perkin-Elmer Sigma 3B gas chromatograph with an H-6 headspace sampler(Norwalk, Conn.)

Column type: Capillary DB-1701 column (30 m×0.32 μm, 1 μm thickness, J&W, Folsom, Calif.)

Column temperature=68° C.

He linear g as velocity=20 cm/sec (He pressure gauge of 60 psi)

Splitless injector temperature=180° C.

Detector temperature=200° C.

0.5 grams of the encapsulated samples and 2 ml distilled water were measured into special headspace vials with silicone rubber Teflon caps (Phase Separations, Inc. Norwalk, Conn.), were sealed with a crimper, and incubated in a water bath shaker at 50° C. for 20 minutes. After incubation, the vials were inserted manually through the stationary injection needle in the headspace sampler, and pressurized for 30 seconds before injection. Each analysis was done in duplicate.

To quantify the hexanal peaks in different samples, pure grade n-hexanal was added to fresh milkfat and fresh emulsions of WPI or WPI/lactose, AMF and water which corresponded to each sample to obtain standard solutions containing approximately 50 mg hexanal/gm emulsion. Quantitative dilution of these standard solutions were made to obtain a series of standards with concentration ranges of 0 to 50 mg hexanal/gm emulsion. 2.5 grams of these standardized solutions were analyzed an identical fashion as the samples. Results were expressed in mg hexanal/gram fat in emulsion.

EXAMPLE 8

Microencapsulation of Volatiles in Wall Systems Consisting of Whey Proteins and Carbohydrates This example illustrates microencapsulation of volatile compounds by combination of whey proteins with carbohydrates.

Whey proteins isolate (WPI) was purchased from Le Sueur Isolates (Le Sueur, Minn.). Maltodextrins having a dextrose equivalence (DE) of 5, 10, and 15 (Lo-Dex®5, Lo-Dex® 10, and Lo-Dex® 15, respectively) and corn syrup solids having a DE of 24 (Fro®-Dex 24) were purchased from American Maize-Products Company (Hammond, Ind.). The carbohydrates were denoted as MD5, MD10, MD15, and CSS, respectively. Ethyl caprylate (ECY) was purchased from Sigma Chemical Company (St. Louis, Mo.) and served as a model volatile core material.

A wall solution containing 25% (wt/wt) solids consisting of WPI, and wall solutions consisting of various combinations of WPI with one of the carbohydrates, were prepared in deionized water (25° C.) and were then cooled to 4° C. WPI:carbohydrate (WPI/COH) weight ratios of 1:19, 1:9, 1:1, or 3:1 were used. The model ester (at 4° C.) was emulsified into the wall solutions at a proportion of 30% (wt/wt of wall solids). Emulsification was carried out in two stages. A coarse emulsion was prepared using an Ultra-homogenization, the temperature of the emulsion was maintained at 15° C., and the final emulsion was kept at 5° C. until drying. Four ethyl caprylate emulsions stabilized only by WPI were prepared as described above. The WPI concentration in these emulsions was adjusted to be identical to that in each of the WPI/COH stabilized emulsions. WPI concentrations of 1.25%, 2.5%, 12.5%, or 18.75% (w/w) were thus used and represented the 1:19, 1:9, 1:1, and 3:1 WPI/COH ratios, respectively. The ester load in each of these emulsions was identical to that used in the 25% solids cases described above.

Spray,drying: Emulsions were spray dried using an APV Anhydrous Laboratory Spray Dryer (APV Anhydro A/S, Søborg, Denmark). The dryer had an evaporation rate of 7.5 kg/h and a chamber diameter of 1 m. The emulsions were atomized by the centrifugal atomizer of the dryer (operated at 50,000 rpm) and dried in the concurrent drying configuration of the dryer. Feed temperature of 5° C., inlet air temperature of 160° C., and outlet air temperature of 80° C. were used in all cases. The dry powders were collected at the bottom of the dryer's cyclone and were kept in a desiccator at 25° C. All experiments were carried out in duplicates.

Emulsion particle size distribution.

The particle-size distribution of the emulsions were determined using a Malvern Mastersizer MS20 (Malvern Instruments, Malvern, Worcs., UK). A 2 mW He-Ne laser beam (633 nm) and a 45 µm focus lens were used.

Chemical analyses

Moisture content of the microcapsules was determined gravimetrically (in triplicates) after 4 h vacuum drying (40° C., 3 kPa). If needed, corrections for weight losses due to volatile losses were made by determining volatile content prior to and following vacuum drying, using the method described below.

The ester content of the dry microcapsules was determined using a modification of the method described earlier in this invention. One g of powder was dissolved in 100 ml of deionized water at 25° C. After incubation for 15 min at this temperature, a 0.5 ml aliquot of the emulsion was mixed with 4.5 ml of 50% ethanol solution. Then, 4 ml of a fresh reagent mixture consisting of a 1:1 ratio of 3N sodium hydroxide and 13.9% hydroxylamine was added, the system was thoroughly mixed, and was incubated for 10 minutes at 25° C. At this point, 2 ml of 3N hydrochloric acid was added to stop the reaction. A brownish color was developed after the addition of 2 ml of 10% ferric chloride solution in 0.1N hydrochloric acid. The absorbance of the supernatant at 525 nm was determined and the amount of ester in the powder was calculated using ester and wall specific calibration curves.

The amount of ester that could be extracted from the capsules by petroleum ether was determined using the extraction method described earlier in this invention, and by slightly modifying the ester determination method described above. One g of dry capsules was extracted with 10 ml of petroleum ether in a 30 ml hermetically sealed extraction flask for 5 minutes at 25° C. The mixture was filtered through a GN-6 filter (0.45 µm; Gelman Science, Inc., Ann Arbor, Mich.). One ml of the filtrate was mixed with 4 ml of 95% ethanol and the ester determination method described above was then used. In all cases, ester determination was carried out in triplicates.

The ratio (expressed as percentage) of the encapsulated ester to the initial ester load in the emulsion was defined as the retention (MEY). The proportion (expressed as %) of encapsulated ester that could not be extracted from 1 g of dry microcapsules was denoted as the microencapsulation efficiency (MEY).

Scanning electron microscopy (SEM)

Scanning electron microscopy studies of the inner and outer structural features of the dry microcapsules were carried out using the methods described earlier in this invention.

Statistical analyses

The significance (P<0.05) of the experimental results was studied according to the ANOVA, Student-Newman-Keuls, and t-test procedures using the SigmaState™ software (Jandel Scientific, San Rafael, Calif.).

EXAMPLE 9

Microencapsulation of AMF in Wall Systems Consisting of Whey Proteins and Lactose This example illustrates microencapsulation of microencapsulation of AMF in wall systems consisting of whey proteins and lactose.

Microencapsulating wall solution contained from about 15% (w/w) to about 25% (w/w), preferably 20% (w/w) solids. Wall solids consisted of WPI and lactose (Lac) at weight ratio ranging from 1:0 to 1:3 (WPI:Lac). The wall solution was prepared in deionized water at 25° C. and was then deaerated typically at 30° C. to 45° C., preferably at 35° C., at 10 to 20 kPa, preferably 13 kPa, for 1–3 hours, preferably 2 hours. The core material, in this case AMF, was emulsified into the wall solutions at a proportion of 75% (w/w of wall solids). An emulsification to obtain emulsion having mean particle size of about 0.4 μm was carried out. The first stage consisted of preparation of a coarse emulsion using an Ultra-Turrax® T25-S1 homogenizer (IKA Works, Cincinnati, Ohio) operated at 13,500 rpm for 30 sec. The second stage consisted of 4 successive homogenization steps using a type 8.30H, Mini-Lab high pressure homogenizer (APV Rannie, St. Paul, Minn.) operated at 50 or 80 MPa. The emulsion constituents were heated to 50° C. prior to the emulsification and this temperature was maintained throughout the emulsification process.

The emulsion was spray dried using any conventional spray dryer, such as APV Anhydro Laboratory Spray Dryer (APV Anhydro A/S, Soborg, Denmark). Drying was carried out in the concurrent mode. The emulsions were maintained at 50° C. and atomized by the centrifugal atomizer of the dryer operated at 50,000 rpm. Inlet and outlet air temperatures were 160° C. and 80° C., respectively. The microcapsule powder was collected at the bottom of the dryer's cyclone and was kept in glass jars in an evacuated desiccator at 25° C. All experiments were carried out in duplicates.

EXAMPLE 10

Effect of Moisture Uptake on Core Extractability and Microstructure of Spray-dried, AMF Containing Microcapsules Consisting of Whey Proteins or of a Combination of Whey Proteins and Lactose This example illustrates the effect of moisture effect of moisture uptake on core extractability and microstructure of spray-dried, AMF containing microcapsules consisting of whey proteins or of a combination of whey proteins and lactose.

Microcapsules were prepared from the emulsions denoted as systems 1 and 4 in Table 5. Emulsions were dried as described above at inlet and outlet temperature of 160° C. and 80° C., respectively.

Microcapsule powders were dried overnight (65° C., 6.7 kPa) and then cooled in a dry desiccator to 25° C. After cooling to about 25° C., approximately 2 g samples were weighed in triplicates into previously dried Kimax brand weighing bottles equipped with ground glass stoppers. The samples were then placed, uncapped, in glass desiccator containing saturated salt solutions at relative humidity ranging between 11.3% and 90%, stored at 25° C. Relative humidity in each of the chambers was verified using a Fast Response Digital Hygrometer obtained from Fisher Scientific, Pittsburgh, Pa. Moisture uptake was monitored gravimetrically until no further water adsorption could be detected. Equilibrium was reached at all humidities after 32 days.

The moisture content of the microcapsules was determined gravimetrically after 12 h of vacuum drying (65° C., 6.7 kPa). The amount of AMF that could be extracted from the microcapsules by petroleum ether was determined using the method described above for the determination of ME. One gram of microcapsule powder was weighed into a 50 ml Qorpak® glass bottle obtained from Fisher Scientific, Pittsburgh, Pa., 25 ml of analytical grade petroleum ether were added, and the bottle was capped with a Teflon-lined closure. The extraction systems were placed on a Model 360 Garver shaker from Garver Mfg., Union City, Ind. and the extraction was carried out for 15 minutes at 25° C. The extraction mixture was then filtered through a 0.45 μm, 47 μm diameter GN-6 filter obtained from Gelman Science, Ann Arbor, Mich., the solvent was evaporated using a water bath at 70° C., and the solvent-free extract was dried under vacuum at 45° C., 6.7 kPa. The amount of extracted AMF was then determined gravimetrically and expressed as mg AMF/g dry microcapsules. In order to evaluate the effects of moisture on AMF extractability, the extractions were carried out on humidified powders (wet systems), as well as samples that were dried at 65° C. and 6.7 kPa prior to the extraction (dry systems). All analyses were carried out in triplicates.

Scanning electron microscopy

The outer and inner structures of the microcapsules were studied using methods described above. For studying the outer structure, the microcapsules were attached to SEM stubs using a two-sided adhesive tape obtained from Ted Pella, Redding, Calif. In order to examine the inner structure, the microcapsules attached to the stub were fractured by attaching a second piece of adhesive tape on top of the microcapsules and then quickly ripping it off. In all cases, the specimens were subsequently coated with gold using a Model E-50050 Polaron Sputter Coater obtained from Bio-Rad, San Jose, Calif., and analyzed using an ISI DS-130 scanning electron microscope (International Scientific Instrument Inc., Pleasanton, Calif.) operated at 10 or 20 kV. Type 55 Polaroid film was used to produce micrographs.

EXAMPLE 11

Microencapsulation of Anhydrous Milkfat in Wall systems Consisting of Combinations of Whey protein Isolate and Carbohydrates Wall and Core Materials This Example illustrates the microencapsulation of anhydrous milkfat in wall systems consisting of combinations of whey protein isolate and carbohydrates wall and core materials.

Whey proteins isolate was purchased from Le Sueur Isolates (Le Sueur, Minn.). Maltodextrins with dextrose equivalents of 11, denoted as MD11 and 18, denoted as MD18, and corn solids syrup with dextrose equivalent of 28, denoted as CSS28 were purchased from American Maize-Products Company (Hammond, Ind.). Two commercial microencapsulating agents-a modified starch National® 46 denoted as NAT46 and a dextrin Encapsul® 855 denoted as ENC855, were purchased from National Starch and Chemical Corp. (Bridgewater, N.J.). The carbohydrates fit into one of two groups: those lacking (MD11, MD18, and CSS28), and those exhibiting (NAT46 and ENC855) surface-active and microencapsulating properties. AMF containing 99.8% fat (California Cooperative Creamery, Hughson, Calif.) was the core material in all cases.

Microencapsulation by Spray-drying

Wall solutions were prepared in deionized water containing 20% (wt/wt) solids consisting of either WPI or combinations of WPI and a carbohydrate. Where the wall solution consisted of WPI and a carbohydrate, the carbohydrate replaced the WPI. Replacement ratios of 25%, 50%, and 75% (w/w) were used. The AMF was emulsified into the wall solutions at a proportion of 75% (w/w of fat-free wall solids). Emulsification was carried out in two stages. A coarse emulsion was prepared using an Ultra-Turrax® T25-S1 homogenizer (IKA Works, Cincinnati, Ohio) operated at 13,500 rpm for 30 sec. The second stage consisted of four successive homogenization steps using a type 8.30H, Mini-Lab high-pressure homogenizer (APV Rannie, St. Paul, Minn.) operated at 50 MPa. The emulsion constituents were heated to 50° C. and this temperature was maintained throughout the emulsification process.

The emulsions were spray dried using an APV Anhydro Laboratory Spray Dryer (APV Anhydro A/S, Soborg, Denmark) as described earlier in this invention at inlet and outlet air temperature of 160° C. and 80° C., respectively.

Analyses

The spectra of particle sizes of the emulsions were determined using the method described above. The microencapsulation yield (MEY) and the microencapsulation efficiency (ME) were determined as described above.

EXAMPLE 12

Microencapsulating Properties β-lactoglobulin, Mixture of β-lactoglobulin and α-lactalbumin, and Heat-treated Whey Proteins This Example illustrates microencapsulating properties β-lactoglobulin, mixture of β-lactoglobulin and α-lactalbumin, and heat-treated whey proteins.

Wall and core materials

Whey protein isolate (WPI) was purchased from Le Sueur Isolate (Le Sueur, Minn.), α-lactalbumin was purchased from Protose Separations, Inc. (Ontario, Canada). Anhydrous milkfat (AMF) was purchased from California Cooperative Creamery (Hughston, Calif.).

Fractionation of Whey proteins Separation of β-lactoglobulin

β-lactoglobulin (β-lg) was separated from whey protein isolate using a method similar to that reported in *J. Food Sci.*, 53:743, (1988). A 15% (w/w) solution of WPI in deionized water was prepared at 20° C. The pH of the solution was adjusted to 2.0 by adding 2N HCl. After mixing for 10 minutes, NaCl was added to obtained a final NaCl concentration of 7% (w/v). After 20 minutes. at 20° C., the mixture was centrifuged at 6000×g for 20 minutes at 20° C. The supernatant was collected and its pH was adjusted to 7.0 by adding 2N NaOH.

The supernatant was treated by UF (ultrafiltration) in order to remove salt and to concentrate the protein solution. UF was carried out using a Pellicon cassette system (Millipore Corporation, Bedford, Mass.) equipped with a UF membrane of 10,000 dalton cut-off (Pellicon Membrane 10,000NMWL, PLCG). The inlet pressure was maintained at 1.2 kg/cm$^2$. When the volume of the retentate was reduced to about 50% of original solution volume, diafiltration with deionized water was carried out (using the same apparatus) until no further reduction in conductivity of the retentate could be achieved. The retentate was then lyophilized and the dry powder was kept at 4° C.

The purity of the separated β-lg. was evaluated (against commercial standards) by gel-electrophoresis (SDS-PAGE) and by RP-HPLC (on a C-18 column) and was proven to be 99.9%.

Microencapsulation by Spray-Drying

Preparation of wall solutions: Wall solution consisting of 10% or 20% (w/w) wall solids, that is WPI, β-lg, or a 3:1 (w/w) ratio of β-lg:α-la were prepared in deionized water as has been described earlier in this invention. For wall systems consisting of heat-treated whey proteins, a WPI solution of solid concentration of 5% to 15% (w/w), preferably 10% (w/w) was heated to a temperature of 60° C. to 90° C., preferably 80° C. and was kept at this temperature for 10 to 60 minutes, preferably 30 minutes Emulsion preparation: Emulsions were prepared according to the method described earlier in this invention by using the two stages homogenization procedure. When anhydrous milkfat was microencapsulated, AMF load ranging from 25% to 75% (w/w of wall solids) were used and the emulsification was carried out at 50° C.

Spray-drying: The AMF containing emulsions (at 50° C.) were spray-dried using the apparatus described earlier in this invention. In all cases, drying was carried out at inlet and outlet air temperature of 160° C. and 80° C., respectively.

Analyses

Microencapsulation yield (MEY), that is the retention of the core in the wall system during the drying process was determined using the methods described earlier in this invention for the determination of anhydrous milkfat content in microcapsules. The % ratio between the core content in the dry microcapsules to the core content in the emulsion (on wall solids basis) was defined as the retention or the MEY.

Microencapsulation efficiency (MEE), that is the proportion of encapsulated core that could not be extracted by petroleum ether was determined using the methods described earlier in this invention for AMF-containing microcapsules.

Microstructural analysis

The outer and inner structure of the spray-dried microcapsules was studied by scanning electron microscopy, using the methods described earlier in this invention regarding SEM study of microcapsules.

Emulsion characteristics

Emulsion particle size distribution, mean particle size and specific surface area were determined using the same apparatus and method described earlier in this invention regarding the determination of these parameters. The viscosity of the emulsions was determined at 25° C. using a Brookfield Viscosimeter (model LVT, Brookfield Engineering Laboratories, INC., Stoughton, Mass.).

What is claimed is:

1. A method for microencapsulation of a volatile or a non-volatile core material in a wall system consisting essentially of a whey protein, said method comprising steps:

(a) preparing the wall system using whey protein;

(b) mixing a core system within the wall system;

(c) dispersing the core system in the wall system to form emulsion, dispersion or a combination thereof;

(d) microencapsulating the emulsion, dispersion or the combination of step (c); and (e) harvesting a microencapsulated product.

2. The method of claim 1 wherein the whey protein is selected from group consisting of a whey protein isolate, a whey protein concentrate, β-lactoglobulin, α-lactalbumin, a mixture thereof, a modified or denatured whey protein and a fraction thereof.

3. The method of claim 2 wherein the core system is selected from the group consisting of a fat, volatile compound, vitamin, essential oil and aroma compound.

4. The method of claim 3 wherein the whey protein is present in concentration from about 10% to about 40%.

5. The method of claim 4 wherein the core is present in a load concentration between about 25% to about 75%.

6. The method of claim 5 wherein the microencapsulating step (d) of claim 1 is spray-drying and a drying temperature during microencapsulation is between about 105° C. to about 210° C. at inlet air and between 50° C. and 140° C. at outlet air of a spray-dryer.

7. The method of claim 6 wherein the microencapsulating step (d) of claim 1 is spray-drying and a drying temperature during microencapsulation is about 160° C. at an inlet air and about 80° C. at an outlet air of a spray-dryer.

8. The method of claim 7 wherein the wall system additionally contains wall constituents possessing microencapsulating properties, wall constituents not possessing microencapsulating properties or additives.

9. The method of claim 8 wherein a wall constituent possessing microencapsulating properties is selected from the group consisting of proteins, natural gums, modified gums and starches.

10. The method of claim 9 wherein a protein is a gelatin.

11. The method of claim 9 wherein a gum is gum arabic or carrageenan.

12. The method of claim 9 wherein a starch is a modified starch or a dextrin.

13. The method of claim 8 wherein the wall constituents not possessing microencapsulation properties are selected from the group consisting of a carbohydrate and a hydrolyzed or partially hydrolyzed starch.

14. The method of claim 13 wherein the carbohydrate is lactose.

15. The method of claim 13, wherein the carbohydrate is a maltodextrin or corn syrup solids.

16. The method of claim 13 wherein the carbohydrate is added to the whey protein in a ratio from about 1:10 to about 10:1 of the whey protein to the carbohydrate.

17. The method of claim 16 wherein the carbohydrate is added to the whey protein in a ratio from about 1:3 to about 3:1 of the whey protein to the carbohydrate.

18. The method of claim 9 wherein the wall constituent possessing microencapsulating properties is added to the whey protein in a ratio from about 1:10 to about 10:1 of the whey protein to the carbohydrate.

19. The method of claim 9 wherein the wall constituent possessing microencapsulating properties is added to the whey protein in a ratio from about 1:3 to 3:1 of the whey protein to the carbohydrate.

20. The method of claim 9 wherein a wall system additive is selected from the group consisting of emulsifiers, antioxidants, plasticizers and fillers.

21. The method of claim 13 wherein a wall system additive is selected from the group consisting of emulsifiers, antioxidants, plasticizers and fillers.

22. The method of claim 7 wherein the core system additionally contains an additive to the core selected from the group consisting of emulsifiers, antioxidants, dispersion aids and carriers.

* * * * *

UNITED STATES PATENT AND TRADEMARK OFFICE
CERTIFICATE OF CORRECTION

PATENT NO. : 5,601,760
DATED : February 11, 1997
INVENTOR(S) : Moshe Rosenberg

It is certified that error appears in the above-identified patent and that said Letters Patent is hereby corrected as shown below:

Column 1, line 8, change "proteinbased" to --protein-based--;

Column 4, line 21, delete "--β-lactalbumin" and insert --α-lactalbumin--;

Column 5, line 40, change "FIG." to --FIGS.--;
          line 54, change "FIG." to --FIGS.--;
Column 6, line 14, change "shows" to --show--;
          line 24, delete "16D" and insert --18D--;
          line 66, change "and" to --through--;

Column 41, line 67, change the first "FIG. 32D" to --FIG. 32C--;

Column 54, line 49, change "Spray,drying" to --Spray-drying--;

Column 60, line 62, delete "microencapsulation of";

Column 61, line 35, delete "effect of moisture";

Column 63, line 12, change "(ME)" to --(MEE)--.

Signed and Sealed this

Third Day of February, 1998

Attest:

BRUCE LEHMAN

Attesting Officer

Commissioner of Patents and Trademarks